(12) United States Patent
Kameda et al.

(10) Patent No.: US 12,157,538 B2
(45) Date of Patent: Dec. 3, 2024

(54) HUMAN-POWERED VEHICLE COMPONENT AND GEAR

(71) Applicant: Shimano Inc., Osaka (JP)

(72) Inventors: Tsuyoshi Kameda, Osaka (JP); Hiroyuki Ishizaki, Osaka (JP); Shinichiro Noda, Osaka (JP); Akihiro Izawa, Osaka (JP)

(73) Assignee: Shimano Inc., Osaka (JP)

( * ) Notice: Subject to any disclaimer, the term of this patent is extended or adjusted under 35 U.S.C. 154(b) by 270 days.

(21) Appl. No.: 17/132,549

(22) Filed: Dec. 23, 2020

(65) Prior Publication Data

US 2021/0197926 A1 Jul. 1, 2021

(30) Foreign Application Priority Data

Dec. 27, 2019 (JP) .................................. 2019-239078
Apr. 30, 2020 (JP) .................................. 2020-080860

(51) Int. Cl.
*B62M 6/55* (2010.01)

(52) U.S. Cl.
CPC .................................... *B62M 6/55* (2013.01)

(58) Field of Classification Search
CPC . B62M 6/40; B62M 6/45; B62M 6/50; B62M 6/55
USPC ..................................................... 180/206.4
See application file for complete search history.

(56) References Cited

U.S. PATENT DOCUMENTS

| 11,453,457 | B2 * | 9/2022 | Kugele | ................. B62K 19/08 |
| 2009/0152042 | A1 * | 6/2009 | Pierick | ................. B62K 19/16 |
| | | | | 180/311 |
| 2017/0016526 | A1 * | 1/2017 | Watarai | ................. F16H 57/025 |
| 2020/0398935 | A1 * | 12/2020 | Reiter | ...................... B62M 6/55 |
| 2021/0269119 | A1 * | 9/2021 | Boehnke | ................. B62M 6/55 |
| 2022/0089250 | A1 * | 3/2022 | Greven | ................. B62K 19/34 |
| 2022/0177072 | A1 * | 6/2022 | Tsukamoto | ............. B62M 6/50 |

FOREIGN PATENT DOCUMENTS

| CN | 103891050 | A | 6/2014 |
| CN | 106347565 | A | 1/2017 |
| CN | 109383700 | A | 2/2019 |
| DE | 600 11 914 | T2 | 7/2005 |

(Continued)

*Primary Examiner* — Anne Marie M Boehler
(74) *Attorney, Agent, or Firm* — Global IP Counselors, LLP

(57) ABSTRACT

A human-powered vehicle component includes a housing and a joint provided on the housing and configured to be attached to a support of the human-powered vehicle by a fastener. The joint includes a metal base, a metal coupling portion provided on the base and coupled to the fastener, and an intermediate portion provided between the coupling portion and the base. The base includes a first material having a first standard electrode potential. The coupling portion includes a second material having a second standard electrode potential. The intermediate portion is formed by a third material having a third standard electrode potential or a fourth material having an electric insulating property. A difference of the third and first standard electric potentials and a difference of the third and second standard electrode potentials are each smaller than a difference of the first and second standard electrode potentials.

29 Claims, 20 Drawing Sheets

(56) References Cited

FOREIGN PATENT DOCUMENTS

| | | |
|---|---|---|
| DE | 10 2016 112 778 A1 | 1/2017 |
| DE | 10 2017 201 617 A1 | 8/2018 |
| JP | 51-111650 U | 9/1976 |
| JP | 5-125567 A | 5/1993 |
| JP | 11-225633 A | 8/1999 |
| JP | 2001-271813 A | 10/2001 |
| JP | 2009-79758 A | 4/2009 |
| JP | 2011-12771 A | 1/2011 |
| JP | 2017-24700 A | 2/2017 |

* cited by examiner

HUMAN-POWERED VEHICLE COMPONENT AND GEAR

CROSS-REFERENCE TO RELATED APPLICATIONS

This application claims priority to Japanese Patent Application No. 2019-239078, filed on Dec. 27, 2019, and Japanese Patent Application No. 2020-080860, filed on Apr. 30, 2020. The entire disclosures of Japanese Patent Application Nos. 2019-239078 and 2020-080860 are hereby incorporated herein by reference.

BACKGROUND

Technical Field

The present invention generally relates to a human-powered vehicle component and a gear.

Background Information

Japanese Laid-Open Patent Publication No. 2017-024700 (Patent Document 1) discloses an example of a human-powered vehicle component including a housing. Patent Document 1 discloses an example of a human-powered vehicle component including a gear.

SUMMARY

An object of the present disclosure is to provide a human-powered vehicle component and a gear that limit the shortening of life.

A human-powered vehicle component in accordance with a first aspect of the present disclosure is for a human-powered vehicle. The human-powered vehicle component comprises a housing and a joint provided on the housing and configured to be attached to a support of the human-powered vehicle by a fastener. The joint includes a metal base, a metal coupling portion provided on the metal base and configured to be coupled to the fastener, and an intermediate portion provided between the coupling portion and the metal base. The metal base includes a first material having a first standard electrode potential. The coupling portion includes a second material having a second standard electrode potential. The intermediate portion is formed by one of a third material having a third standard electrode potential and a fourth material having an electric insulating property. A difference of the third standard electrode potential and the first standard electric potential and a difference of the third standard electrode potential and the second standard electrode potential are each smaller than a difference of the first standard electrode potential and the second standard electrode potential. In the human-powered vehicle component according to the first aspect, the intermediate portion including the third material or the fourth material hinders occurrence of galvanic corrosion, which is caused by the material of at least one of the fastener and the support of the human-powered vehicle being different from the material of the metal base. This limits the shortening of life of the human-powered vehicle component.

In accordance with a second aspect of the present disclosure, the human-powered vehicle component according to the first aspect is configured so that the first standard electrode potential differs from the second standard electrode potential. In the human-powered vehicle component according to the second aspect, the material of the metal base is different from the material of the coupling portion.

In accordance with a third aspect of the present disclosure, the human-powered vehicle component according to the first or second aspect is configured so that the intermediate portion is non-removably provided on the coupling portion. In the human-powered vehicle component according to the third aspect, the intermediate portion is non-removably provided on the coupling portion.

In accordance with a fourth aspect of the present disclosure, the human-powered vehicle component according to any one of the first to third aspects is configured so that the intermediate portion is formed by the fourth material, and the fourth material includes a metal oxide. In the human-powered vehicle component according to the fourth aspect, the intermediate portion is formed by the metal oxide in a preferred manner.

In accordance with a fifth aspect of the present disclosure, the human-powered vehicle component according to the fourth aspect is configured so that the second material includes an aluminum alloy, and the metal oxide includes aluminum oxide. In the human-powered vehicle component according to the fifth aspect, the intermediate portion is formed by an aluminum oxide in a preferred manner.

In accordance with a sixth aspect of the present disclosure, the human-powered vehicle component according to the fourth or fifth aspect is configured so that the intermediate portion has a thickness of 1 micrometer or greater and 30 micrometers or less. In the human-powered vehicle component according to the sixth aspect, the intermediate portion that is greater than or equal to one micrometer and less than or equal to thirty micrometers is provided.

In accordance with a seventh aspect of the present disclosure, the human-powered vehicle component according to the first or second aspect is configured so that the intermediate portion and the coupling portion are formed by different members. In the human-powered vehicle component according to the seventh aspect, the intermediate portion can be formed by an optimal material.

In accordance with an eighth aspect of the present disclosure, the human-powered vehicle component according to the seventh aspect is configured so that the intermediate portion is removably provided on the coupling portion, and a joining force between the intermediate portion and the metal base is greater than a joining force between the intermediate portion and the coupling portion. In the human-powered vehicle component according to the eighth aspect, the joining force between the intermediate portion and the metal base is greater than the joining force between the intermediate portion and the coupling portion. In a case in which the fastener is coupled to the coupling portion and force that moves the coupling portion is applied, the coupling portion is moved without moving the intermediation portion relative to the joint. Movement of the coupling portion limits occurrence of loosening during attachment of the joint to the support of the human-powered vehicle. Since the intermediate portion does not move relative to the joint, the intermediate portion and the joint have stable electric properties.

In accordance with a ninth aspect of the present disclosure, the human-powered vehicle component according to any one of the first to eighth aspects is configured so that the coupling portion and the intermediate portion are non-removably provided on the metal base. In the human-powered vehicle component according to the ninth aspect, the coupling portion and the intermediate portion do not move relative to the metal base. Thus, the coupling portion, the intermediate portion, and the joint have stable electric properties.

In accordance with a tenth aspect of the present disclosure, the human-powered vehicle component according to any one of the first to third and seventh to ninth aspects is configured so that the intermediate portion includes rubber or resin. In the human-powered vehicle component according to the tenth aspect, the intermediate portion is formed by rubber or resin in a preferred manner.

In accordance with an eleventh aspect of the present disclosure, the human-powered vehicle component according to any one of the first to ninth aspects is configured so that the metal base includes a hole, and at least part of the coupling portion and at least part of the intermediate portion are located in the hole. In the human-powered vehicle component according to the eleventh aspect, at least part of the coupling portion and at least part of the intermediate portion are located in the hole of the metal base.

In accordance with a twelfth aspect of the present disclosure, the human-powered vehicle component according to the eleventh aspect is configured so that the intermediate portion is press-fitted to the hole. In the human-powered vehicle component according to the twelfth aspect, the press-fitting of the intermediate portion to the hole connects the intermediate portion to the metal base.

In accordance with a thirteenth aspect of the present disclosure, the human-powered vehicle component according to the eleventh or twelfth aspect is configured so that the at least part of the coupling portion is tubular, and the at least part of the intermediate portion covers at least part of an outer peripheral surface of the at least part of the coupling portion. In the human-powered vehicle component according to the thirteenth aspect, at least part of the intermediate portion covers at least part of the outer peripheral surface of the at least part of the coupling portion, so that the at least part of the outer peripheral surface of the coupling portion is not exposed.

In accordance with a fourteenth aspect of the present disclosure, the human-powered vehicle component according to the thirteenth aspect is configured so that the at least part of the intermediate portion is tubular, and the at least part of the intermediate portion has an outer peripheral part including at least one of a knurl that contacts the metal base and a protrusion that contacts the metal base. In the human-powered vehicle component according to the fourteenth aspect, movement of the intermediate portion relative to the metal base is restricted by at least one of the knurl and the protrusion.

In accordance with a fifteenth aspect of the present disclosure, the human-powered vehicle component according to the fourteenth aspect is configured so that the at least one of a knurl that contacts the metal base and a protrusion that contacts the metal base is provided at a position separate from an opening of the hole. The human-powered vehicle component according to the fifteenth aspect limits a load applied to a portion of the joint in the vicinity of the opening of the hole.

In accordance with a sixteenth aspect of the present disclosure, the human-powered vehicle component according to the fourteenth or fifteenth aspect is configured so that the at least one of the knurl and the protrusion includes a first contact portion and a second contact portion, and the first contact portion and the second contact portion are spaced apart from each other in a direction in which the hole extends. In the human-powered vehicle component according to the sixteenth aspect, the intermediate portion contacts the metal base at multiple positions in the direction in which the hole extends. Thus, the intermediate portion is stably coupled to the metal base.

In accordance with a seventeenth aspect of the present disclosure, the human-powered vehicle component according to any one of the eleventh to sixteenth aspects is configured so that the intermediate portion is adhered to the metal base by an adhesive provided in the hole. The human-powered vehicle component according to the seventeenth aspect improves the joining force of the intermediate portion to the metal base.

In accordance with an eighteenth aspect of the present disclosure, the human-powered vehicle component according to the sixteenth aspect is configured so that the intermediate portion is adhered to the metal base by an adhesive provided in the hole, and at least part of the adhesive is provided between the first contact portion and the second contact portion. In the human-powered vehicle component according to the eighteenth aspect, at least part of the adhesive is located between the first contact portion and the second contact portion. This restricts flow of the adhesive out of the hole during manufacturing.

In accordance with a nineteenth aspect of the present disclosure, the human-powered vehicle component according to any one of the thirteenth to eighteenth aspects is configured so that the at least part of the coupling portion has an outer peripheral part including a knurl that contacts the intermediate portion. In the human-powered vehicle component according to the nineteenth aspect, the knurl formed on the outer peripheral part of the at least part of the coupling portion restricts movement of the coupling portion relative to the intermediate portion in at least a predetermined direction.

In accordance with a twentieth aspect of the present disclosure, the human-powered vehicle component according to any one of the eleventh to nineteenth aspects is configured so that the coupling portion is located between the metal base and the support in a state in which the joint is coupled to the support of the human-powered vehicle by the fastener, and the coupling portion includes a flange having a contour that is larger than a diameter of the hole. In the human-powered vehicle component according to the twentieth aspect, the flange is located outside the hole between the metal base and the support of the human-powered vehicle.

In accordance with a twenty-first aspect of the present disclosure, the human-powered vehicle component according to any one of the eleventh to twentieth aspects is configured so that the metal base includes a first female thread portion that forms the hole, and the intermediate portion includes at least part of a male thread portion configured to be joined with the first female thread portion. In the human-powered vehicle component according to the twenty-first aspect, the joining of the first female thread portion of the metal base with the male thread portion of the intermediate portion joins the metal base with the intermediate portion. In the human-powered vehicle component according to the twenty-first aspect, the metal base is thread-joined with the intermediate portion. Thus, the position of the metal base relative to the intermediate portion is readily adjusted.

In accordance with a twenty-second aspect of the present disclosure, the human-powered vehicle component according to any one of the eleventh to twenty-first aspects is configured so that the coupling portion includes a second female thread portion configured to be coupled to the fastener. In the human-powered vehicle component according to the twenty-second aspect, the fastener and the coupling portion are coupled by the second female thread portion.

In accordance with a twenty-third aspect of the present disclosure, the human-powered vehicle component according to the twenty-first aspect is configured so that the coupling portion includes a second female thread portion configured to be coupled to the fastener, one of the first female thread portion and the second female thread portion is a right-hand thread, and the other one of the first female thread portion and the second female thread portion is a left-hand thread. The human-powered vehicle component according to the twenty-third aspect limits the loosening of the first female thread portion from the male thread portion in a case in which the second female thread portion is coupled to the fastener.

In accordance with a twenty-fourth aspect of the present disclosure, the human-powered vehicle component according the twenty-second or twenty-third aspect is configured so that the coupling portion includes a tool engagement portion configured to be engaged with a tool. In the human-powered vehicle component according to the twenty-fourth aspect, the position of the intermediate portion relative to the metal base is readily adjusted by operating a tool engaged with the tool engagement.

In accordance with a twenty-fifth aspect of the present disclosure, the human-powered vehicle component according to any one of the first to twenty-fourth aspects is configured so that at least part of the housing is formed integrally with the metal base as a one-piece member. In the human-powered vehicle component according to the twenty-fifth aspect, the number of elements of the human-powered vehicle component is reduced.

In accordance with a twenty-sixth aspect of the present disclosure, the human-powered vehicle component according to any one of the eleventh to twenty-fourth aspects is configured so that the metal base includes a first base portion and a second base portion provided on the first base portion and defining the hole, and the second base portion and the first base portion include different materials. In the human-powered vehicle component according to the twenty-sixth aspect, the first base portion and the second base portion are formed by appropriate materials.

In accordance with a twenty-seventh aspect of the present disclosure, the human-powered vehicle component according to the twenty-sixth aspect is configured so that at least part of the housing is formed integrally with the first base portion as a one-piece member. In the human-powered vehicle component according to the twenty-seventh aspect, the first base portion is formed integrally with at least part of the housing. This reduces the number of elements.

In accordance with a twenty-eighth aspect of the present disclosure, the human-powered vehicle component according to any one of the first to twenty-seventh aspects is configured so that the metal base includes a magnesium alloy. In the human-powered vehicle component according to the twenty-eighth aspect, the weight of the housing is reduced.

A human-powered vehicle component in accordance with a twenty-ninth aspect of the present disclosure is for a human-powered vehicle. The human-powered vehicle component comprises a housing including a first housing portion and a second housing portion that defines an accommodation cavity with the first housing portion, a positioner provided on each of the first housing portion and the second housing portion and configured to relatively position the first housing portion and the second housing portion, and an insulator provided between the first housing portion and the second housing portion to electrically insulate the first housing portion and the second housing portion. The first housing portion and the second housing portion are electrically connected at the positioner. In the human-powered vehicle component according to the twenty-ninth aspect, the first housing portion and the second housing portion are electrically connected in a preferred manner. This limit generation of potential difference between the first housing portion and the second housing portion, thereby limiting the shortening of life of the human-powered vehicle component.

In accordance with a thirtieth aspect of the present disclosure, the human-powered vehicle component according to the twenty-ninth aspect further comprises a conductor provided on the positioner to electrically connect the first housing portion and the second housing portion. In the human-powered vehicle component according to the thirtieth aspect, the first housing portion and the second housing portion are electrically connected by the conductor in a preferred manner.

In accordance with a thirty-first aspect of the present disclosure, the human-powered vehicle component according to the thirtieth aspect is configured so that the conductor includes conductive grease. In the human-powered vehicle component according to the thirty-first aspect, the first housing portion and the second housing portion are electrically connected by the conductive grease in a preferred manner.

In accordance with a thirty-second aspect of the present disclosure, the human-powered vehicle component according to any one of the twenty-ninth to thirty-first aspects is configured so that the first housing portion and the second housing portion include a magnesium alloy. In the human-powered vehicle component according to the thirty-second aspect, the weight of the housing is reduced.

In accordance with a thirty-third aspect of the present disclosure, the human-powered vehicle component according to any one of the twenty-ninth to thirty-second aspects is configured so that the positioner includes a first projection provided on one of the first housing portion and the second housing portion and a first recess provided in the other one of the first housing portion and the second housing portion to receive at least part of the first projection. In the human-powered vehicle component according to the thirty-third aspect, engagement of the first projection and the first recess allows for easy positioning.

In accordance with a thirty-fourth aspect of the present disclosure, the human-powered vehicle component according to any one of the first to thirty-third aspects further comprises a motor that is at least partially accommodated in the housing. The human-powered vehicle component according to the thirty-fourth aspect limits the shortening of life of the human-powered vehicle component including the motor.

A human-powered vehicle component in accordance with a thirty-fifth aspect of the present disclosure is for a human-powered vehicle. The human-powered vehicle component comprises a housing, a motor that is at least partially accommodated in the housing, a cover attached to the housing, and an electric connector including a connection terminal exposed to a cavity defined by the housing and the cover. The cover includes at least one rib configured to contact the housing and limit deformation of the cavity. The human-powered vehicle component according to the thirty-fifth aspect limits deformation of the cavity. This limits the load applied to the electric connector, thereby limiting the shortening of life.

In accordance with a thirty-sixth aspect of the present disclosure, the human-powered vehicle component according to the thirty-fifth aspect is configured so that the at least one rib includes a plurality of ribs, and a minimum distance to the housing differs between the ribs. In the human-powered vehicle component according to the thirty-sixth aspect, deformation of the cavity is limited by the ribs having different minimum distances to the housing in a preferred manner.

In accordance with a thirty-seventh aspect of the present disclosure, the human-powered vehicle component according to the thirty-sixth aspect is configured so that the ribs include at least one first rib extending in a first direction and at least one second rib extending in a second direction that differs from the first direction. In the human-powered vehicle component according to the thirty-seventh aspect, deformation of the cavity is limited by the first rib and the second rib in a preferred manner.

In accordance with a thirty-eighth aspect of the present disclosure, the human-powered vehicle component according to any one of the thirty-fifth to thirty-seventh aspects is configured so that the housing includes a metal material, and the cover includes a resin material. In the human-powered vehicle component according to the thirty-eighth aspect, deformation of the cavity is limited in the human-powered vehicle component including the cover formed by a resin material in a preferred manner.

A human-powered vehicle component in accordance with a thirty-ninth aspect of the present disclosure is for a human-powered vehicle. The human-powered vehicle component comprises a housing, a motor provided on the housing, and a speed reducer coupled to the motor. The speed reducer includes gears, and at least one of the gears includes a tooth portion including a thermosetting resin. In the human-powered vehicle component according to the thirty-ninth aspect, the tooth portion of at least one of the gears in the speed reducer includes a thermosetting resin. Thus, wear of the gear caused by heat is limited. Accordingly, the shortening of life is limited.

In accordance with a fortieth aspect of the present disclosure, the human-powered vehicle component according to the thirty-ninth aspect is configured so that the motor includes an output shaft, the gears include a first gear provided on the output shaft and a second gear engaged with the first gear, and the second gear includes the tooth portion including a thermosetting resin. In the human-powered vehicle component according to the fortieth aspect, wear of the tooth portion of the second gear caused by heat is limited.

In accordance with a forty-first aspect of the present disclosure, the human-powered vehicle component according to the fortieth aspect is configured so that the first gear is formed by a metal. In the human-powered vehicle component according to the forty-first aspect, the first gear having the highest rotational speed in the speed reducer is formed by metal. This limits the shortening of life.

In accordance with a forty-second aspect of the present disclosure, the human-powered vehicle component according to the fortieth or forty-first aspect is configured so that the second gear includes a shaft and the tooth portion formed separately from the shaft and provided on the shaft to rotate integrally with the shaft. In the human-powered vehicle component according to the forty-second aspect, the configuration that forms the tooth portion separately from the shaft allows the second gear to be readily manufactured.

In accordance with a forty-third aspect of the present disclosure, the human-powered vehicle component according to the forty-second aspect is configured so that the shaft is formed by metal. In the human-powered vehicle component according to the forty-third aspect, formation of the shaft by metal improves the strength of the shaft.

In accordance with a forty-fourth aspect of the present disclosure, the human-powered vehicle component according to the forty-second or forty-third aspect is configured so that the tooth portion is annular and includes an inner peripheral part including a first coupler coupled to the shaft. In the human-powered vehicle component according to the forty-fourth aspect, the tooth portion is coupled to the shaft by the first coupler.

In accordance with a forty-fifth aspect of the present disclosure, the human-powered vehicle component according to the forty-fourth aspect is configured so that the shaft includes an outer peripheral part including a second coupler coupled to the first coupler. In the human-powered vehicle component according to the forty-fifth aspect, the shaft is coupled to the first coupler by the second coupler.

In accordance with a forty-sixth aspect of the present disclosure, the human-powered vehicle component according to the forty-fifth aspect is configured so that the first coupler includes a female thread portion, and the second coupler includes a male thread portion. In the human-powered vehicle component according to the forty-sixth aspect, the tooth portion and the shaft are coupled by the female thread portion and the male thread portion.

In accordance with a forty-seventh aspect of the present disclosure, the human-powered vehicle component according to the forty-sixth aspect is configured so that the first coupler includes a threadless first part having a larger inner diameter than the female thread portion, the second coupler includes a threadless second part having a larger outer diameter than the male thread portion, and the second part is located proximate to the first part to face the first part or contacts the first part. In the human-powered vehicle component according to the forty-seventh aspect, the first part and the second part limit misalignment of the rotational axis of the tooth portion and the rotational axis of the shaft during assembly.

In accordance with a forty-eighth aspect of the present disclosure, the human-powered vehicle component according to the forty-sixth or forty-seventh aspect is configured so that the motor is configured to apply a propulsion force to the human-powered vehicle, and the motor is configured to rotate the second gear in a direction in which the first coupler is fastened to the second coupler in a case in which the motor applies the propulsion force to the human-powered vehicle. The human-powered vehicle component according to the forty-eighth aspect stably couples the first coupler and the second coupler.

In accordance with a forty-ninth aspect of the present disclosure, the human-powered vehicle component according to any one of the forty-second to forty-eighth aspects is configured so that the gears include a third gear that rotates integrally with the second gear, and the third gear is formed integrally with the shaft of the second gear as a one-piece member. In the human-powered vehicle component according to the forty-ninth aspect, the third gear is formed integrally with the shaft of the second gear as a one-piece member. This reduces the number of elements.

In accordance with a fiftieth aspect of the present disclosure, the human-powered vehicle component according to the forty-ninth aspect further comprises a washer provided between the tooth portion and at least one of the shaft and the third gear in an axial direction of the shaft. The washer includes an engagement portion engaged with the tooth portion and the at least one of the shaft and the third gear. In the human-powered vehicle component according to the fiftieth aspect, the washer reduces stress generated between the first coupler and the second coupler.

In accordance with a fifty-first aspect of the present disclosure, the human-powered vehicle component according to any one of the forty-second to fiftieth aspects is configured so that the shaft is formed by a hollow shaft. In the human-powered vehicle component according to the fifty-first aspect, formation of the shaft by the hollow shaft reduces the weight of the shaft.

In accordance with a fifty-second aspect of the present disclosure, the human-powered vehicle component according to any one of the thirty-ninth to fifty-first aspects is configured so that the thermosetting resin includes at least one of polyaminoamide, phenol, and polyimide. In the human-powered vehicle component according to the fifty-second aspect, the tooth portion having a high accuracy is formed by the thermosetting resin including at least one of polyaminoamide, phenol, and polyimide.

In accordance with a fifty-third aspect of the present disclosure, the human-powered vehicle component according to any one of the thirty-ninth to fifty-second aspects is configured so that the tooth portion includes a reinforcing fiber embedded in the thermosetting resin. In the human-powered vehicle component according to the fifty-third aspect, the reinforcing fiber improves the strength of the tooth portion.

In accordance with a fifty-fourth aspect of the present disclosure, the human-powered vehicle component according to the fifty-third aspect is configured so that the reinforcing fiber includes at least one of a glass fiber, an aramid fiber, and a potassium titanate fiber. In the human-powered vehicle component according to the fifty-fourth aspect, at least one of the glass fiber, the aramid fiber, and the potassium titanate fiber allows the tooth portion to obtain an appropriate strength.

In accordance with a fifty-fifth aspect of the present disclosure, the human-powered vehicle component according to any one of the first to fifty-fourth aspects further comprises a crank axle provided on the housing. The human-powered vehicle component according to the fifty-fifth aspect limits the shortening of life of the human-powered vehicle component including the crank axle.

A gear in accordance with a fifty-sixth aspect of the present disclosure comprises a shaft formed by a metal and a tooth portion provided on an outer peripheral part of the shaft to rotate integrally with the shaft and including a thermosetting resin. The tooth portion is annular and includes an inner peripheral part including a first coupler coupled to the shaft. The shaft includes an outer peripheral part including a second coupler coupled to the first coupler. The first coupler includes a female thread portion. The second coupler includes a male thread portion. In the gear according to the fifty-sixth aspect, the tooth portion of the gear includes a thermosetting resin. This limits the shortening of life. In the gear according to the fifty-sixth aspect, the tooth portion and the shaft are coupled by the female thread portion and the male thread portion. Thus, the tooth portion is stably fixed to the shaft.

In accordance with a fifty-seventh aspect of the present disclosure, the gear according to the fifty-sixth aspect is configured so that the first coupler includes a threadless first part having a larger inner diameter than the female thread portion, the second coupler includes a threadless second part having a larger outer diameter than the male thread portion, and the second part is located proximate to the first part to face the first part or contacts the first part in a radial direction of the tooth portion. In the gear according to the fifty-seventh aspect, the first part and the second part reduces misalignment of the rotational axis of the tooth portion and the rotational axis of the shaft during assembly.

The human-powered vehicle component and the gear of the present disclosure limit the shortening of life.

BRIEF DESCRIPTION OF THE DRAWINGS

Referring now to the attached drawings which form a part of this original disclosure.

DETAILED DESCRIPTION OF EMBODIMENTS

Figure 1:
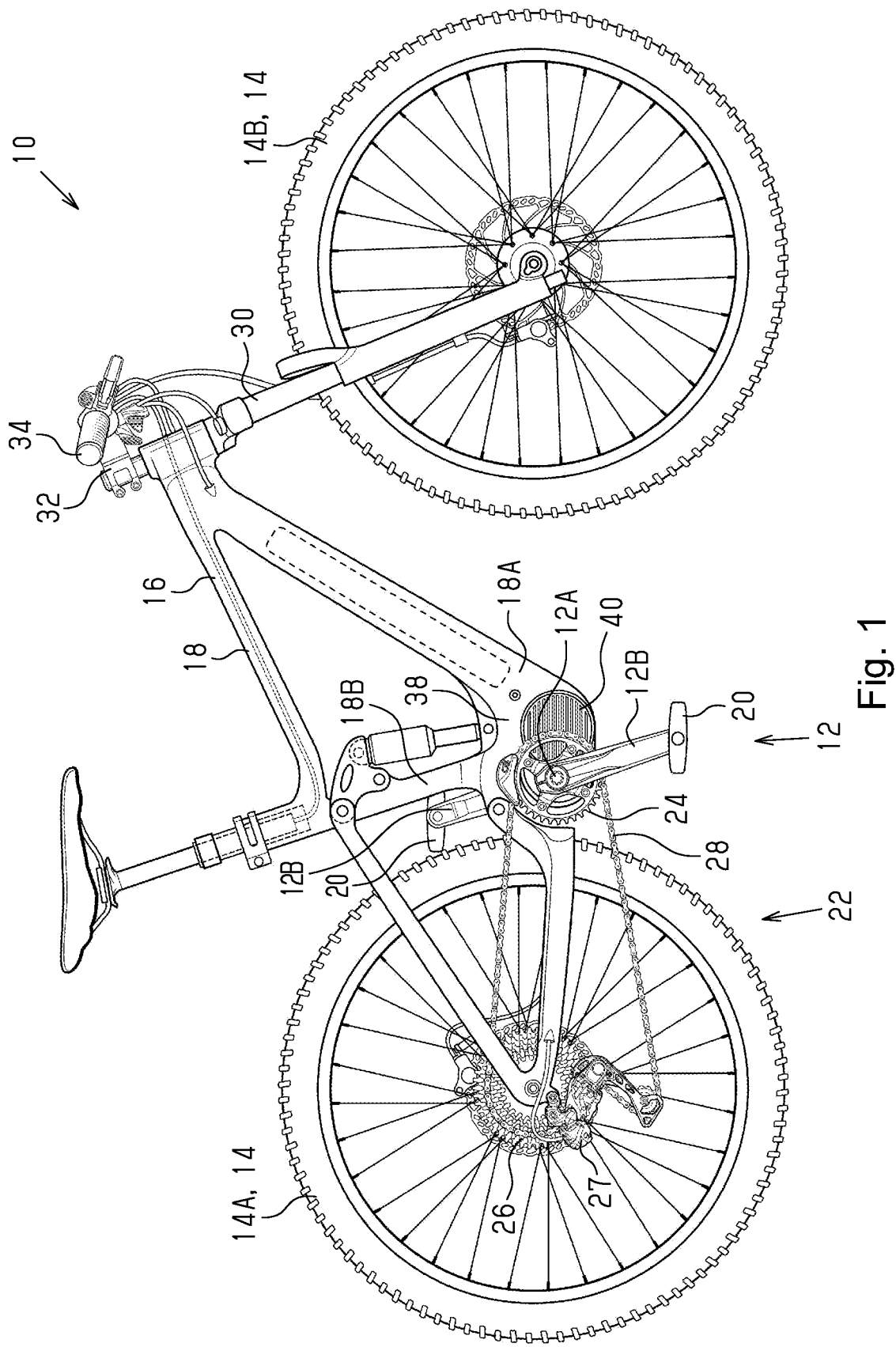
FIG. 1 is a side elevational view of a human-powered vehicle (i.e., a bicycle) including f a human-powered vehicle component in accordance with a first embodiment.
Figure 2:
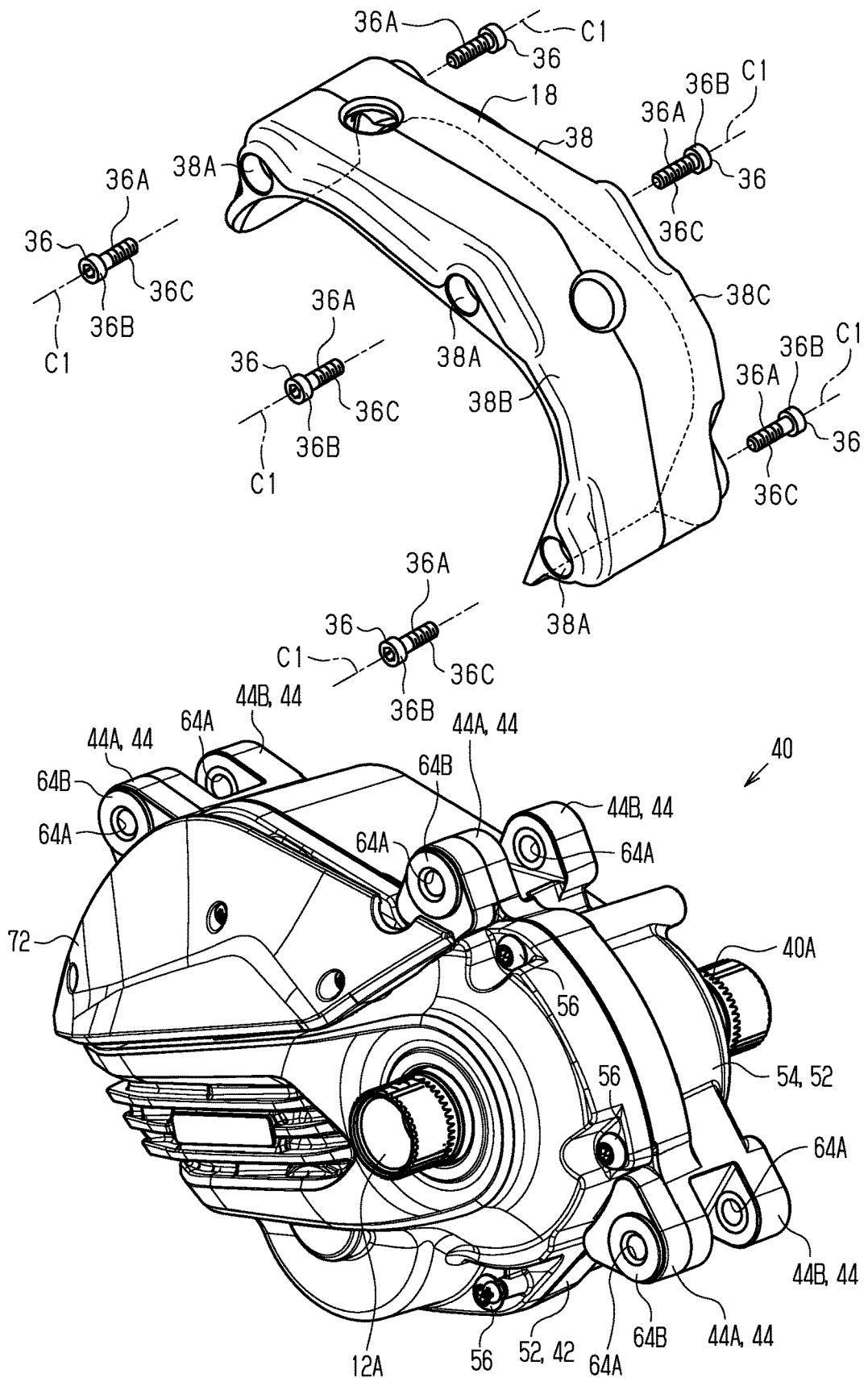
FIG. 2 is an exploded perspective view of the human-powered vehicle component and a support of a frame shown in FIG. 1.
Figure 3:
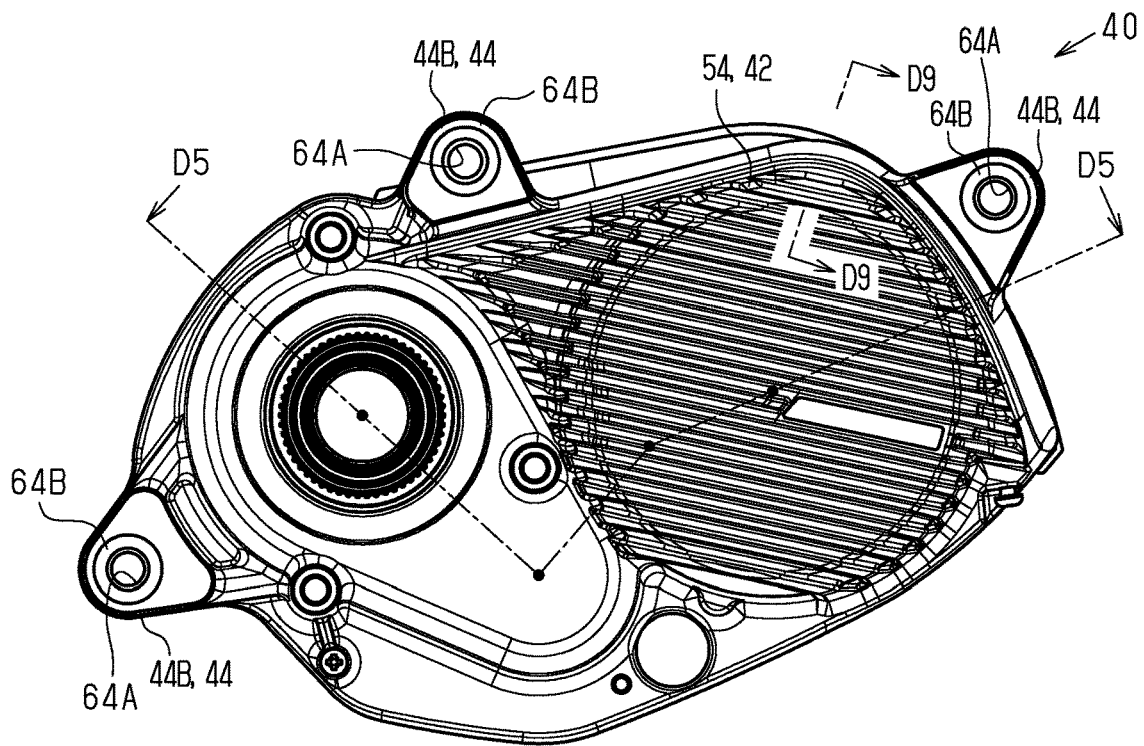
FIG. 3 is a first side elevational view of the human-powered vehicle component shown in FIG. 1.
Figure 4:
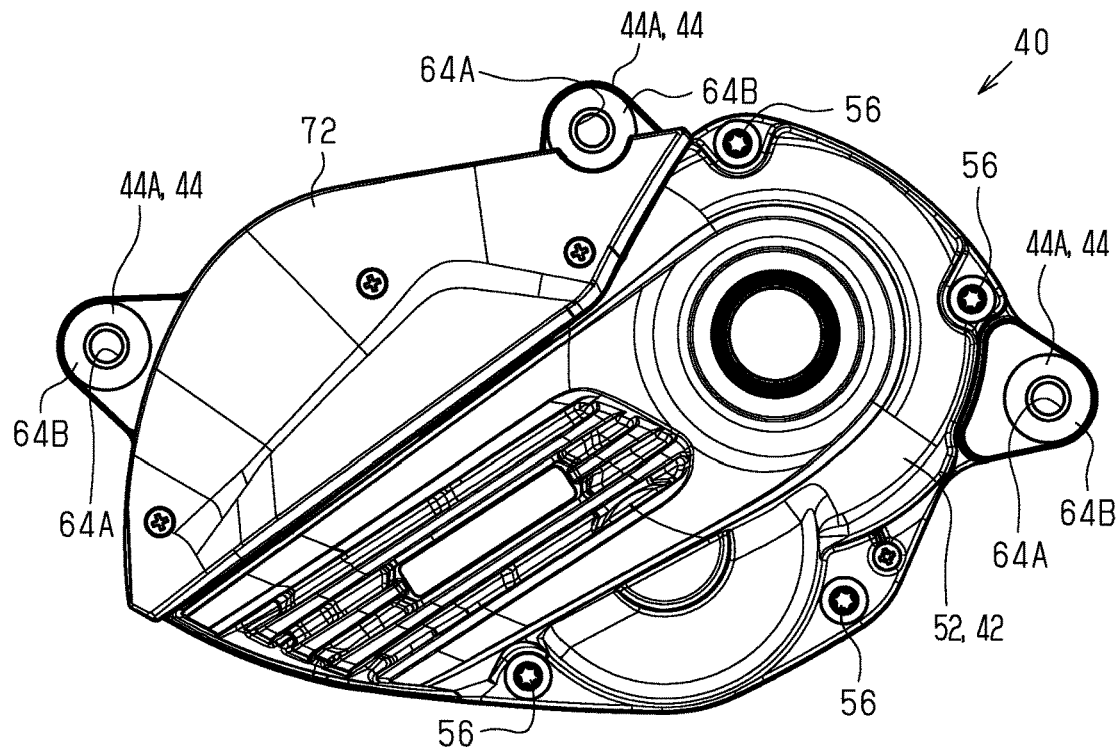
FIG. 4 is a second side elevational view of the human-powered vehicle component shown in FIG. 1.
Figure 5:
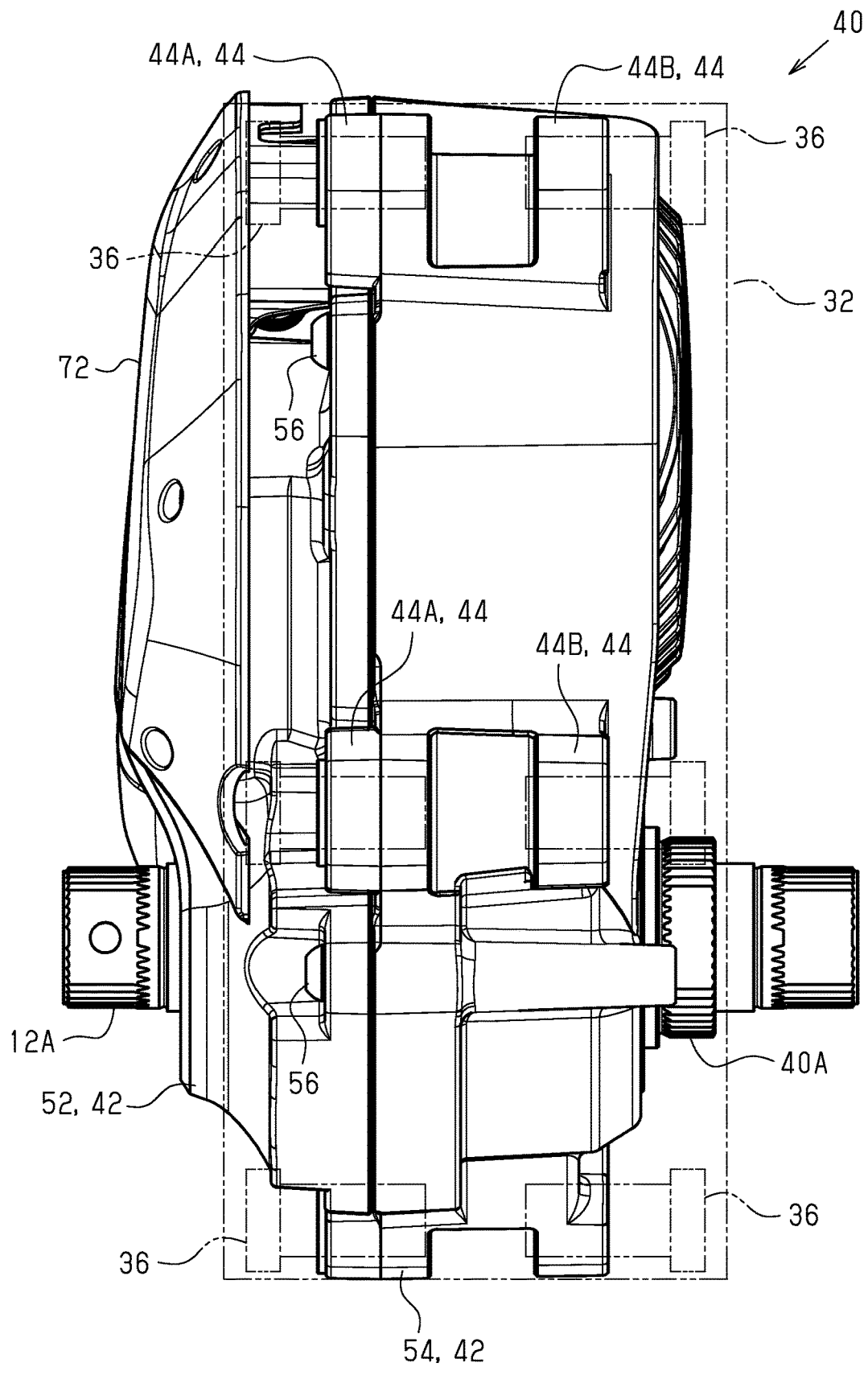
FIG. 5 is a top plan view of the human-powered vehicle component shown in FIG. 1.
Figure 6:
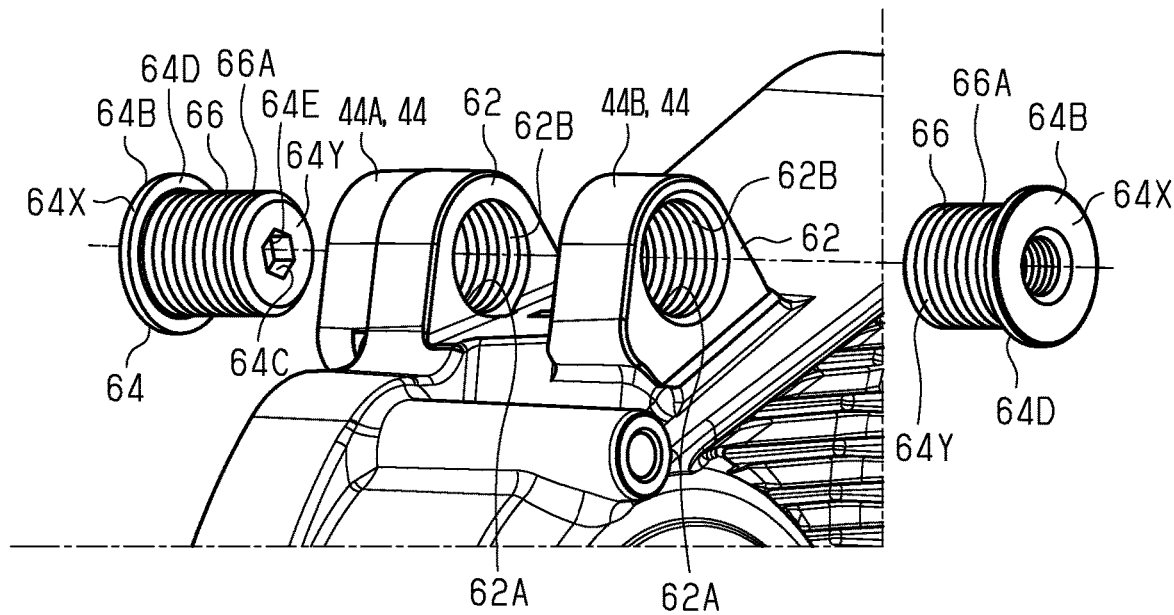
FIG. 6 is an enlarged exploded perspective view showing joints of the human-powered vehicle component shown in FIG. 1.
Figure 7:
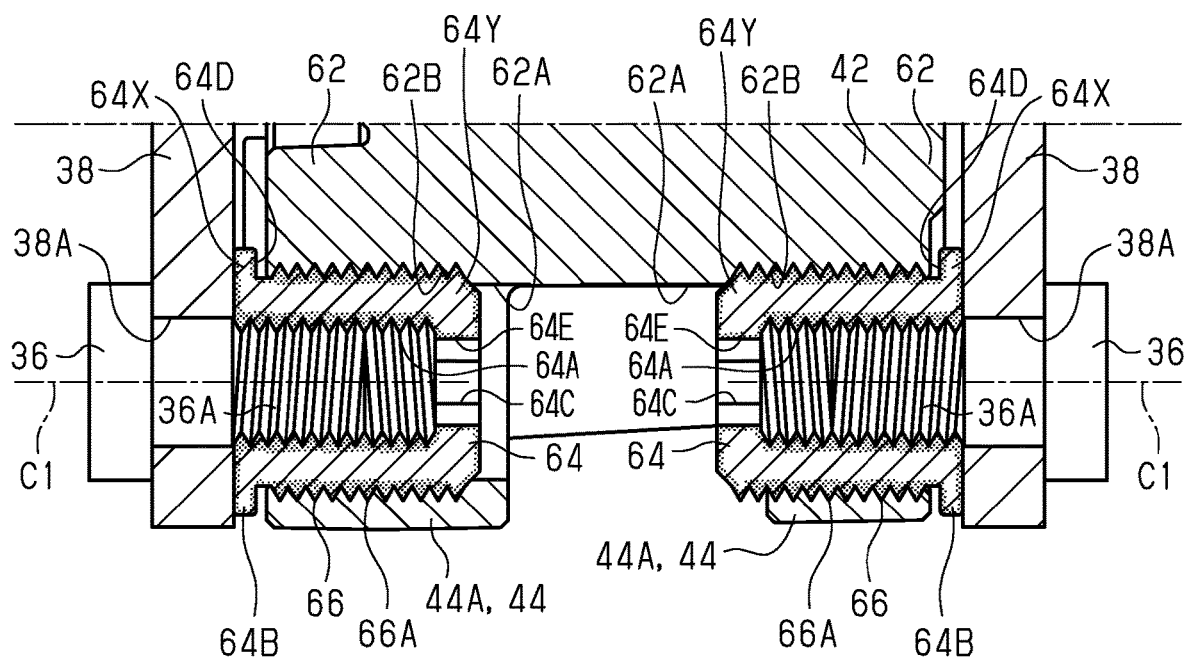
FIG. 7 is an enlarged cross-sectional view showing the joints of the human-powered vehicle component shown in FIG. 6 and the support of the frame in a state in which the joints of the human-powered vehicle component are attached to the support of the frame by fasteners.
Figure 8:
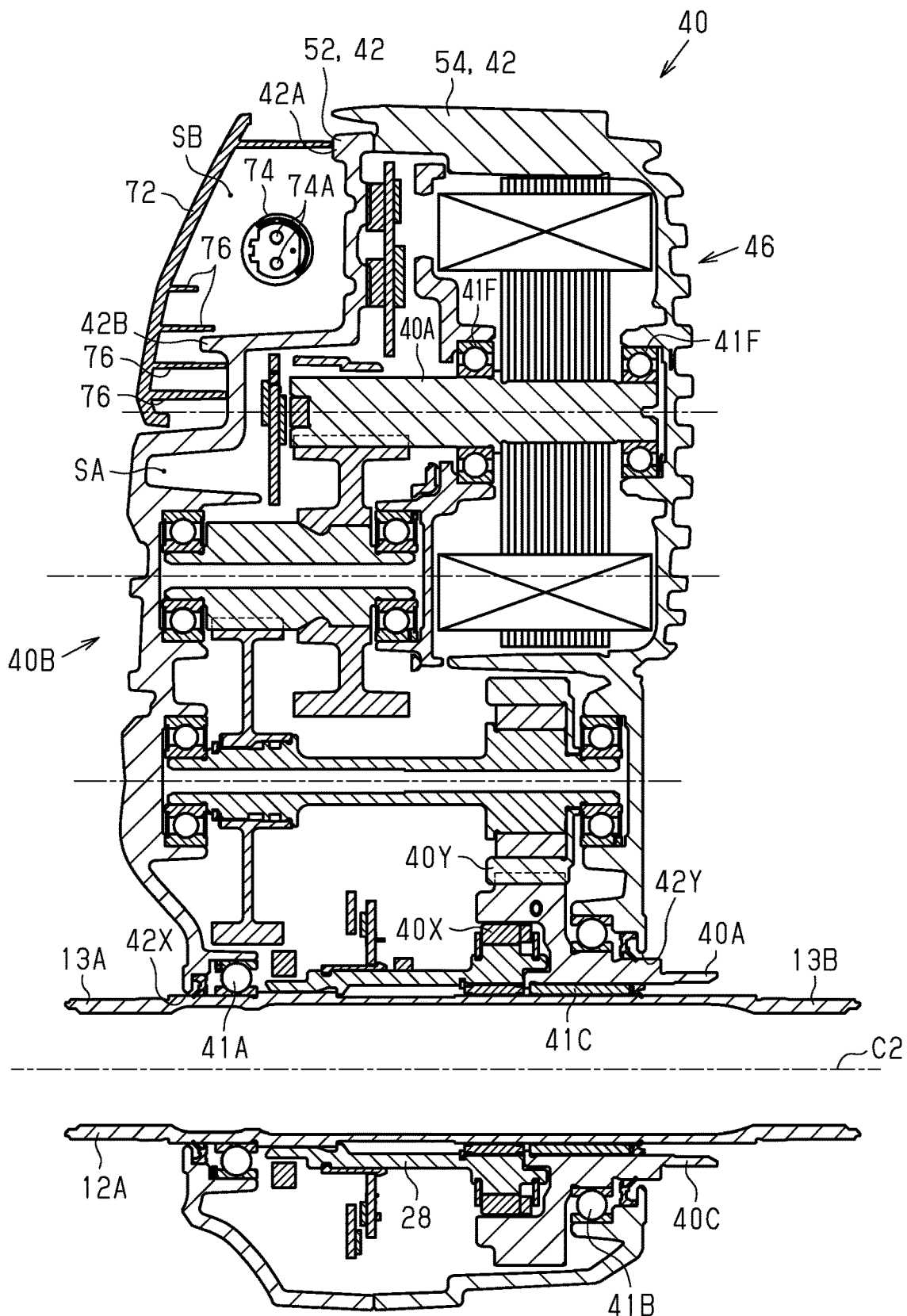
FIG. 8 is a cross-sectional view of the human-powered vehicle component taken along line D5-D5 in FIG. 3.
Figure 9:
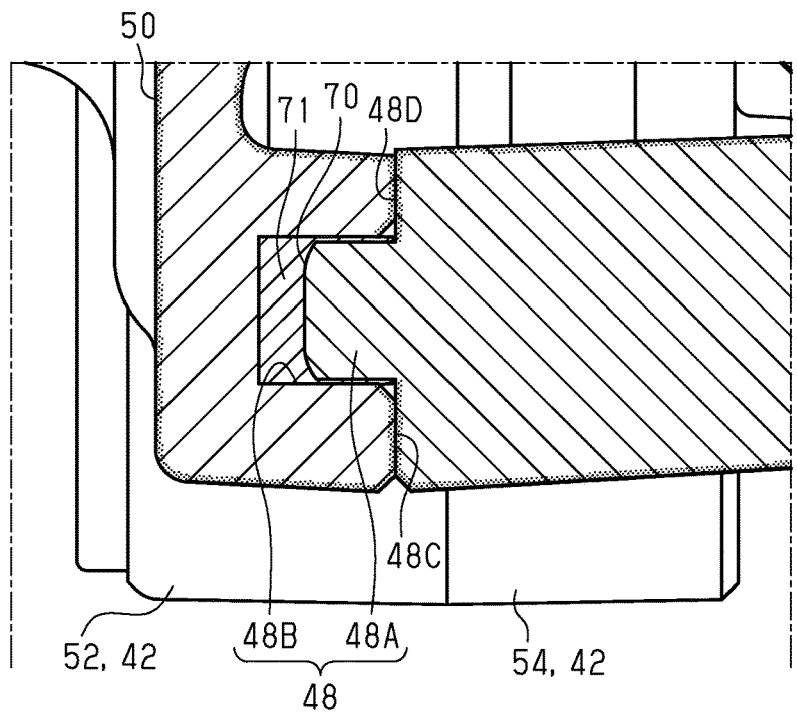
FIG. 9 is a cross-sectional view of the human-powered vehicle component taken along line D9-D9 in FIG. 3.
Figure 10:
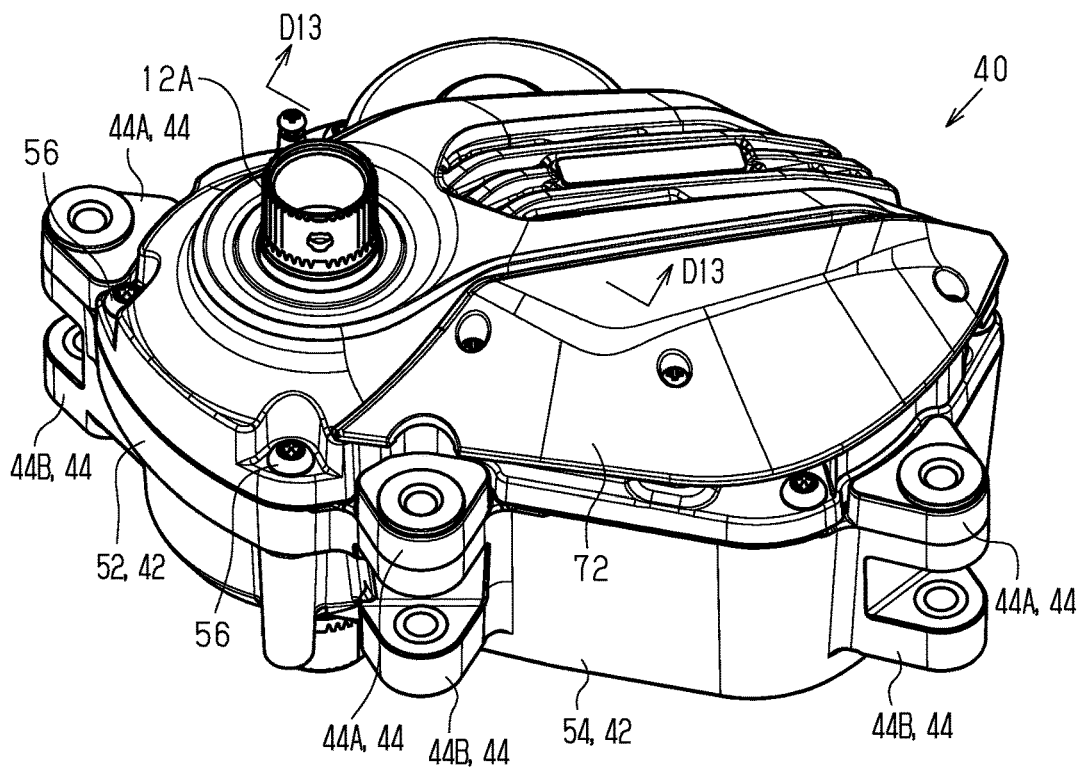
FIG. 10 is a perspective view of the human-powered vehicle component shown in FIG. 1.
Figure 11:
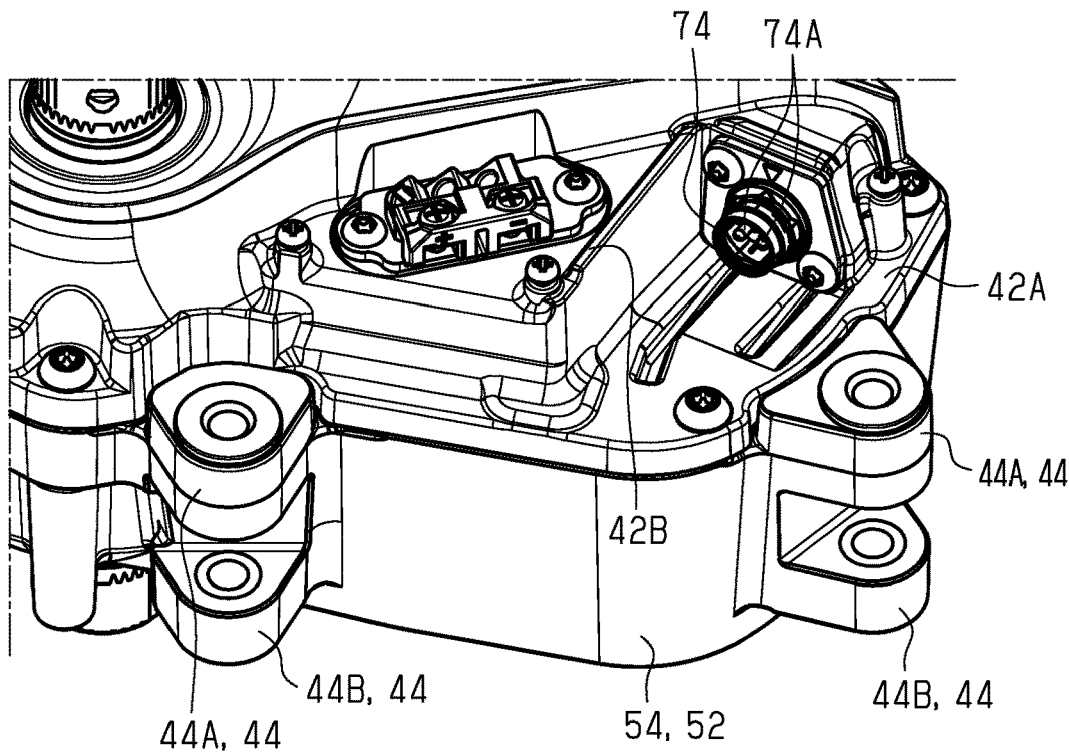
FIG. 11 is an enlarged perspective view of the human-powered vehicle component shown in FIG. 10 with the cover removed.
Figure 12:
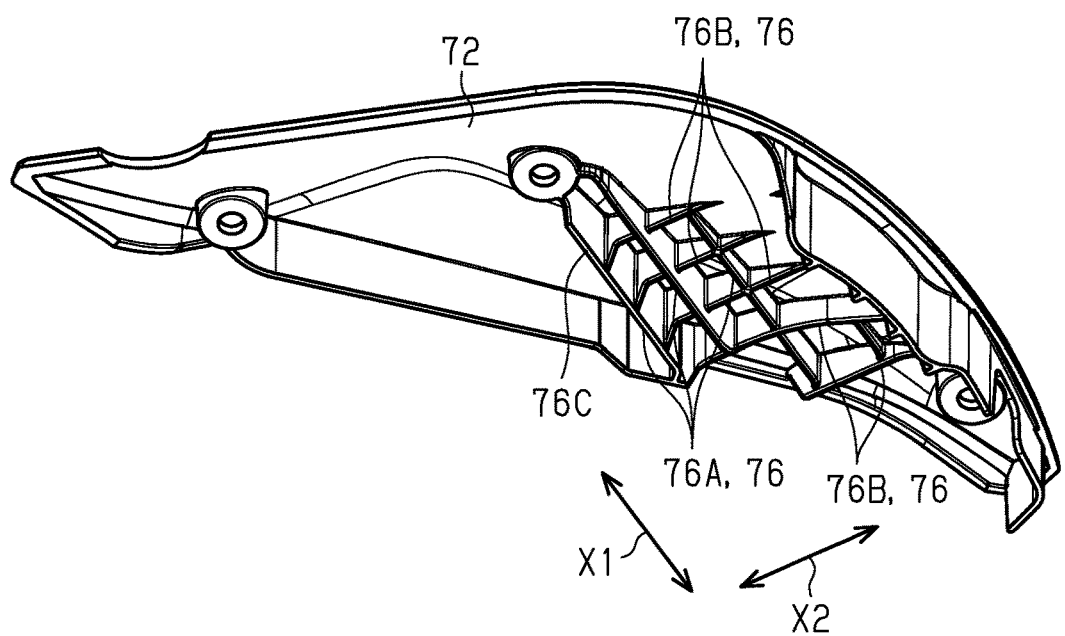
FIG. 12 is a perspective view of the cover shown in FIG. 10 taken from a side of a housing.
Figure 13:
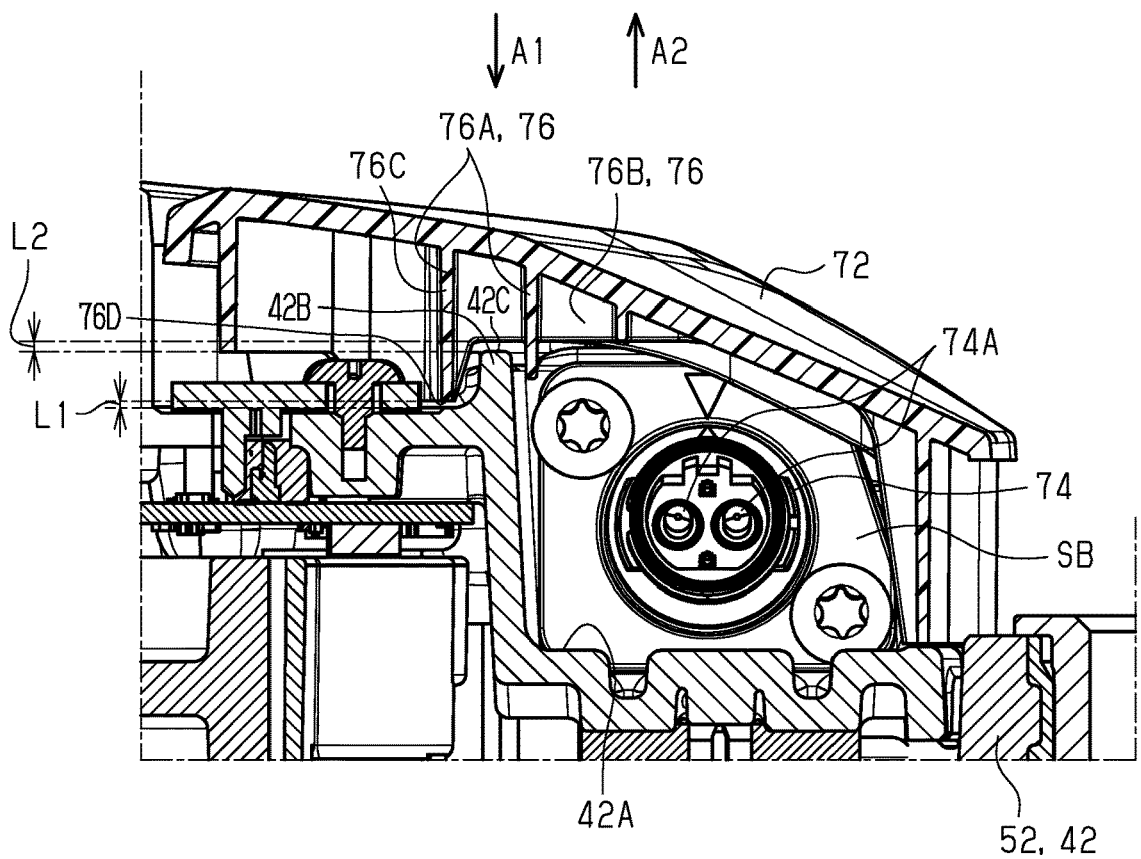
FIG. 13 is a cross-sectional view of the human-powered vehicle component taken along line D13-D13 in FIG. 10.

Selected embodiments will now be explained with reference to the drawings. It will be apparent to those skilled in the human-powered field from this disclosure that the following descriptions of the embodiments are provided for illustration only and not for the purpose of limiting the invention as defined by the appended claims and their equivalents.

First Embodiment

A first embodiment of a human-powered vehicle component 40 for a human-powered vehicle will be described with reference to FIGS. 1 to 13. A human-powered vehicle 10 is a conveyance including at least one wheel and driven by at least a human driving force. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a conveyance including three or more wheels. The human-powered vehicle 10 is not limited to a conveyance configured to be driven only by a human driving force. The human-powered vehicle 10 includes an E-bike that uses driving force of an electric motor in addition to the human driving force for propulsion. The E-bike includes an electric assist bicycle that assists in propulsion with an electric motor. In the embodiments described below, the human-powered vehicle 10 refers to an electric assist bicycle. Since the human-powered vehicle 10 is a bicycle, the human-powered vehicle component 40 is a bicycle component in the illustrated embodiment.

The human-powered vehicle 10 includes a crank 12 into which the human driving force is input. The human-powered vehicle 10 further includes a pair of wheels 14 and a vehicle body 16. The wheels 14 include a rear wheel 14A and a front wheel 14B. The vehicle body 16 includes a frame 18. The crank 12 includes an input rotational shaft 12A rotational relative to the frame 18 and two crank arms 12B respectively provided on opposite axial ends of the input rotational shaft 12A. In the present embodiment, the input rotational shaft 12A is a crank axle. Two pedals 20 are respectively coupled to the two crank arms 12B. The rear wheel 14A is driven in accordance with rotation of the crank 12. The rear wheel 14A is supported by the frame 18. The crank 12 and the rear wheel 14A are coupled by a drive mechanism 22. The drive mechanism 22 includes a first rotary member 24 coupled to the input rotational shaft 12A. The input rotational shaft 12A and the first rotary member 24 can be coupled so as to rotate integrally with each other or can be coupled via a first one-way clutch 40X. The first one-way clutch 40X is configured to rotate the first rotary member 24 forward in a case in which the crank 12 rotates forward and allow the crank 12 to rotate relative to the first rotary member 24 in a case in which the crank 12 rotates rearward. The first rotary member 24 includes a sprocket, a pulley, or a bevel gear. The drive mechanism 22 further includes a second rotary member 26 and a linking member 28. The linking member 28 transmits rotational force of the first rotary member 24 to the second rotary member 26. The linking member 28 includes, for example, a chain, a belt, or a shaft.

The second rotary member 26 is coupled to the rear wheel 14A. The second rotary member 26 includes a sprocket, a pulley, or a bevel gear. Preferably, a second one-way clutch is provided between the second rotary member 26 and the rear wheel 14A. The second one-way clutch is configured to rotate the rear wheel 14A forward in a case in which the second rotary member 26 rotates forward and allow the second rotary member 26 to rotate relative to the rear wheel 14A in a case in which the second rotary member 26 rotates rearward. In the present embodiment, the first rotary member 24 includes only one sprocket, and the second rotary member 26 includes multiple sprockets. However, the first rotary member 24 can include multiple sprockets, and the second rotary member 26 can include only one sprocket. In a case in which at least one of the first rotary member 24 and the second rotary member 26 includes multiple sprockets, the human-powered vehicle 10 further includes a derailleur that moves a chain between the sprockets. In the present embodiment, a rear derailleur 27 is provided on the frame 18.

The front wheel 14B is attached to the frame 18 by a front fork 30. A handlebar 34 is coupled to the front fork 30 by a stem 32. In the present embodiment, the rear wheel 14A is coupled to the crank 12 by the drive mechanism 22. However, at least one of the rear wheel 14A and the front wheel 14B can be coupled to the crank 12 by the drive mechanism 22.

The human-powered vehicle component 40 includes a housing 42 and a joint 44. The joint 44 is provided on the housing 42 and configured to be attached to a support 38 of the human-powered vehicle 10 by fasteners 36. The human-powered vehicle 10 further includes the support 38. The support 38 is provided, for example, on the frame 18. The support 38 can be formed integrally with the frame 18 as a one-piece member or can be formed separately from the frame 18 and attached to the frame 18. The support 38 can be part of the frame 18. The support 38 is provided, for example, on a portion of the frame 18 to that is connected to a down tube 18A and a seat tube 18B.

Preferably, the human-powered vehicle component 40 includes the housing 42 and a motor 46 at least partially accommodated in the housing 42. Preferably, the motor 46 is configured to apply propulsion force to the human-powered vehicle 10. The motor 46 includes one or more electric motors. The motor 46 is configured to transmit rotational force to at least one of the first rotary member 24, the linking member 28, and the rear wheel 14A. In the present embodiment, the motor 46 is configured to transmit rotational force to the first rotary member 24. Preferably, the human-powered vehicle component 40 includes the input rotational shaft 12A. The input rotational shaft 12A is provided on the housing 42. The housing 42 is, for example, detachably attached to the support 38. The motor 46 includes an output shaft 46A. The output shaft 46A of the motor 46 is supported by two sixth bearings 41F on the housing 42 so as to rotate relative to the housing 42. The sixth bearing 41F can be a ball bearing, a roller bearing, or a plain bearing. The motor 46 is provided on the housing 42. The motor 46 can be entirely accommodated in the housing 42. A drive unit for a human-powered vehicle includes the motor 46 and the housing 42. Preferably, a third one-way clutch 40Y is provided on a power transmission path between the motor 46 and the input rotational shaft 12A to restrict transmission of rotational force of the input rotational shaft 12A to the motor 46 in a case in which the input rotational shaft 12A is rotated in a direction in which the human-powered vehicle 10 travels forward. The first one-way clutch 40X, the second one-way clutch, and the third one-way clutch 40Y include one of a roller clutch, a pawl-ratchet clutch, and a sprag clutch.

The human-powered vehicle component 40 further includes an output portion 40A connected to the first rotary member 24. The first rotary member 24 is, for example, detachably attached to the output portion 40A. In the present embodiment, the input rotational shaft 12A is connected to the output portion 40A by the first one-way clutch 40X. The input rotational shaft 12A can be connected so as to rotate integrally with the output portion 40A in both directions about a rotational axis of the input rotational shaft 12A. The output portion 40A is, for example, substantially round tubular and is coaxial with the input rotational shaft 12A. The output portion 40A is, for example, located parallel to the input rotational shaft 12A but can be configured not to be coaxial with the input rotational shaft 12A. The output portion 40A has an outer peripheral surface including a connecting portion 40C connected to the first rotary member 24. The connecting portion 40C includes at least one spline. Preferably, the human-powered vehicle component 40 further includes a speed reducer 40B coupled to the output shaft of the motor 46 to reduce the speed of rotation and output the rotation. The speed reducer 40B is provided on the housing 42. Preferably, the speed reducer 40B is accommodated in the housing 42. Rotational force of the motor 46 is transmitted to the speed reducer 40B. In the present embodiment, rotational force of the speed reducer 40B is transmitted to the output portion 40A. The rotational force of the speed reducer 40B can be transmitted to the linking member 28 via, for example, a sprocket, a pulley, or a gear without being transmitted via the first rotary member 24. The rotational force of the speed reducer 40B can be transmitted to the rear wheel 14A via, for example, a roller without being transmitted via the first rotary member 24 and the linking member 28. The type of the speed reducer 40B is not particularly limited. The speed reducer 40B includes, for example, at least one of a pair of gears engaged with each other, a planetary gear mechanism, a pair of sprockets and a chain, and a pair of pulleys and a belt. The speed reducer 40B can be omitted.

Preferably, the human-powered vehicle component 40 includes at least one joint 44. In the present embodiment, the at least one joint 44 includes multiple joints 44. Preferably, the joints 44 include at least one first joint 44A and at least one second joint 44B. In the present embodiment, the number of first joints 44A is equal to the number of second joints 44B. The number of first joints 44A can differ from the number of second joints 44B. In the present embodiment, the at least one first joint 44A includes multiple first joints 44A, and the at least one second joint 44B includes multiple second joints 44B. The first joints 44A are arranged on an outer peripheral part of the housing 42 at intervals about a rotational axis C2 of the input rotational shaft 12A. The second joints 44B are arranged on the outer peripheral part of the housing 42 at intervals about the rotational axis C2 of the input rotational shaft 12A. For example, the at least one first joint 44A is aligned with the at least one second joint 44B in a direction parallel to the rotational axis C2 of the input rotational shaft 12A. In the present embodiment, the first joints 44A are respectively aligned with the second joints 44B in a direction parallel to the rotational axis C2 of the input rotational shaft 12A. The at least one first joint 44A is spaced apart from the at least one second joint 44B in a direction parallel to the rotational axis C2 of the input rotational shaft 12A.

The fasteners 36 include bolts or rivets. Each of the fasteners 36 includes a head 36B and a shaft 36C formed integrally with the head 36B as a one-piece member. The fastener 36 has a center axis C1. The head 36B and the shaft 36C are arranged along the center axis C1. The head 36B and the shaft 36C are substantially cylindrical. The head 36B has a larger maximum diameter than the shaft 36C. Preferably, the fastener 36 includes a male thread portion 36A. The male thread portion 36A is provided on the shaft 36C. The male thread portion 36A can be provided on the entirety or part of the shaft 36C in a direction extending along the center axis C1. Through holes 38A extend through the support 38 at positions corresponding to the joints 44. Each of the through holes 38A is shaped in conformance with a cylindrical shape. The diameter of the through hole 38A is smaller than the maximum diameter of the head 36B and larger than the maximum diameter of the shaft 36C. The male thread portion 36A is inserted into the through hole 38A of the support 38 and fastened to a second female thread portion 64A formed in the joint 44. As a result, a portion of the support 38 is held between the human-powered vehicle component 40 and the head 36B of the fastener 36, and the human-powered vehicle component 40 is attached to the support 38. Preferably, the support 38 includes two walls 38B and 38C spaced apart from each other in a direction parallel to a width-wise direction of the human-powered vehicle 10. The at least one joint 44, the first joint 44A, and the second joint 44B are provided between the walls 38B and 38C. The through holes 38A are formed in each of the walls 38B and 38C. The first joint 44A is coupled to the wall 38B. The second joint 44B is coupled to the wall 38C. In a case in which the human-powered vehicle component 40 is attached to the support 38 by the fasteners 36, the direction in which a fastener 36 is inserted into the first joint 44A is opposite to the direction in which a fastener 36 is inserted into the second joint 44B. The fasteners 36 are formed of, for example, an aluminum alloy or a stainless steel alloy. In the present embodiment, the through holes 38A extend in a direction parallel to the rotational axis C2 of the input rotational shaft 12A. The through holes 38A can extend in a direction intersecting a direction parallel to the rotational axis C2 of the input rotational shaft 12A. The direction intersecting a direction parallel to the rotational axis C2 of the input rotational shaft 12A includes, for example, a direction orthogonal to a direction parallel to the rotational axis C2 of the input rotational shaft 12A.

Preferably, the human-powered vehicle component 40 includes the housing 42, a positioner 48, and an insulator 50. The housing 42 includes a first housing portion 52 and a second housing portion 54 that defines an accommodation cavity SA with the first housing portion 52. Preferably, the first housing portion 52 and the second housing portion 54 includes a magnesium alloy. The magnesium alloy is, for example, AZ91D. The joint 44 is provided on at least one of the first housing portion 52 and the second housing portion 54. In the present embodiment, the joint 44 is provided on the first housing portion 52.

The housing 42 rotationally supports the input rotational shaft 12A. The housing 42 includes a first hole 42X and a second hole 42Y into which the input rotational shaft 12A is inserted. The first hole 42X and the second hole 42Y connect the space surrounded by the housing 42 and the external space of the housing 42. The input rotational shaft 12A includes an axial first end 13A projecting from the first hole 42X to the external space of the housing 42. The input rotational shaft 12A includes an axial second end 13B projecting from the second hole 42Y to the external space of the housing 42. The first hole 42X receives a first bearing 41A. The input rotational shaft 12A is supported by the first bearing 41A on the housing 42 so as to rotate relative to the housing 42. The first bearing 41A can be a ball bearing, a roller bearing, or a plain bearing. The rotational axis of the output portion 40A is aligned with the rotational axis C2 of the input rotational shaft 12A. The output portion 40A is provided on an outer peripheral part of the input rotational shaft 12A about the rotational axis. The second hole 42Y receives a second bearing 41B. The output portion 40A is provided on the housing 42 and is allowed to rotate relative to the housing 42 by the second bearing 41B. The output portion 40A is substantially round tubular. The second bearing 41B is arranged on an outer peripheral part of the output portion 40A. Preferably, a third bearing 41C is provided between an inner peripheral part of the output portion 40A and the outer peripheral part of the input rotational shaft 12A. The output portion 40A rotationally supports the input rotational shaft 12A via the third bearing 41C. The second bearing 41B can be a ball bearing, a roller bearing, or a plain bearing. The third bearing 41C includes, for example, a needle bearing or a sleeve. At least part of the second bearing 41B overlaps the third bearing 41C in a direction orthogonal to the rotational axis C2.

The first housing portion 52 includes a second side surface of the housing 42 in a direction parallel to the rotational axis C2 of the input rotational shaft 12A. The second housing portion 54 includes a first side surface of the housing 42 in a direction parallel to the rotational axis C2 of the input rotational shaft 12A. The first housing portion 52 and the second housing portion 54 are joined with each other, for example, by joining members 56. The joining members 56 are, for example, bolts or rivets. One of the first housing portion 52 and the second housing portion 54 is provided with, for example, a through hole into which the shaft of a bolt is inserted. The other of the first housing portion 52 and the second housing portion 54 is provided with, for example, a female thread portion that engages with the bolt. The first housing portion 52 and the second housing portion 54 can be coupled to each other by, for example, an adhesive.

The insulator 50 is provided between the first housing portion 52 and the second housing portion 54 to electrically insulate the first housing portion 52 from the second housing portion 54. The insulator 50 is provided on surfaces of the first housing portion 52 and the second housing portion 54. The insulator 50 includes, for example, a metal oxide film formed on a surface of the base element of the first housing portion 52 and the second housing portion 54. The metal oxide film includes, for example, at least one of an anodic oxide film formed by anodizing the base element of the first housing portion 52 and the second housing portion 54 and a plating film formed by plating the base element of the first housing portion 52 and the second housing portion 54. In the first housing portion 52 and the second housing portion 54, a paint film can be applied to at least part of the anodic oxide film or the plating film. Preferably, the paint film is electrically insulative. In a case in which the insulator 50 includes at least one of the metal oxide film and the paint film, at least one of the metal oxide film and the paint film can be provided on the entire surface of the first housing portion 52 and the entire surface of the second housing portion 54 in addition to the surfaces located between the first housing portion 52 and the second housing portion 54. The insulator 50 can include at least one of waterproof grease, waterproof sealant, and a paint film instead of or in addition to the metal oxide film.

The joint 44 includes a metal base 62, a metal coupling portion 64, and an intermediate portion 66. The coupling portion 64 is provided on the base 62 and is configured to be coupled to the fastener 36. The intermediate portion 66 is provided between the coupling portion 64 and the base 62. Preferably, the base 62 includes a hole 62A. In the present embodiment, the hole 62A is a through hole. The hole 62A can be a blind hole. At least part of the coupling portion 64 and at least part of the intermediate portion 66 are located in the hole 62A. The base 62 includes a first female thread portion 62B that forms the hole 62A. Preferably, the intermediate portion 66 includes at least part of a male thread portion 66A configured to be joined with the first female thread portion 62B. The coupling portion 64 is, for example, substantially round tubular. The coupling portion 64 can be, for example, substantially round tubular and have a closed end. The coupling portion 64 includes the second female thread portion 64A configured to be coupled to the fastener 36. The intermediate portion 66 is provided on an outer peripheral part of the coupling portion 64. The intermediate portion 66 is substantially round tubular. The second female thread portion 64A is provided on an inner peripheral part of the coupling portion 64. The second female thread portion 64A is configured to be coupled to the male thread portion 36A of the fastener 36. One of the first female thread portion 62B and the second female thread portion 64A is a right-hand thread. The other of the first female thread portion 62B and the second female thread portion 64A is a left-hand thread.

Preferably, the coupling portion 64 includes a flange 64B. In a state in which the joint 44 is attached to the support 38 of the human-powered vehicle 10 by the fastener 36, the flange 64B is located between the base 62 and the support 38. The flange 64B is greater in size than the diameter of the hole 62A. In a state in which part of the coupling portion 64 is located in the hole 62A, the flange 64B is located outside the hole 62A. The flange 64B is configured to contact the support 38 in a state in which the human-powered vehicle component 40 is attached to the support 38 by the fastener 36. The contact of the flange 64B with the support 38 restricts a contact of the support 38 with the base 62. Preferably, the intermediate portion 66 is provided on the entire region of the outer peripheral part of the coupling portion 64 that is located in the hole 62A. Preferably, the intermediate portion 66 is also provided on a side surface 64D of the flange 64B that faces the base 62.

Preferably, the intermediate portion 66 is non-removable provided on the coupling portion 64 in a non-removable manner. For example, the intermediate portion 66 and the coupling portion 64 can be formed in non-removable manner by performing a surface finishing on a one-piece member. The coupling portion 64 and the intermediate portion 66 can be formed by separate members and can be formed in a non-removable manner, for example, by insert molding or an adhesion.

The base 62 includes a first material having a first standard electrode potential. The first material includes an alloy. Preferably, the first material includes a magnesium alloy. Preferably, in the present embodiment, the base 62 includes a magnesium alloy. At least part of the housing 42 is formed integrally with the base 62 as a one-piece member. The first female thread portion 62B of the base 62 can have an inner peripheral part including at least one of a metal oxide film and a paint film.

The coupling portion 64 includes a second material having a second standard electrode potential. The second material includes, for example, an alloy. Preferably, the second material includes an aluminum alloy. The aluminum alloy is, for example, ADC12. The second material can include an iron alloy instead of an aluminum alloy. The intermediate portion 66 is formed by a third material or a fourth material. The third material has a third standard electrode potential. A difference of the third standard electrode potential and the first standard electric potential and a difference of the third standard electrode potential and the second standard electrode potential are each smaller than a difference of the first standard electrode potential and the second standard electrode potential. The fourth material is electrically insulative. More preferably, the intermediate portion 66 is formed by the fourth material. Preferably, the first standard electrode potential differs from the second standard electrode potential.

In the present embodiment, the intermediate portion 66 is formed by the fourth material. The fourth material includes a metal oxide. Preferably, the metal oxide includes aluminum oxide. The coupling portion 64 and the intermediate portion 66 are manufactured by, for example, forming a substantially round tubular base element by the second material and forming a metal oxide film on an outer peripheral part of the base element. The metal oxide film that forms the intermediate portion 66 includes, for example, an anodic oxide film or a plating film. The thickness of the intermediate portion 66 is greater than or equal to one micrometer and less than or equal to thirty micrometers. In a case in which the metal oxide film is an anodic oxide film, it is preferred that the thickness of the intermediate portion 66 is greater than or equal to three micrometers and less than or equal to ten micrometers. In a case in which the metal oxide film is a plating film, it is preferred that the thickness of the intermediate portion 66 is greater than or equal to ten micrometers and less than or equal to twenty micrometers.

The coupling portion 64 can include a fifth material in addition to the second material. Preferably, an electrical insulator can be provided on an outer surface of the coupling portion 64 that is not in contact with the intermediate portion 66. The electrical insulator of the coupling portion 64 is formed by the fifth material. Preferably, the fifth material is the same as the fourth material. The electrical insulator of the coupling portion 64 is formed by, for example, forming a substantially round tubular base element by the second material and forming a metal oxide film on an inner peripheral part of the base element. The metal oxide film includes, for example, an anodic oxide film or a plating film. Preferably, the thickness of the electrical insulator of the coupling portion 64 is greater than or equal to one micrometer and less than or equal to thirty micrometers. In a case in which the metal oxide film is an anodic oxide film, it is preferred that the thickness of the electrical insulator of the coupling portion 64 is greater than or equal to three micrometers and less than or equal to ten micrometers. In a case in which the metal oxide film is a plating film, it is preferred that the thickness of the electrical insulator of the coupling portion 64 is greater than or equal to ten micrometers and less than or equal to twenty micrometers. The intermediate portion 66 and the electrical insulator of the coupling portion 64 are, for example, simultaneously formed in a manufacturing process.

In the portion of the coupling portion 64 that is not in contact with the intermediate portion 66, the entire surface can be formed by a metal oxide film. The surface of the inner peripheral part of the coupling portion 64 does not have to be formed by a metal oxide film. The coupling portion 64 can be formed by, for example, only the second material.

Preferably, the coupling portion 64 includes a tool engagement portion 64C configured to be engaged with a tool. The tool engagement portion 64C is provided, for example, on at least one of a first end 64X and a second end 64Y of the coupling portion 64 in a direction in which the second female thread portion 64A extends. The flange 64B is provided on the first end 64X of the coupling portion 64. Preferably, the tool engagement portion 64C is provided on the second end 64Y of the coupling portion 64. In a case in which the coupling portion 64 is substantially round tubular, the tool engagement portion 64C can be provided on the inner peripheral part or the outer peripheral part of the coupling portion 64. In a case in which the coupling portion 64 is substantially tubular and has a closed end, the tool engagement portion 64C can be provided on the inner peripheral part, the outer peripheral part, or the closed end of the coupling portion 64. Preferably, the tool engagement portion 64C includes a hole 64E that conforms to the contour of a first tool. In a case in which the coupling portion 64 is substantially round tubular and the hole 64E is formed in the second end 64Y, the maximum diameter of the hole 64E is not particularly limited as long as the maximum diameter of the hole 64E is configured to be smaller than the diameter of the coupling portion 64. In a case in which the hole 64E is formed in the first end 64X of the coupling portion 64, the maximum diameter of the hole 64E is configured to be smaller than the diameter of the coupling portion 64 and the minimum diameter of the hole 64E is configured to be larger than the inner diameter of the second female thread portion 64A. In a case in which the coupling portion 64 is substantially tubular and has a closed end provided on the second end 64Y and the hole 64E is formed at an outer side of the closed end, the maximum diameter of the hole 64E is not particularly limited as long as the maximum diameter of the hole 64E is configured to be smaller than the diameter of the coupling portion 64. In a case in which the coupling portion 64 is substantially tubular and has a closed end provided on the second end 64Y and the hole 64E is formed at an inner side of the closed end, the maximum diameter of the hole 64E is configured to be smaller than the inner diameter of the second female thread portion 64A. The first tool includes, for example, an Allen key, a hexalobular wrench, or a screwdriver. The tool engagement portion 64C can be provided on the outer peripheral part of the coupling portion 64. For example, in a case in which the tool engagement portion 64C is provided on the outer peripheral part of the coupling portion 64 at the second end 64Y of the coupling portion 64, the second end 64Y of the coupling portion 64 is configured to have a smaller maximum diameter than other parts of the coupling portion 64. The contour of the second end 64Y of the coupling portion 64 conforms to a second tool. For example, in a case in which the tool engagement portion 64C is provided on the outer peripheral part of the coupling portion 64 at the flange 64B of the first end 64X of the coupling portion 64, the contour of the flange 64B conforms to the second tool. The second tool includes, for example, an open-end wrench and a box-end wrench. A tool is engaged with the tool engagement portion 64C and changes the joint state of the male thread portion 66A of the intermediate portion 66 and the first female thread portion 62B of the base 62. This adjusts positions of the coupling portion 64 and the intermediate portion 66 relative to the base 62. Even in a case in which the support 38 is spaced apart from the base 62 in a direction in which the through hole 38A extends, the positions of the coupling portion 64 and the intermediate portion 66 relative to the base 62 are adjusted so that the coupling portion 64 becomes closer to the support 38. This limits application of an overload to the support 38 in a case in which the fastener 36 is joined with the joint 44.

The positioner 48 is provided on each of the first housing portion 52 and the second housing portion 54 and is configured to relatively position the first housing portion 52 and the second housing portion 54. Preferably, the positioner 48 includes a first projection 48A provided on one of the first housing portion 52 and the second housing portion 54 and a first recess 48B provided in the other one of the first housing portion 52 and the second housing portion 54 to receive at least part of the first projection 48A. The one of the first housing portion 52 and the second housing portion 54 is electrically connected to the first projection 48A. The other one of the first housing portion 52 and the second housing portion 54 is electrically connected to the first recess 48B. The one of the first housing portion 52 and the second housing portion 54 is formed integrally with the first projection 48A as a one-piece member. The other one of the first housing portion 52 and the second housing portion 54 is formed integrally with the first recess 48B as a one-piece member. The positioner 48 is provided, for example, on a first facing surface 48C of the first housing portion 52 that is in contact with the second housing portion 54 directly or via a seal member. The positioner 48 is also provided, for example, on a second facing surface 48D of the second housing portion 54 that is in contact with the first housing portion 52 directly or a via a seal member. The first facing surface 48C is provided on an outer peripheral part of the first housing portion 52 around the input rotational shaft 12A. The second facing surface 48D is provided on an outer peripheral part of the second housing portion 54 around the input rotational shaft 12A. The first projection 48A projects from the one of the first housing portion 52 and the second housing portion 54 toward the other one of the first housing portion 52 and the second housing portion 54. The first recess 48B is recessed from the one of the first housing portion 52 and the second housing portion 54 toward the other one of the first housing portion 52 and the second housing portion 54. In the present embodiment, the first facing surface 48C and the second facing surface 48D are substantially orthogonal to a direction parallel to the rotational axis C2 of the input rotational shaft 12A. The first projection 48A and the first recess 48B extend in a direction parallel to the rotational axis C2 of the input rotational shaft 12A. The first facing surface 48C and the second facing surface 48D can be inclined with respect to a direction parallel to the rotational axis C2 of the input rotational shaft 12A. The first projection 48A and the first recess 48B can be inclined with respect to a direction parallel to the rotational axis C2 of the input rotational shaft 12A. In a state in which the first projection 48A is fitted to the first recess 48B, the first housing portion 52 and the second housing portion 54 are relatively positioned. This facilitates the joining of the first housing portion 52 and the second housing portion 54 by the joining member 56.

Preferably, in the positioner 48, the first housing portion 52 is electrically connected to the second housing portion 54. At least part of the surface of the first projection 48A and at least part of the surface of the first recess 48B are electrically conductive. Preferably, the entire surface of the first projection 48A and at least part of an inner surface of the first recess 48B are electrically conductive. For example, the metal oxide film is not formed on at least part of the surface of the first projection 48A and at least part of the surface of the first recess 48B. In a case in which at least one of the metal oxide film and the paint film is formed on the surface of the base element of the first housing portion 52 and the second housing portion 54, for example, the at least one of the metal oxide film and the paint film is simultaneously formed on the surfaces of the first projection 48A and the first recess 48B. At least part of the surface of the first projection 48A and at least part of the surface of the first recess 48B can be formed by scraping the metal oxide film and the paint film from the surface of the first projection 48A and the surface of the first recess 48B. In a case in which at least one of the metal oxide film and the paint film is formed on the surface of the base element of the first housing portion 52 and the second housing portion 54, for example, at least part of the surface of the first projection 48A and at least part of the surface of the first recess 48B can be covered by a cover member to avoid formation of the metal oxide film and the paint film.

The first projection 48A and the first recess 48B can be formed separately from the first housing portion 52 and the second housing portion 54, respectively. The one of the first housing portion 52 and the second housing portion 54 can be joined with the first projection 48A by a screw, an adhesive, or press-fitting. The other one of the first housing portion 52 and the second housing portion 54 can be joined with the first recess 48B by a screw, an adhesive, or press-fitting.

Preferably, the human-powered vehicle component 40 further includes a conductor 70 provided on the positioner 48 to electrically connect the first housing portion 52 and the second housing portion 54. Preferably, the conductor 70 includes a conductive grease 71. The conductive grease 71 is in contact with at least part of the surface of the first projection 48A and at least part of the surface of the first recess 48B. Even in a case in which at least part of the surface of the first projection 48A is not in direct contact with at least part of the surface of the first recess 48B by the conductive grease 71, the first projection 48A can be electrically connected to the first recess 48B. In a case in which at least part of the surface of the first projection 48A is in direct contact with at least part of the surface of the first recess 48B, the conductor 70 can include the at least part of the surface of the first projection 48A and the at least part of the surface of the first recess 48B.

The human-powered vehicle component 40 includes the housing 42, the motor 46, a cover 72, and an electric connector 74. The cover 72 is attached to the housing 42. The electric connector 74 includes a connection terminal 74A exposed to a cavity SB defined by the housing 42 and the cover 72. The electric connector 74 includes the connection terminal 74A. The connection terminal 74A can include multiple terminals. Preferably, the electric connector 74 is electrically connected to the motor 46 and at least one electric circuit board provided in the accommodation cavity SA of the housing 42. The electric connector 74 can be connected to the at least one electric circuit by, for example, an electric cable or an electric terminal. The connection terminal 74A of the electric connector 74 is configured to be connected to, for example, a battery provided outside the human-powered vehicle component 40 and an electric cable connected to at least one of the other electric components. The other electric components include, for example, a cycle computer, an operating switch, and an electric transmission.

The electric connector 74 is provided on the housing 42 so that the connection terminal 74A is exposed to the exterior of the housing 42. The electric connector 74 is provided on the outer surface of the housing 42. A connector through hole is provided in the housing 42 to receive part of the electric connector 74, an electric cable, or an electric terminal. The connector through hole is covered by the electric connector 74. Preferably, the electric connector 74 is provided in a recess 42A formed in the outer surface of the housing 42. For example, the electric connector 74 is provided in the recess 42A so that the connection terminal 74A is exposed in a direction intersecting an axial direction of the input rotational shaft 12A. In the present embodiment, the electric connector 74 is provided in the recess 42A so that the connection terminal 74A is exposed in a direction orthogonal to the axial direction of the input rotational shaft 12A. The electric connector 74 can be provided in the recess 42A so that, for example, the connection terminal 74A is exposed in a direction parallel to the axial direction of the input rotational shaft 12A. The cover 72 is configured to cover the recess 42A.

Preferably, the housing 42 includes a metal material, and the cover 72 includes a resin material. The resin material can be a resin material having a typical rigidity or a fiber-reinforced resin material. The cover 72 includes a rib 76. The rib 76 is configured to contact the housing 42 and limit deformation of the cavity SB. The rib 76 projects toward the housing 42. Preferably, at least part of the rib 76 is provided at a position that covers the recess 42A of the housing 42. Preferably, the rib 76 includes multiple ribs 76 so that a minimum distance L to the housing 42 differs between the ribs 76. The ribs 76 include at least one first rib 76A extending in a first direction X1 and at least one second rib 76B extending in a second direction X2 that differs from the first direction X1. Preferably, the first direction X1 is substantially orthogonal to the second direction X2.

In a case in which the at least one first rib 76A includes multiple first ribs 76A, the first ribs 76A are spaced apart from each other in the second direction X2. In a case in which the at least one second rib 76B includes multiple second ribs 76B, the second ribs 76B are spaced apart from each other in the first direction X1. Preferably, the at least one first rib 76A and the at least one second rib 76B are coupled to each other. Preferably, at least one of the at least one first rib 76A and at least one of the at least one second rib 76B are provided on the cover 72 to intersect each other.

Preferably, the housing 42 includes a projection 42B. The projection 42B is provided on an end of the wall of the recess 42A. The projection 42B projects toward the cover 72. Preferably, a projection direction A1 of the projection 42B is parallel to a projection direction A2 of the ribs 76. Preferably, the projection 42B faces at least part of at least one of the ribs 76 in the projection direction of the projection 42B. The projection 42B, for example, extends in the first direction X1 and faces at least one of the second ribs 76B in the projection direction A1. The at least one first rib 76A includes a third rim 76C located adjacent to a portion of the housing 42 surrounding the recess 42A. In the projection direction A1 of the projection 42B, a minimum distance L1 between a distal end 76D of the third rim 76C and the portion of the housing 42 surrounding the recess 42A is less than a minimum distance L2 between a distal end 42C of the projection 42B and at least one of the second ribs 76B. The minimum distance L1 can be 0 (zero) millimeters. In a case in which an external force is applied to the cover 72, at least one of the ribs 76 comes into contact with the outer surface of the housing 42 to limit deformation of the cavity SB. Also, in a case in which an external force is applied to the cover 72, the projection 42B comes into contact with at least one of the ribs 76 to limit deformation of the cavity SB. In the present embodiment, in a case in which an external force is applied to the cover 72, the third rim 76C comes into contacts with the outer surface of the housing 42 to limit deformation of the cavity SB. Also, in a case in which an external force is applied to the cover 72, the projection 42B comes into contact with the second ribs 76B to limit deformation of the cavity SB.

In the human-powered vehicle component 40, the housing 42 includes a magnesium alloy, and the intermediate portion 66 is formed by the third material or the fourth material. This limits occurrence of galvanic corrosion in the vicinity of the joint 44 regardless of the material of the fasteners 36.

Second Embodiment

Figure 14:
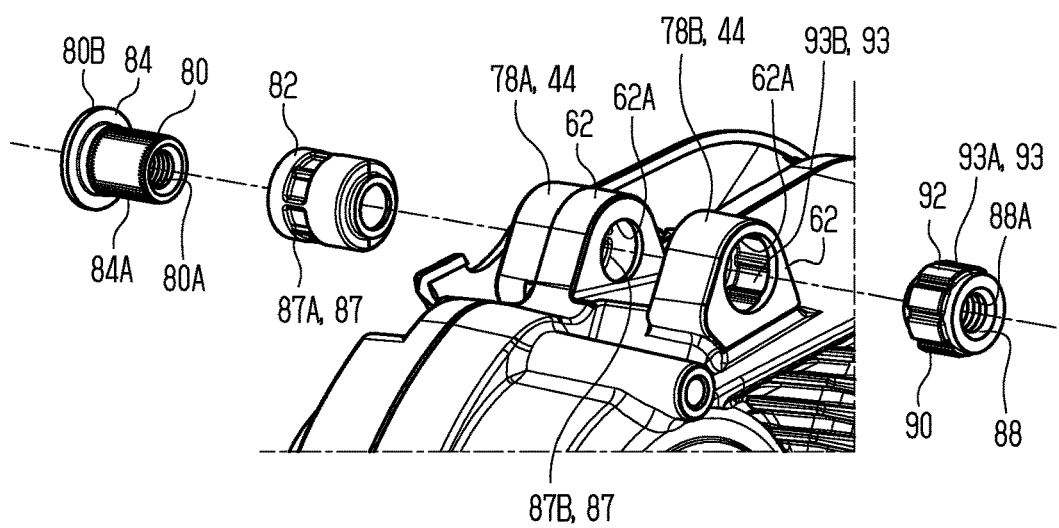
FIG. 14 is an enlarged exploded perspective view showing joints of a human-powered vehicle component in accordance with a second embodiment.
Figure 15:
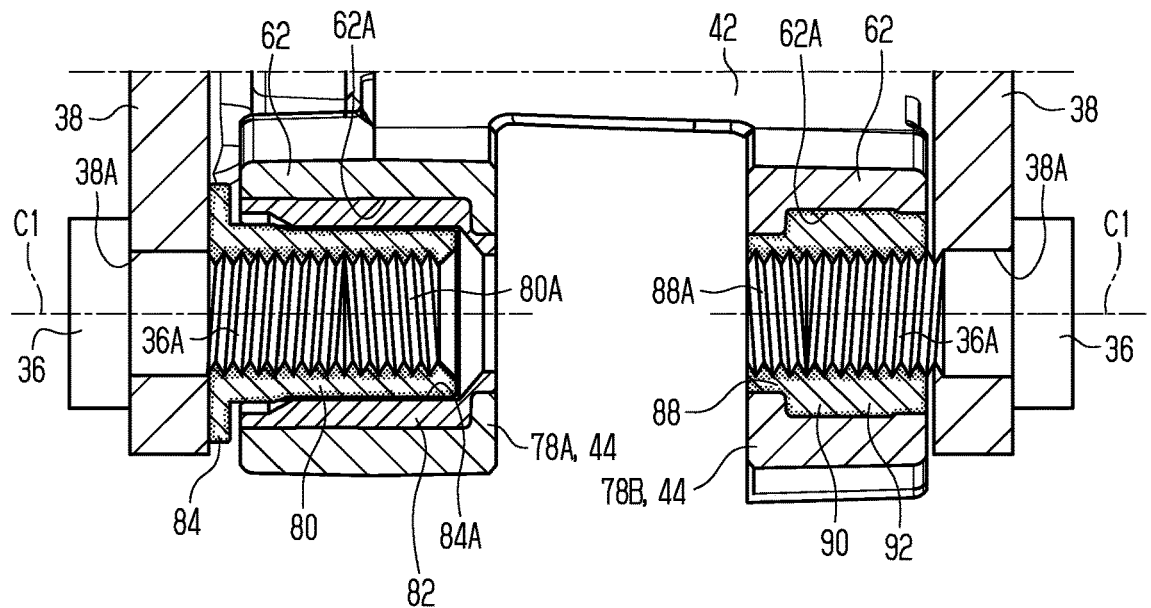
FIG. 15 is an enlarged cross-sectional view showing the joints of the human-powered vehicle component shown in FIG. 14 and the support of the frame in a state in which the joints of the human-powered vehicle component are attached to the support of the frame by fasteners.

A second embodiment of a human-powered vehicle component 40 will be described with reference to FIGS. 14 and 15. The human-powered vehicle component 40 of the second embodiment is the same as the human-powered vehicle component 40 of the first embodiment except for the configurations of a first joint 78A and a second joint 78B. The same reference characters are given to those elements that are the same as the corresponding elements of the first embodiment. Such elements will not be described in detail. In the present embodiment, the configuration of the first joint 78A differs from the configuration of the second joint 78B.

The at least one joint 44 includes at least one first joint 78A and at least one second joint 78B. In the present embodiment, the number of first joints 78A is equal to the number of second joints 78B. The number of first joints 78A can differ from the number of second joints 78B. In the present embodiment, the at least one first joint 78A includes multiple first joints 78A, and the at least one second joint 78B includes multiple second joints 78B. The first joints 78A are arranged on the outer peripheral part of the housing 42 at intervals about the rotational axis C2 of the input rotational shaft 12A. The second joints 78B are arranged on the outer peripheral part of the housing 42 at intervals about the rotational axis C2 of the input rotational shaft 12A. For example, the at least one first joint 78A is aligned with the at least one second joint 78B in a direction parallel to the rotational axis C2 of the input rotational shaft 12A. In the present embodiment, the first joints 78A are respectively aligned with the second joints 78B in a direction parallel to the rotational axis C2 of the input rotational shaft 12A. The at least one first joint 78A is spaced apart from the at least one second joint 78B in a direction parallel to the rotational axis C2 of the input rotational shaft 12A. In the present embodiment, the fasteners 36 are bolts. The direction in which a fastener 36 is inserted into the first joint 78A is opposite to the direction in which a fastener 36 is inserted into the second joint 78B.

The first joint 78A includes a metal base 62, a metal coupling portion 80, and an intermediate portion 82.

The coupling portion 80 is provided on the base 62 and is configured to be coupled to the fastener 36. The intermediate portion 82 is provided between the coupling portion 80 and the base 62. Preferably, the base 62 includes a hole 62A. In the present embodiment, the hole 62A is a through hole. The hole 62A can be a blind hole. At least part of the coupling portion 80 and at least part of the intermediate portion 82 are located in the hole 62A. In the present embodiment, the inner peripheral part of the base 62 defining the hole 62A is threadless. The coupling portion 80 includes a second female thread portion 80A configured to be coupled to the fastener 36. The second female thread portion 80A is configured to be coupled to the male thread portion 36A of the fastener 36. The coupling portion 80 is, for example, substantially round tubular. The coupling portion 80 can be, for example, substantially tubular and have a closed end. The second female thread portion 80A is provided on an inner peripheral part of the coupling portion 80. The intermediate portion 82 is provided on an outer peripheral part of the coupling portion 80. The intermediate portion 82 is substantially round tubular. The intermediate portion 82 can be substantially round tubular and have a closed end.

Preferably, the coupling portion 80 includes a flange 80B. In a state in which the joint 44 is attached to the support 38 of the human-powered vehicle 10 by the fastener 36, the flange 64B is located between the base 62 and the support 38. The flange 80B is greater in size than the diameter of the hole 62A. In a state in which part of the coupling portion 80 is located in the hole 62A, the flange 80B is located outside the hole 62A. The flange 80B is configured to contact the support 38 in a state in which the human-powered vehicle component 40 is attached to the support 38 by the fastener 36. The contact of the flange 80B with the support 38 restricts a contact of the support 38 with the base 62. Preferably, the intermediate portion 82 is provided on the entire region of the outer peripheral part of the coupling portion 80 that is located in the hole 62A.

Preferably, the intermediate portion 82 is provided on the coupling portion 80 in a removable manner. The first joint 78A includes a first member 84 including the intermediate portion 82. The first member 84 is substantially round tubular. The first member 84 can be substantially tubular and have a closed end. The intermediate portion 82 is provided on an outer peripheral part of the first member 84. The intermediate portion 82 can be provided on at least one an inner peripheral part of the first member 84 and a side surface part of the first member 84 that connects the outer peripheral part and the inner peripheral part in addition to the outer peripheral part of the first member 84. The entirety of the first member 84 can be the intermediate portion 82. Preferably, the intermediate portion 82 includes an outer peripheral surface of the first member 84. Preferably, the coupling portion 80 is coupled to the intermediate portion 82 so as to move relative to the intermediate portion 82 in a direction in which the hole 62A extends. The first member 84 and the base 62 includes a first restriction 87 that restricts movement of the first member 84 relative to the base 62. The first restriction 87 includes at least one recess 87A and at least one projection 87B that have complementary shapes. One of the at least one recess 87A and the at least one projection 87B is provided on one of the outer peripheral part of the intermediate portion 82 and the inner peripheral part of the base 62. The other one of the at least one recess 87A and the at least one projection 87B is provided on the other one of the outer peripheral part of the intermediate portion 82 and the inner peripheral part of the base 62. Preferably, one of the at least one recess 87A and the at least one projection 87B provided on the inner peripheral part of the base 62 is provided on a middle of the inner peripheral part of the base 62 in a direction in which the hole 62A extends. The at least one recess 87A and the at least one projection 87B can be provided on each of the outer peripheral part of the intermediate portion 82 and the inner peripheral part of the base 62. In a state in which the recess 87A engages the projection 87B, the first restriction 87 restricts rotation of the intermediate portion 82 relative to the base 62 and separation of the first member 84 from the base 62. The intermediate portion 82 is, for example, inserted-molded to the base 62. Preferably, at least one of the intermediate portion 82 and the coupling portion 80 includes a restriction 84A that restricts rotation of the intermediate portion 82 relative to the coupling portion 80. The restriction 84A is provided on at least one of the inner peripheral part of the intermediate portion 82 and the outer peripheral part of the coupling portion 80. The restriction 84A includes, for example, one or more splines.

The base 62 that corresponds to the first joint 78A includes a first material having a first standard electrode potential. Preferably, the base 62 that corresponds to the first joint 78A includes a magnesium alloy. At least part of the housing 42 is formed integrally with the base 62 that corresponds to the first joint 78A as a one-piece member. The inner peripheral part of the base 62 defining the hole 62A can include at least one of the metal oxide film and the paint film.

The coupling portion 80 includes a second material having a second standard electrode potential. Preferably, the second material includes an aluminum alloy, and the metal oxide includes aluminum oxide. The aluminum alloy is, for example, ADC12. The intermediate portion 82 is formed by a third material or a fourth material. The third material has a third standard electrode potential. A difference of the third standard electrode potential and the first standard electric potential and a difference of the third standard electrode potential and the second standard electrode potential are each smaller than a difference of the first standard electrode potential and the second standard electrode potential. The fourth material is electrically insulative. More preferably, the intermediate portion 66 is formed by the fourth material. Preferably, the first standard electrode potential differs from the second standard electrode potential.

In the present embodiment, the intermediate portion 82 is formed by the fourth material. The fourth material includes a metal oxide. For example, the intermediate portion 82 is manufactured by forming the first member 84 by the second material and forming a metal oxide film on the outer peripheral part of the first member 84. The metal oxide film includes, for example, an anodic oxide film or a plating film. Preferably, the thickness of the intermediate portion 82 is greater than or equal to one micrometer and less than or equal to thirty micrometers. In a case in which the metal oxide film is an anodic oxide film, it is preferred that the thickness of the intermediate portion 82 is greater than or equal to three micrometers and less than or equal to ten micrometers. In a case in which the metal oxide film is a plating film, it is preferred that the thickness of the intermediate portion 82 is greater than or equal to ten micrometers and less than or equal to twenty micrometers.

In the present embodiment, the coupling portion 80 can include a fifth material in addition to the second material. Preferably, an electrical insulator can be provided on an outer surface of the coupling portion 80. The electrical insulator of the coupling portion 80 is formed by the fifth material. Preferably, the fifth material is the same as the fourth material. The electrical insulator of the coupling portion 80 is formed by, for example, forming a substantially round tubular base element by the second material and forming a metal oxide film on a surface of the base element. The metal oxide film includes, for example, an anodic oxide film or a plating film. Preferably, the thickness of the electrical insulator of the coupling portion 80 is greater than or equal to one micrometer and less than or equal to thirty micrometers. In a case in which the metal oxide film is an anodic oxide film, it is preferred that the thickness of the electrical insulator of the coupling portion 80 is greater than or equal to three micrometers and less than or equal to ten micrometers. In a case in which the metal oxide film is a plating film, it is preferred that the thickness of the electrical insulator of the coupling portion 80 is greater than or equal to ten micrometers and less than or equal to twenty micrometers.

The second joint 78B includes a metal base 62, a metal coupling portion 88, and an intermediate portion 90.

The coupling portion 88 is provided on the base 62 and is configured to be coupled to the fastener 36. The intermediate portion 90 is provided between the coupling portion 88 and the base 62. Preferably, the base 62 includes a hole 62A. In the present embodiment, the hole 62A is a through hole. The hole 62A can be a blind hole. At least part of the coupling portion 88 and at least part of the intermediate portion 90 are located in the hole 62A. The inner peripheral surface of the base 62 defining the hole 62A is threadless. The coupling portion 88 and the intermediate portion 90 are non-removably provided on the base 62 in a non-removable manner. The coupling portion 88 includes a second female thread portion 88A configured to be coupled to the fastener 36. The second female thread portion 88A is configured to be coupled to the male thread portion 36A of the fastener 36. The coupling portion 80 is, for example, substantially round tubular. The coupling portion 88 can be, for example, substantially tubular and have a closed end. The second female thread portion 88A is provided on an inner peripheral part of the coupling portion 88. The intermediate portion 90 is provided on an outer peripheral part of the coupling portion 88. The intermediate portion 90 is substantially round tubular. The intermediate portion 90 can be substantially round tubular and have a closed end.

Preferably, the intermediate portion 90 is non-removably provided on the coupling portion 88 in a non-removable manner. The second joint 78B includes a second member 92 including the intermediate portion 90. The second member 92 is substantially round tubular. The second member 92 can be substantially tubular and have a closed end. The intermediate portion 90 is provided on an outer peripheral part of the second member 92. Preferably, the intermediate portion 90 includes an outer peripheral surface of the second member 92. The second member 92 and the base 62 include a second restriction 93 that restricts movement of the second member 92 relative to the base 62. The second restriction 93 includes at least one recess 93B and at least one projection 93A that have complementary shapes. In a case in which the at least one recess 93B includes multiple recesses 93B, it is preferred that the recesses 93B are arranged at equal intervals in a circumferential direction of the hole 62A. In a case in which the at least one projection 93A includes multiple projections 93A, it is preferred that the projections 93A are arranged at equal intervals in the circumferential direction of the hole 62A. One of the at least one recess 93B and the at least one projection 93A is provided on one of the outer peripheral part of the second member 92 and the inner peripheral part of the base 62. The other one of the at least one recess 93B and the at least one projection 93A is provided on the other one of the outer peripheral part of the second member 92 and the inner peripheral part of the base 62. Preferably, one of the at least one recess 93B and the at least one projection 93A provided on the inner peripheral part of the base 62 is provided on a middle of the inner peripheral part of the base 62 in a direction in which the hole 62A extends. The at least one recess 93B and the at least one projection 93A can be provided on each of the outer peripheral part of the second member 92 and the inner peripheral part of the base 62. In a state in which the recess 93B engages the projection 93A, the second restriction 93 restricts rotation of the second member 92 relative to the base 62 and separation of the second member 92 from the base 62. The second member 92 is, for example, inserted-molded to the base 62.

The base 62 that corresponds to the second joint 78B includes a first material having a first standard electrode potential. Preferably, the base 62 includes a magnesium alloy. At least part of the housing 42 is formed integrally with the base 62 that corresponds to the second joint 78B as a one-piece member. The inner peripheral part of the base 62 defining the hole 62A can include at least one of the metal oxide film and the paint film.

The coupling portion 88 includes a second material having a second standard electrode potential. Preferably, the second material includes an aluminum alloy, and the metal oxide includes aluminum oxide. The aluminum alloy is, for example, ADC12. The intermediate portion 90 is formed by a third material or a fourth material. The third material has a third standard electrode potential. A difference of the third standard electrode potential and the first standard electric potential and a difference of the third standard electrode potential and the second standard electrode potential are each smaller than a difference of the first standard electrode potential and the second standard electrode potential. The fourth material is electrically insulative. More preferably, the intermediate portion 90 is formed by the fourth material. Preferably, the first standard electrode potential differs from the second standard electrode potential.

In the present embodiment, the intermediate portion 90 is formed by the fourth material. The fourth material includes a metal oxide. For example, the intermediate portion 90 is manufactured by forming the second member 92 by the second material and forming a metal oxide film on the outer peripheral part of the second member 92. The metal oxide film includes, for example, an anodic oxide film or a plating film. Preferably, the thickness of the intermediate portion 90 is greater than or equal to one micrometer and less than or equal to thirty micrometers. In a case in which the metal oxide film is an anodic oxide film, it is preferred that the thickness of the intermediate portion 90 is greater than or equal to three micrometers and less than or equal to ten micrometers. In a case in which the metal oxide film is a plating film, it is preferred that the thickness of the intermediate portion 90 is greater than or equal to ten micrometers and less than or equal to twenty micrometers.

In the present embodiment, the coupling portion 88 can include a fifth material in addition to the second material. Preferably, an electrical insulator can be provided on an outer surface of the coupling portion 88 that is not in contact with the intermediate portion 90. The electrical insulator of the coupling portion 88 is formed by the fifth material. Preferably, the fifth material is the same as the fourth material. The electrical insulator of the coupling portion 88 is formed by, for example, forming a metal oxide film on the inner peripheral part of the second member formed by the second material. The metal oxide film includes, for example, an anodic oxide film or a plating film. Preferably, the thickness of the electrical insulator of the coupling portion 88 is greater than or equal to one micrometer and less than or equal to thirty micrometers. In a case in which the metal oxide film is an anodic oxide film, it is preferred that the thickness of the electrical insulator of the coupling portion 88 is greater than or equal to three micrometers and less than or equal to ten micrometers. In a case in which the metal oxide film is a plating film, it is preferred that the thickness of the electrical insulator of the coupling portion 88 is greater than or equal to ten micrometers and less than or equal to twenty micrometers. The intermediate portion 90 and the electrical insulator of the coupling portion 88 are, for example, simultaneously formed in a manufacturing process.

Third Embodiment

A third embodiment of a human-powered vehicle component 40 will be described with reference to FIGS. 16 to 23. The human-powered vehicle component 40 of the third embodiment is the same as the human-powered vehicle component 40 of the second embodiment except for the configurations of a first joint 96A and a second joint 96B. The same reference characters are given to those elements that are the same as the corresponding elements of the first and second embodiments. Such elements will not be described in detail.

The at least one joint 44 includes at least one first joint 96A and at least one second joint 96B. In the present embodiment, the number of first joints 96A is equal to the number of second joints 96B. The number of first joints 96A can differ from the number of second joints 96B. In the present embodiment, the at least one first joint 96A includes multiple first joints 96A, and the at least one second joint 96B includes multiple second joints 96B. The first joints 96A are arranged on the outer peripheral part of the housing 42 at intervals about the rotational axis C2 of the input rotational shaft 12A. The second joints 96B are arranged on the outer peripheral part of the housing 42 at intervals about the rotational axis C2 of the input rotational shaft 12A. For example, the at least one first joint 96A is aligned with the at least one second joint 96B in a direction parallel to the rotational axis C2 of the input rotational shaft 12A. In the present embodiment, the first joints 96A are respectively aligned with the second joints 96B in a direction parallel to the rotational axis C2 of the input rotational shaft 12A. The at least one first joint 96A is spaced apart from the at least one second joint 96B in a direction parallel to the rotational axis C2 of the input rotational shaft 12A. In the present embodiment, the fasteners 36 are bolts. The direction in which a fastener 36 is inserted into the first joint 96A is opposite to the direction in which a fastener 36 is inserted into the second joint 96B.

The base 62 includes a first base portion 63A and a second base portion 63B. The second base portion 63B is provided on the first base portion 63A and defines the hole 62A. In the present embodiment, the second base portion 63B and the first base portion 63A include different materials. In the present embodiment, at least part of the housing 42 is formed integrally with the first base portion 63A as a one-piece member. The first base portion 63A includes a magnesium alloy. The second base portion 63B is formed by, for example, an aluminum alloy. Preferably, the second base portion 63B is substantially round tubular. The first base portion 63A includes a receptacle 63C in which the second base portion 63B is located. Preferably, the second base portion 63B is formed integrally with the first base portion 63A.

Preferably, the second base portion 63B includes a fitting part 63D fitted to the first base portion 63A so as not to be separated from the receptacle 63C. The fitting part 63D is provided, for example, on an outer peripheral part of the second base portion 63B about the center axis C1 of the fastener 36. The fitting part 63D is provided on the outer peripheral part of the second base portion 63B about the center axis C1 of the fastener 36 and includes at least one of a recess and a projection. In the present embodiment, the fitting part 63D is formed by a recess. The fitting part 63D can continuously or intermittently extend entirely around the second base portion 63B about the center axis C1 of the fastener 36. The fitting part 63D is provided, for example, on a middle of the second base portion 63B between opposite ends in a direction parallel to the center axis C1 of the fastener 36.

The second base portion 63B includes a first end surface 63E and a second end surface 63F in a coupling direction D1 of the fastener 36. In the present embodiment, the first end surface 63E of the second base portion 63B is not covered by the first base portion 63A, and the second end surface 63F of the second base portion 63B is covered by the first base portion 63A. Preferably, the second end surface 63F of the second base portion 63B is in contact with the first base portion 63A. The first end surface 63E of the second base portion 63B can be covered by the first base portion 63A. The first end surface 63E of the second base portion 63B can be in contact with the first base portion 63A. The fitting part 63D is located, for example, closer to the first end surface 63E of the second base portion 63B than the second end surface 63F of the second base portion 63B in a direction parallel to the center axis C1 of the fastener 36. The second base portion 63B can be press-fitted to the receptacle 63C of the first base portion 63A. In a case in which the second base portion 63B is press-fitted to the receptacle 63C of the first base portion 63A, the fitting part 63D is provided in the vicinity of the first end surface 63E of the second base portion 63B or is omitted.

The end of the second base portion 63B including the first end surface 63E can have a larger inner diameter than other parts of the second base portion 63B. This limits the load applied to the portion of the base 62 defining the opening of the hole 62A. The difference between the minimum inner diameter and the maximum outer diameter of the second base portion 63B is, for example, greater than or equal to one millimeter (mm) and less than or equal to 20 millimeters (mm). The second base portion 63B is used as a reinforcement member. As long as the second base portion 63B is used as a reinforcement member, the shape and materials are not particularly limited.

The first joint 96A includes a metal base 62, a metal coupling portion 97, and an intermediate portion 98. The intermediate portion 98 and the coupling portion 97 are formed by different members. The intermediate portion 98 is formed by the fourth material. Preferably, the fourth material includes an electric insulative resin material. The fourth material can include a reinforcing fiber in addition to a resin material. Preferably, the intermediate portion 98 has a high hardness. The resin material is a synthetic resin material. The resin material included in the fourth material includes, for example, at least one of polyamide (PA), acrylonitrile butadiene styrene (ABS), polyphenylene sulfide (PPS), polyimide (PI), and polyetherimide (PEI). The intermediate portion 98 is formed by rubber. The reinforcing fiber included in the fourth material is electrically insulative. Preferably, the reinforcing fiber included in the fourth material includes at least one of a glass fiber and an aramid fiber.

The coupling portion 97 is provided on the base 62 and is configured to be coupled to the fastener 36. The intermediate portion 98 is provided between the coupling portion 97 and the base 62. Preferably, the intermediate portion 98 is press-fitted to the hole 62A in the base 62. Preferably, the intermediate portion 98 is insert-molded to the coupling portion 97. The coupling portion 97 includes a second female thread portion 97A configured to be coupled to the fastener 36. The second female thread portion 97A is configured to be coupled to the male thread portion 36A of the fastener 36. Preferably, at least part of the coupling portion 97 is tubular. The coupling portion 88 is, for example, substantially round tubular. The coupling portion 88 can be, for example, substantially tubular and have a closed end. The second female thread portion 97A is provided on an inner peripheral part of the coupling portion 97. The intermediate portion 98 is provided on an outer peripheral part of the coupling portion 97. At least part of the intermediate portion 98 is tubular. The intermediate portion 98 is substantially round tubular. the intermediate portion 98 can be, for example, substantially tubular and have a closed end.

Preferably, the coupling portion 97 includes a flange 97B. The flange 97B is provided on an end of the coupling portion 97 in a direction parallel to the center axis C1 of the fastener 36. In a state in which the joint 44 is attached to the support 38 of the human-powered vehicle 10 by the fastener 36, the flange 97B is located between the base 62 of the first joint 96A and the support 38. The flange 97B is greater in size than the diameter of the hole 62A formed in the base 62 of the first joint 96A. In a state in which part of the coupling portion 97 is located in the hole 62A formed in the base 62 of the first joint 96A, the flange 97B is located outside the hole 62A formed in the base 62 of the first joint 96A. The flange 97B is configured to face the support 38 in a state in which the human-powered vehicle component 40 is attached to the support 38 by the fastener 36. The flange 97B is configured to contact the support 38 in a state in which the human-powered vehicle component 40 is attached to the support 38 by the fastener 36. The flange 97B is annular. The flange 97B is substantially annular and round. Preferably, the flange 97B includes at least one flat surface 97F on an outer peripheral surface 97E that extends about the center axis C1 of the fastener 36 and. In the present embodiment, the outer peripheral surface 97E of the flange 97B includes multiple flat surfaces 97F. Two of the flat surfaces 97F are symmetrically arranged about the center axis C1 of the fastener 36. Other two of the flat surfaces 97F are symmetrically arranged about the center axis C1 of the fastener 36. The support 38 of the frame 18 can include a contact portion configured to contact one of the at least one flat surface 97F on the outer peripheral surface 97E of the flange 97B. In this case, the flat surface 97F on the outer peripheral surface 97E of the flange 97B contacts the contact portion of the support 38, so that rotation of the coupling portion 97 about the center axis C1 of the fastener 36 is hampered. The outer peripheral surface 97E of the flange 97B can engage with a tool.

In the present embodiment, the intermediate portion 98 is provided on the coupling portion 97 in a removable manner. Preferably, at least part of the intermediate portion 98 covers at least part of the outer peripheral surface of the tubular part of the coupling portion 97. Preferably, the intermediate portion 98 is configured to cover a part of the second base portion 63B that is not covered by the first base portion 63A. The intermediate portion 98 is configured to cover, for example, a region in which the first base portion 63A is in contact with the second base portion 63B. In the present embodiment, the intermediate portion 98 includes a flange 98E. The flange 98B is provided on an end of the intermediate portion 98 in a direction parallel to the center axis C1 of the fastener 36. The flange 98E is provided between the flange 97B of the coupling portion 97 and the base 62 in a direction parallel to the center axis C1 of the fastener 36. The flange 98E contacts the first end surface 63E of the second base portion 63B and covers the first end surface 63E of the second base portion 63B. The flange 98E can be formed to contact the first end surface 63E of the second base portion 63B and a part of the first base portion 63A that abuts the first end surface 63E of the second base portion 63B. The flange 98E can be adhered to the first end surface 63E of the second base portion 63B and the part of the first base portion 63A that abuts the first end surface 63E of the second base portion 63B by an adhesive 99. This limits entrance of water into the interface between the first base portion 63A and the second base portion 63B and inhibits electrolytic corrosion in the interface between the first base portion 63A and the second base portion 63B. In a direction parallel to the center axis C1 of the fastener 36, the part of the intermediate portion 98 excluding the flange 98E is longer than the second base portion 63B. The intermediate portion 98 can be formed to contact the second end surface 63F of the second base portion 63B and a part of the first base portion 63A that abuts the second end surface 63F of the second base portion 63B. The intermediate portion 98 can be adhered to the second end surface 63F of the second base portion 63B and the part of the first base portion 63A that abuts the second end surface 63F of the second base portion 63B by the adhesive 99. This limits entrance of water into the interface between the first base portion 63A and the second base portion 63B and inhibits electrolytic corrosion in the interface between the first base portion 63A and the second base portion 63B. Before the human-powered vehicle component 40 is attached to the support 38 by the fastener 36, the flange 97B of the coupling portion 97 is in contact with the flange 98E of the intermediate portion 98.

The flange 98E is annular. The flange 98E is substantially annular and round. The flange 98E includes, for example, at least one flat surface 98G on an outer peripheral surface 98F that extends about the center axis C1 of the fastener 36 and. In the present embodiment, the outer peripheral surface 98F of the flange 98E includes multiple flat surfaces 98G. Two of the flat surfaces 98G are symmetrically arranged about the center axis C1 of the fastener 36. Other two of the flat surfaces 98G are symmetrically arranged about the center axis C1 of the fastener 36. The outer peripheral surface 98F of the flange 98E can engage with a tool.

The flat surface 98G on the outer peripheral surface 98F of the flange 98E can contact the contact portion of the support 38. In this case, rotation of the intermediate portion 98 in the center axis C1 of the fastener 36 is hampered during the attachment of the fastener 36. In the present embodiment, as viewed parallel to the center axis C1 of the fastener 36, the flange 98E of the intermediate portion 98 and the flange 97B of the coupling portion 97 have an identical contour. In the present embodiment, as viewed parallel to the center axis C1 of the fastener 36, the intermediate portion 98 is joined with the coupling portion 97 so that the contour of the flange 97B of the intermediate portion 98 overlaps the contour of the flange 98E of the coupling portion 97. The contour of the flange 98E of the intermediate portion 98 can be larger or smaller than the contour of the flange 97B of the coupling portion 97. In a case in which the contour of the flange 98E of the intermediate portion 98 is identical to the contour of the flange 97B of the coupling portion 97 as viewed parallel to the center axis C1 of the fastener 36, and a tool is used to couple the coupling portion 97 and the intermediate portion 98 to the base 62, the tool can contact the flange 98E and the flange 97B during the coupling. This restricts undesirable movement of the coupling portion 97 relative to the intermediate portion 98.

Figure 16:
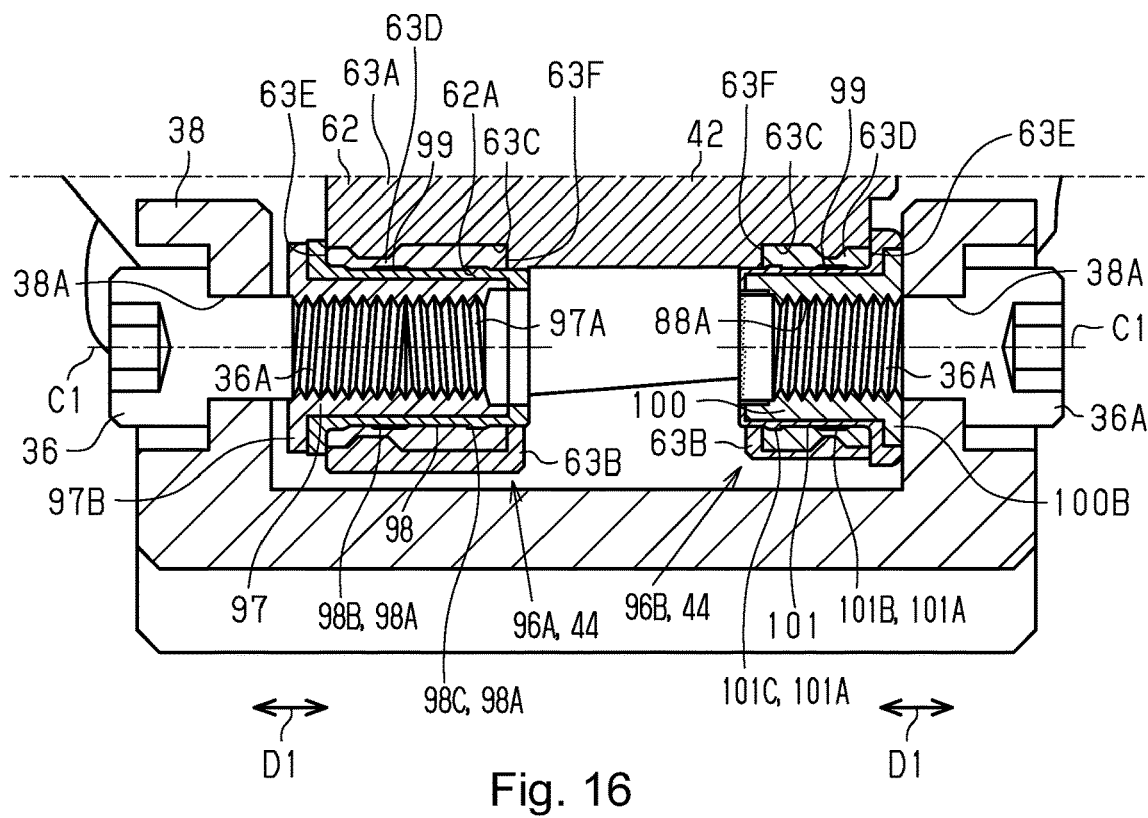
FIG. 16 is an enlarged cross-sectional view showing joints of a human-powered vehicle component in accordance with a third embodiment and the support of the frame in a state in which the joints of the human-powered vehicle component are attached to the support of the frame by fasteners.
Figure 17:
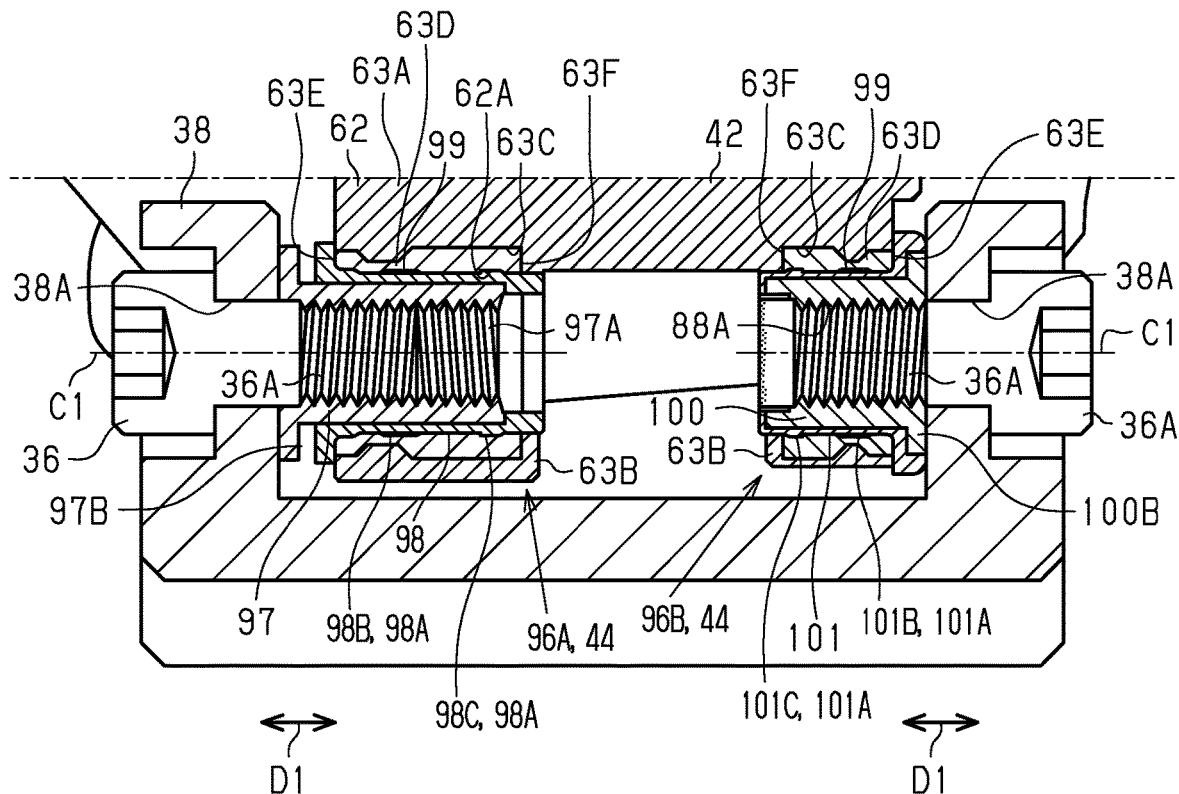
FIG. 17 is a cross-sectional view of a state in which a coupling portion shown in FIG. 16 is moved toward the head of the fastener.
Figure 18:
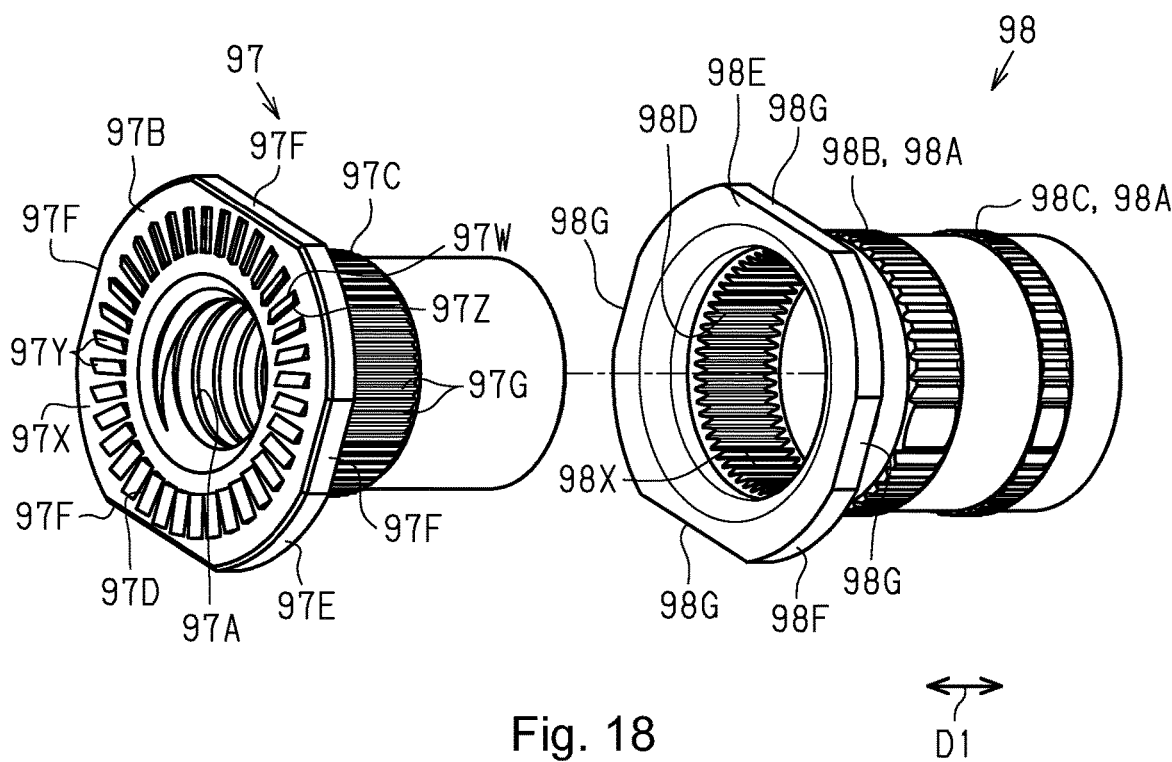
FIG. 18 is a perspective view showing a coupling portion and an intermediate portion of a first joint shown in FIG. 16.
Figure 19:
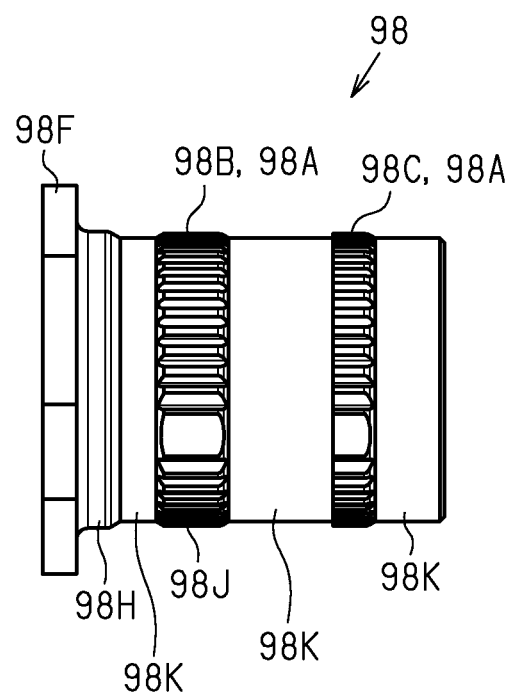
FIG. 19 is a side elevational view of the intermediate portion of the first joint shown in FIG. 16.
Figure 20:
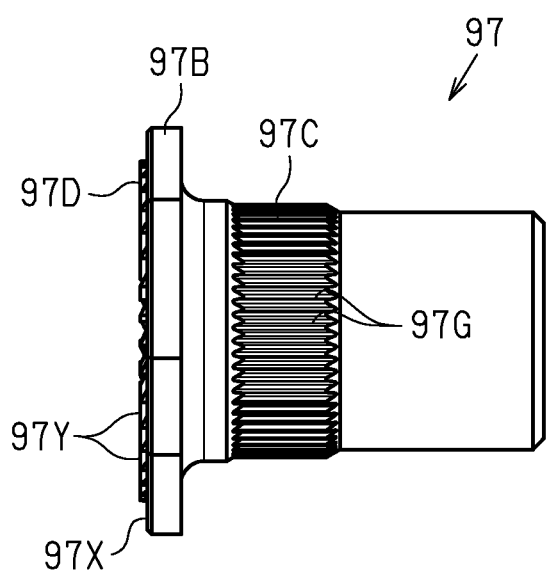
FIG. 20 is a side elevational view of the coupling portion of the first joint shown in FIG. 16.
Figure 21:
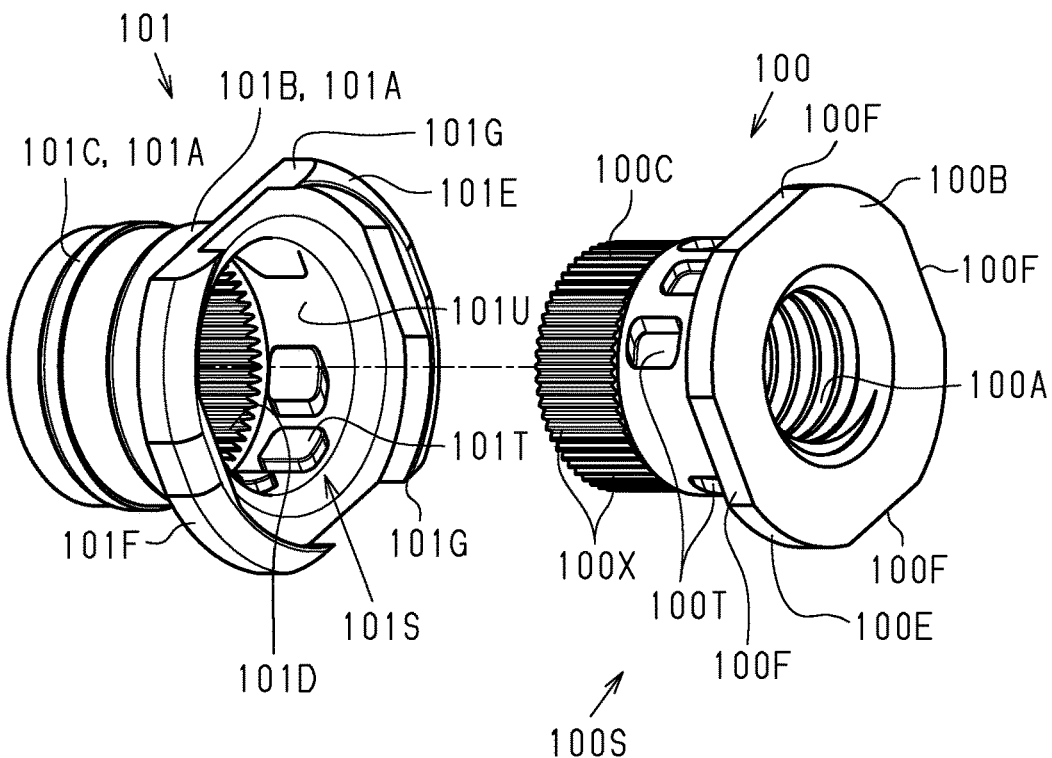
FIG. 21 is a perspective view showing a coupling portion and an intermediate portion of a second joint shown in FIG. 16.
Figure 22:
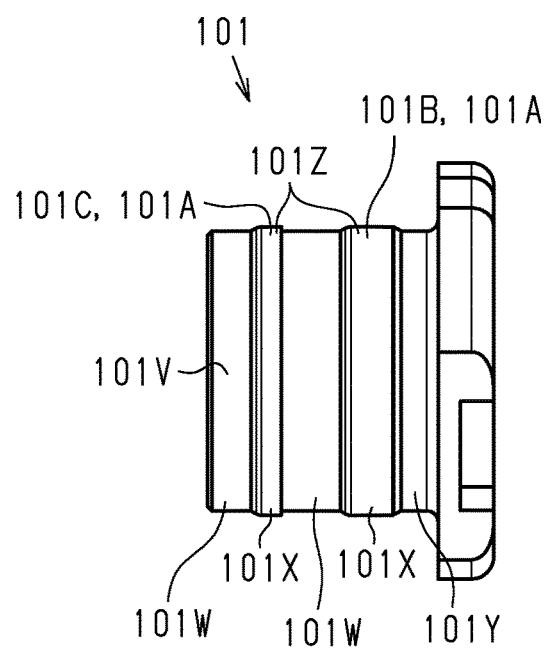
FIG. 22 is a side elevational view of the intermediate portion of the second joint shown in FIG. 16.
Figure 23:
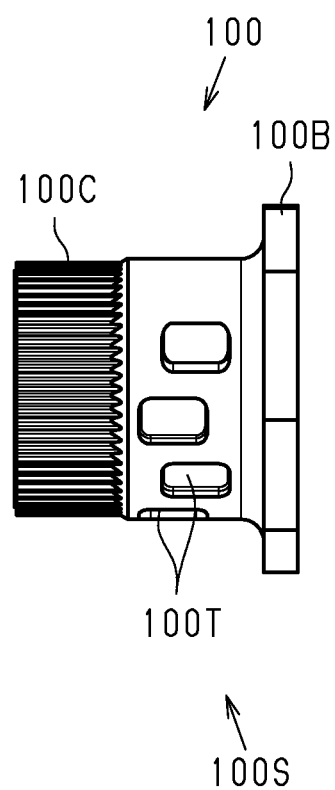
FIG. 23 is a side elevational view of the coupling portion of the second joint shown in FIG. 16.
Figure 24:
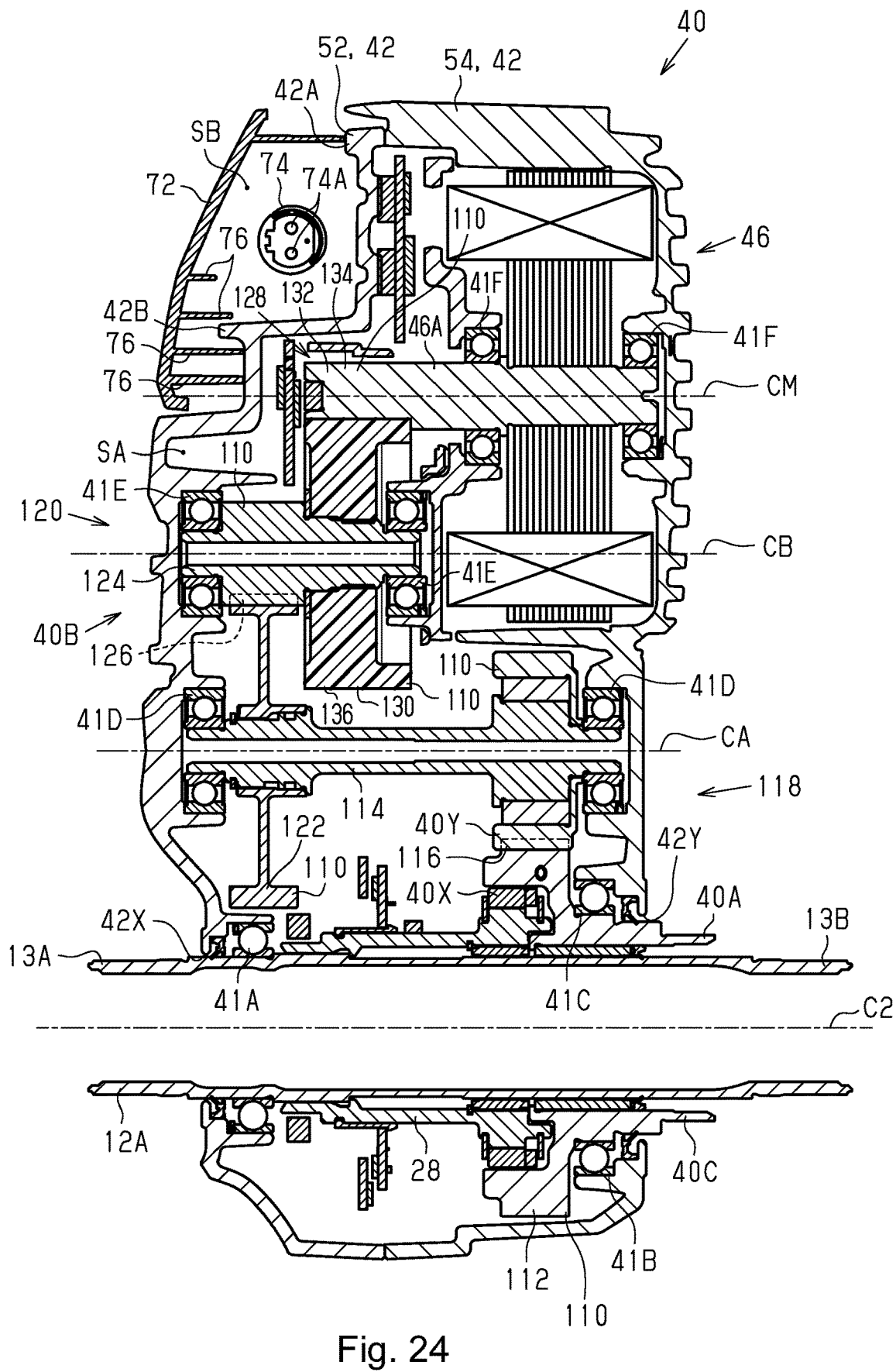
FIG. 24 is a cross-sectional view of a human-powered vehicle component in accordance with a fourth embodiment.
Figure 25:
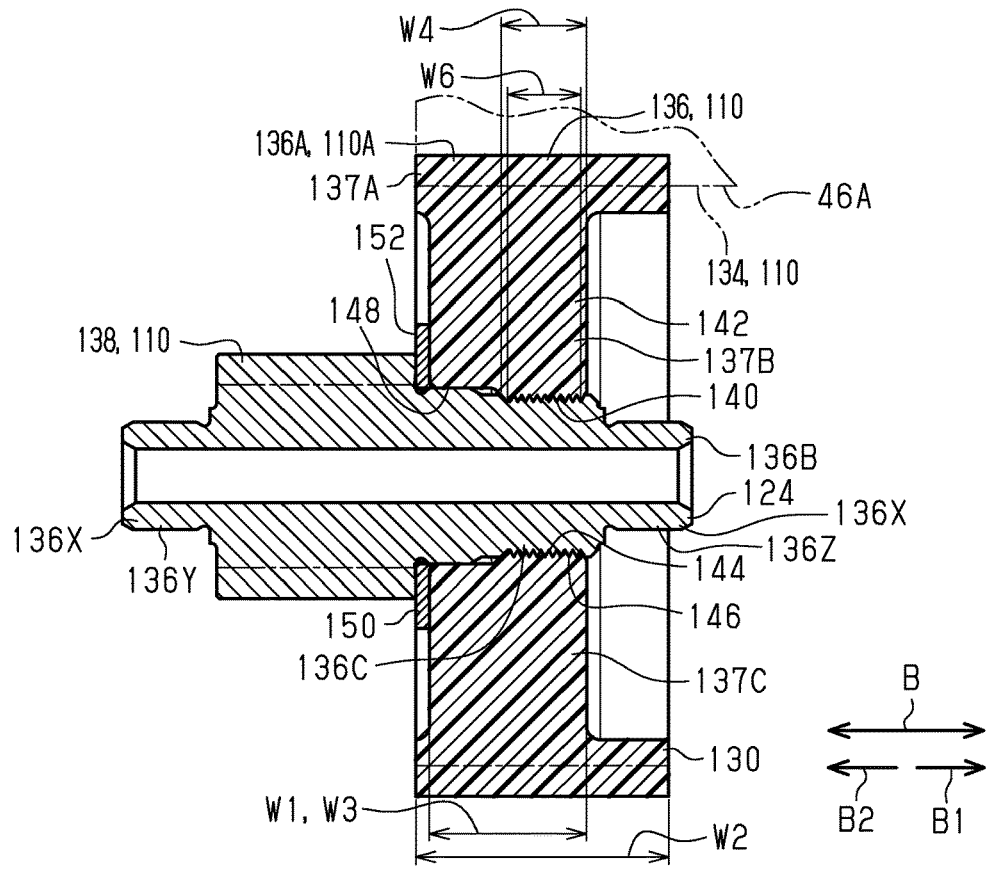
FIG. 25 is a cross-sectional view of a second gear and a third gear shown in FIG. 24.
Figure 26:
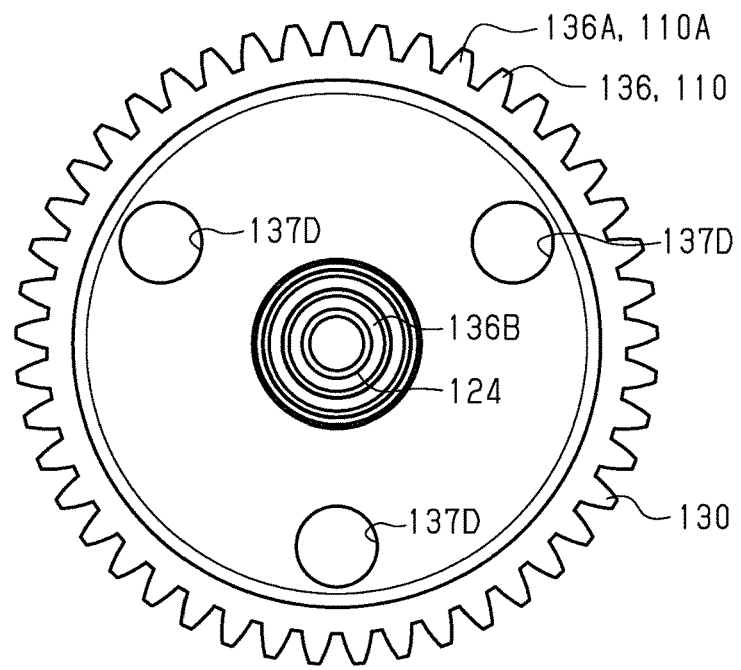
FIG. 26 is a side view of the second gear and the third gear shown in FIG. 24.
Figure 27:
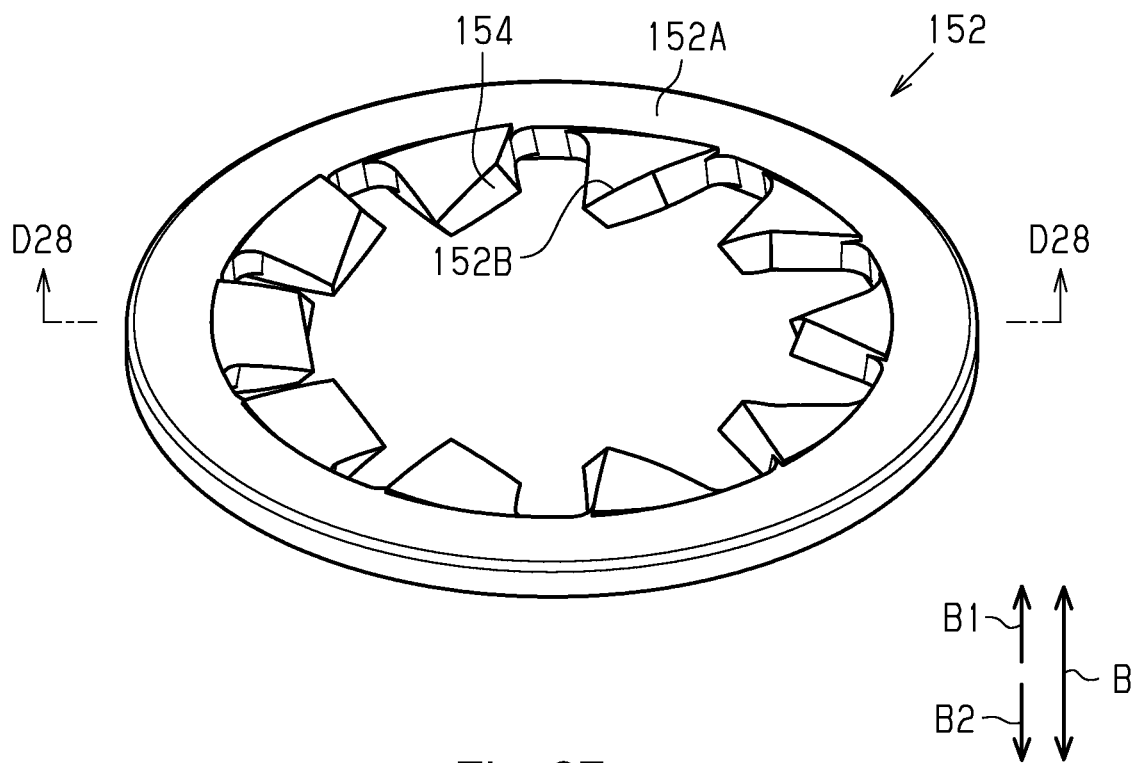
FIG. 27 is a perspective view of a washer shown in FIG. 25.
Figure 28:
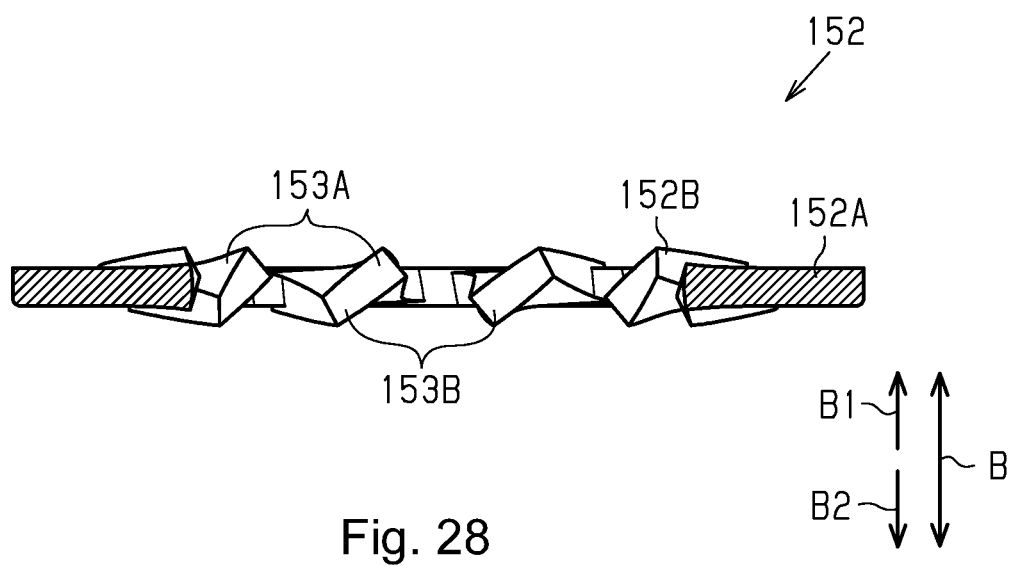
FIG. 28 is a cross-sectional view of the human-powered vehicle component taken along line D28-D28 in FIG. 27.

A joining force between the intermediate portion 98 and the base 62 is greater than a joining force between the intermediate portion 98 and the coupling portion 97. In a case in which the human-powered vehicle component 40 is attached to the support 38 by the fastener 36, the fastener 36 is joined with the coupling portion 97 to fasten the fastener 36. In this case, as shown in FIG. 16, in a case in which the coupling portion 97 is spaced apart from the frame 18, the intermediate portion 98 does not move relative to the base 62, and the coupling portion 97 moves relative to the intermediate portion 98 in a direction parallel to the center axis C1 of the fastener 36. As a result, as shown in FIG. 17, the coupling portion 97 contacts the frame 18. Since the position of the intermediate portion 98 relative to the base 62 remains the same, the part of the base 62 that is covered by the intermediate portion 98 is not exposed. Preferably, the intermediate portion 98 is adhered to the base 62 by the adhesive 99 applied to the hole 62A. The adhesive 99 readily increases the joining force between the intermediate portion 98 and the base 62. Although the type of the adhesive 99 is not particularly limited, the adhesive 99 includes, for example, at least one of an epoxy adhesives, an acrylic adhesives, and a hot-melt adhesive. The adhesive 99 can be omitted.

Preferably, the at least part of the intermediate portion 98 has an outer peripheral part including at least one of a knurl 98A that contacts the base 62 and a protrusion that contacts the base 62. In the present embodiment, the knurl 98A that contacts the base 62 is formed on at least part of the outer peripheral part of the intermediate portion 98 about the center axis C1 of the fastener 36. The knurl 98A can be formed by a straight knurl or a diamond knurl. The knurl 98A is formed, for example, substantially entirely about the center axis C1 of the fastener 36. The knurl 98A can be, for example, intermittently formed about the center axis C1 of the fastener 36 at intervals. In a case in which the intermediate portion 98 does not include the flange 98E, in a direction parallel to the center axis C1 of the fastener 36, the width of the knurl 98A and the width of the protrusion are, for example, less than or equal to 100% and greater than or equal to 10% of the width of the intermediate portion 98. In a case in which the intermediate portion 98 includes the flange 98E, in a direction parallel to the center axis C1 of the fastener 36, the width of the knurl 98A and the width of the protrusion are, for example, less than or equal to 100% and greater than or equal to 10% of the width of the part of the intermediate portion 98 excluding the flange 98E. Preferably, the knurl 98A is formed by a straight knurl. In the present embodiment, the knurl 98A includes multiple projections spaced apart from each other in the circumferential direction about the center axis C1 of the fastener 36 and extending in a direction parallel to the center axis C1 of the fastener 36. In a case in which the intermediate portion 98 includes a protrusion that contacts the base 62, the protrusion that contacts the base 62 can be continuously formed about the center axis C1 of the fastener 36 or can be intermittently formed at intervals about the center axis C1 of the fastener 36.

Preferably, at least one of the knurl 98A that contacts the base 62 and the protrusion that contacts the base 62 is provided at a position separate from the opening of the hole 62A. Preferably, at least one of the knurl 98A and the protrusion includes a first contact portion 98B and a second contact portion 98C. The first contact portion 98B and the second contact portion 98C are spaced apart from each other in a direction in which the hole 62A extends. The direction in which the hole 62A extends includes a direction parallel to the center axis C1 of the fastener 36. In the present embodiment, the intermediate portion 98 includes the knurl 98A. The knurl 98A includes the first contact portion 98B and the second contact portion 98C. Each of the first contact portion 98B and the second contact portion 98C is formed by a straight knurl. The first contact portion 98B is provided on an outer peripheral part of the intermediate portion 98 at a position closer to the head 36B of the fastener 36 than the second contact portion 98C. At least part of the adhesive 99 is provided between the first contact portion 98B and the second contact portion 98C. Preferably, in the outer peripheral part of the intermediate portion 98, the outer diameter of a part between the first contact portion 98B and the second contact portion 98C is smaller than the maximum outer diameter of parts on which the first contact portion 98B and the second contact portion 98C are provided. Thus, the adhesive 99 is readily provided on the portion between the first contact portion 98B and the second contact portion 98C. Part of the adhesive 99 can be provided between the flange 98E of the intermediate portion 98 and the base 62. Part of the adhesive 99 can be provided between the knurl 98A and the base 62. Preferably, in the outer peripheral part of the intermediate portion 98, the maximum outer diameter of a third part 98K that excludes the flange 98E, a first part 98H located adjacent to the flange 98E, and a second part 98J on which the first contact portion 98B and the second contact portion 98C are provided, is smaller than the maximum outer diameter of the second part 98J. Preferably, in a state in which the intermediate portion 98 is press-fitted to the base 62, the second part 98J is at least partially separate from the base 62. Preferably, the second part 98J can be entirely separate from the base 62. At least partial separation of the second part 98J of the intermediate portion 98 from the base 62 allows the adhesive 99 to be stably provided between the second part 98J and the base 62. Preferably, the hardness of the adhesive 99 in a cured state is less than or equal to the hardness of the intermediate portion 98. Preferably, in the outer peripheral part of the intermediate portion 98, the outer diameter of a part adjacent to the first contact portion 98B and the outer diameter of a part adjacent to the second contact portion 98C are smaller than the maximum outer diameter of parts on which the first contact portion 98B and the second contact portion 98C are provided. For example, in a direction parallel to the center axis C1 of the fastener 36, the width of the first contact portion 98B is greater than the width of the second contact portion 99C. In a direction parallel to the center axis C1 of the fastener 36, the width of the first contact portion 98B is, for example, less than or equal to 500% of the width of the second contact portion 98C.

Preferably, at least part of the coupling portion 97 has an outer peripheral part including a knurl 97C that contacts the intermediate portion 98. The knurl 97C is formed, for example, substantially entirely about the center axis C1 of the fastener 36. The knurl 97C can be, for example, intermittently formed about the center axis C1 of the fastener 36 at intervals. In a case in which the coupling portion 97 does not include the flange 97B, in a direction parallel to the center axis C1 of the fastener 36, the width of the knurl 97C is, for example, less than or equal to 100% and greater than or equal to 10% of the width of the coupling portion 97. In a case in which the coupling portion 97 includes the flange 97B, in a direction parallel to the center axis C1 of the fastener 36, the width of the knurl 97C is, for example, less than or equal to 100% and greater than or equal to 10% of the width of the part of the coupling portion 97 excluding the flange 97B. The knurl 97C is formed by a straight knurl. In the present embodiment, the knurl 97A includes multiple projections 97G spaced apart from each other in the circumferential direction about the center axis C1 of the fastener 36 and extending in a direction parallel to the center axis C1 of the fastener 36.

In a case in which the knurl 97C is provided on the coupling portion 97, it is preferred that the intermediate portion 98 has an inner peripheral part including a second knurl 98D that contacts the knurl 97C of the coupling portion 97. In a case in which the knurl 97C is formed by a straight knurl, it is preferred that the second knurl 98D is formed by a straight knurl. The knurl 97C engages the second knurl 98D. The engagement of the knurl 97C with the second knurl 98D that are formed by straight knurls allows movement of the coupling portion 97 in a direction parallel to the center axis C1 of the fastener 36 while limiting rotation of the coupling portion 97 about the center axis C1 of the fastener 36. The width of the second knurl 98D can be equal to the width of the knurl 97C, can be greater than the width of the knurl 97C, or can be less than the width of the knurl 97C in a direction parallel to the center axis C1 of the fastener 36. Preferably, the second knurl 98D is formed on the portion of the inner peripheral part of the intermediate portion 98 excluding the flange 97B. In a direction parallel to the center axis C1 of the fastener 36, the width of the second knurl 98D is, for example, less than or equal to 100% and greater than or equal to 10% of the width of the intermediate portion 98.

For example, at least part of the second knurl 98D of the intermediate portion 98 is provided at a position closer to the head 36B of the fastener 36 than the first contact portion 98B of the knurl 98A, which is formed on the outer peripheral part, in a direction parallel to the center axis C1 of the fastener 36. For example, at least part of the second knurl 98D of the intermediate portion 98 is provided at a position closer to the head 36B of the fastener 36 than the center of the intermediate portion 98 in a direction parallel to the center axis C1 of the fastener 36. For example, at least part of the knurl 97C of the coupling portion 97 is provided at a position closer to the head 36B of the fastener 36 than the first contact portion 98B of the knurl 98A of the intermediate portion 98. For example, at least part of the knurl 97C of the coupling portion 97 is provided at a position closer to the head 36B of the fastener 36 than the center of the coupling portion 97 in a direction parallel to the center axis C1 of the fastener 36. Preferably, in a direction parallel to the center axis C1 of the fastener 36, the outer peripheral part of the coupling portion 97 has a portion located closer to the head 36B of the fastener 36 than the knurl 97C and at least partially contacting an inner peripheral part 98X of the intermediate portion 98. For example, the maximum inner diameter of a part of the intermediate portion 98 on which the second knurl 98D is provided is larger than the maximum inner diameter of a part of the intermediate portion 98 located farther from the head 36B of the fastener 36 than the second knurl 98D. For example, the maximum outer diameter of a part of the coupling portion 97 on which the knurl 97C is provided is larger than the maximum outer diameter of a part of the coupling portion 97 located farther from the head 36B of the fastener 36 than the knurl 97C. For example, the maximum outer diameter of a part of the coupling portion 97 located between the knurl 97C and the flange 97B is larger than the maximum outer diameter of the knurl 97C of the coupling portion 97.

In a process of attaching the human-powered vehicle component 40 to the support 38 by the fasteners 36, as shown in FIG. 16, in a case in which the support 38 is spaced apart from the flange 97B of the coupling portion 97, the fastening of the fasteners 36 moves the coupling portion 97. As a result, as shown in FIG. 17, the flange 97B of the coupling portion 97 contacts the support 38. The flange 97B of the coupling portion 97 is configured to contact the support 38 in a state in which the human-powered vehicle component 40 is attached to the support 38 by the fastener 36. The contact of the flange 97B with the support 38 holds the base 62 on the frame 18 via the intermediate portion 98 and the coupling portion 97 and electrically insulates the base 62 from the frame 18. The intermediate portion 98 is formed so that at least part of the second part 98J is separate from the base 62. Thus, in a state in which the coupling portion 97 is press-fitted to the intermediate portion 98, the compression amount of the intermediate portion 98 is reduced, thereby reducing press-fitting force between the coupling portion 97 and the intermediate portion 98, as compared to a case in which the second part 98J contacts the base 62. The reduction in press-fitting force between the coupling portion 97 and the intermediate portion 98 readily allows the joining force between the intermediate portion 98 and the base 62 to become greater than the joining force between the intermediate portion 98 and the coupling portion 97.

Preferably, the flange 97B includes a surface 97X facing the support 38 and including a third restriction 97D. The third restriction 97D includes at least one projection 97Y. In the present embodiment, the third restriction 97D includes multiple projections 97Y. The projections 97Y are spaced apart from each other about the center axis C1 of the fastener 36. The projections 97Y radially extend with respect to the center axis C1 of the fastener 36. Preferably, the projection 97Y includes a first end surface 97Z and a second end surface 97W about the center axis C1 of the fastener 36, each of the first end surface 97Z and the second end surface 97W is substantially tetragonal and flat, and the projection 97Y is formed by a triangular prism that is tapered from the basal end toward the free end. For example, one of the first end surface 97Z and the second end surface 97W of the projection 97Y that is located at a downstream side in a rotational direction in which the fastener 36 is coupled to the coupling portion 97 extends substantially parallel to the center axis C1 of the fastener 36. In a case in which the flange 97B contacts the support 38, the projection 97Y of the third restriction 97D engages the frame 18 as a wedge and restricts rotation of the intermediate portion 98 relative to the support 38. The shape of the third restriction 97D can be any shape and can be, for example, a recess as long as rotation of the intermediate portion 98 relative to the support 38 is restricted.

The first base portion 63A of the first joint 96A includes a first material having a first standard electrode potential. Preferably, the first base portion 63A of the first joint 96A includes a magnesium alloy. At least part of the housing 42 is formed integrally with the first base portion 63A as a one-piece member. At least one of the inner peripheral part of the second base portion 63B defining the hole 62A and the outer peripheral part of the second base portion 63B can include at least one of a metal oxide film and a paint film.

The coupling portion 97 includes a second material having a second standard electrode potential. Preferably, the second material includes an aluminum alloy. In the present embodiment, the coupling portion 97 is formed by an aluminum alloy. The aluminum alloy is, for example, ADC12. Preferably, the first standard electrode potential differs from the second standard electrode potential.

The second joint 96B includes a metal base 62, a metal coupling portion 100, and an intermediate portion 101. The intermediate portion 101 and the coupling portion 100 are formed by different members. Preferably, the intermediate portion 101 is formed by a resin material. The intermediate portion 101 is formed by the fourth material in the same manner as the intermediate portion 98. The intermediate portion 101 can be formed by rubber.

The coupling portion 100 is provided on the base 62 and is configured to be coupled to the fastener 36. The intermediate portion 101 is provided between the coupling portion 100 and the base 62. Preferably, the intermediate portion 101 is insert-molded to the coupling portion 100. Preferably, the intermediate portion 101 is press-fitted to the hole 62A in the base 62. The coupling portion 100 includes a second female thread portion 100A configured to be coupled to the fastener 36. The second female thread portion 100A is configured to be coupled to the male thread portion 36A of the fastener 36. Preferably, at least part of the coupling portion 100 is tubular. The coupling portion 100 is, for example, substantially round tubular. The coupling portion 100 can be, for example, substantially tubular and have a closed end. The second female thread portion 100A is provided on an inner peripheral part of the coupling portion 100. The intermediate portion 101 is provided on an outer peripheral part of the coupling portion 100. At least part of the intermediate portion 101 is tubular. The intermediate portion 101 is substantially round tubular. The intermediate portion 101 can be, for example, substantially tubular and have a closed end.

Preferably, the coupling portion 100 includes a flange 100B. The flange 100B is provided on an end of the coupling portion 100 in a direction parallel to the center axis C1 of the fastener 36. In a state in which the joint 44 is attached to the support 38 of the human-powered vehicle 10 by the fastener 36, the flange 100B is located between the base 62 of the second joint 96B and the support 38. The flange 100B is greater in size than the diameter of the hole 62A formed in the base 62 of the second joint 96B. In a state in which part of the coupling portion 100 is located in the hole 62A formed in the base 62 of the second joint 96B, the flange 100B is located outside the hole 62A formed in the base 62 of the second joint 96B. The flange 100B is configured to face the support 38 in a state in which the human-powered vehicle component 40 is attached to the support 38 by the fastener 36. The flange 100B is configured to contact the support 38 in a state in which the human-powered vehicle component 40 is attached to the support 38 by the fastener 36. The flange 100B is annular. The flange 100B is substantially annular and round. Preferably, the flange 100B includes an outer peripheral surface 100E extending about the center axis C1 of the fastener 36 and at least one flat surface 100F on the outer peripheral surface 100E. In the present embodiment, the outer peripheral surface 100E of the flange 100B includes multiple flat surfaces 100F. Two of the flat surfaces 100F are symmetrically arranged about the center axis C1 of the fastener 36. Other two of the flat surfaces 100F are symmetrically arranged about the center axis C1 of the fastener 36. Preferably, the support 38 of the frame 18 can include a contact portion configured to contact one of the at least one flat surface 100F on the outer peripheral surface 100E of the flange 100B. In this case, the flat surface 100F on the outer peripheral surface 100E of the flange 100B contacts the contact portion of the support 38, so that rotation of the coupling portion 100 about the center axis C1 of the fastener 36 is hampered during the attachment of the fastener 36. The outer peripheral surface 100F of the flange 100E can engage with a tool.

In the present embodiment, the intermediate portion 101 is non-removably provided on the coupling portion 100 in a non-removable manner. Preferably, at least part of the intermediate portion 101 covers at least part of the outer peripheral surface of the tubular part of the coupling portion 100. Preferably, the intermediate portion 101 is configured to cover a part of the second base portion 63B that is not covered by the first base portion 63A. The intermediate portion 101 is configured to cover, for example, a region in which the first base portion 63A is in contact with the second base portion 63B. In the present embodiment, the intermediate portion 101 includes a flange 101E. The flange 101E is provided on an end of the intermediate portion 101 in a direction parallel to the center axis C1 of the fastener 36. The flange 101E is provided between the flange 100B of the coupling portion 100 and the base 62 in a direction parallel to the center axis C1 of the fastener 36. The flange 101E contacts the first end surface 63E of the second base portion 63B and covers the first end surface 63E of the second base portion 63B. The flange 101E can be formed to contact the first end surface 63E of the second base portion 63B and a part of the first base portion 63A that abuts the first end surface 63E of the second base portion 63B. The flange 101E can be adhered to the first end surface 63E of the second base portion 63B and the part of the first base portion 63A that abuts the first end surface 63E of the second base portion 63B by an adhesive 99. This limits entrance of water into the interface between the first base portion 63A and the second base portion 63B and inhibits electrolytic corrosion in the interface between the first base portion 63A and the second base portion 63B. In a direction parallel to the center axis C1 of the fastener 36, the part of the intermediate portion 101 excluding the flange 101E is longer than the second base portion 63B. The intermediate portion 101 can be formed to contact the second end surface 63F of the second base portion 63B and a part of the first base portion 63A that abuts the second end surface 63F of the second base portion 63B. The intermediate portion 101 can be adhered to the second end surface 63F of the second base portion 63B and the part of the first base portion 63A that abuts the second end surface 63F of the second base portion 63B by the adhesive 99. This limits entrance of water into the interface between the first base portion 63A and the second base portion 63B and inhibits electrolytic corrosion in the interface between the first base portion 63A and the second base portion 63B. Before the human-powered vehicle component 40 is attached to the support 38 by the fastener 36, the flange 100B of the coupling portion 100 is in contact with the flange 101E of the intermediate portion 101.

The flange 101E is annular. The flange 101E is substantially annular and round. The flange 101E includes, for example, an outer peripheral surface 101F extending about the center axis C1 of the fastener 36 and at least one flat surface 101G on the outer peripheral surface 101F. In the present embodiment, the outer peripheral surface 100E of the flange 100B includes multiple flat surfaces 101G. Two of the flat surfaces 101G are symmetrically arranged about the center axis C1 of the fastener 36. The flat surface 101G on the outer peripheral surface 101F of the flange 101E can contact the contact portion of the support 38. In this case, rotation of the intermediate portion 101 in the center axis C1 of the fastener 36 is hampered during the attachment of the fastener 36. The outer peripheral surface 101F of the flange 101E can engage with a tool. In the present embodiment, the flange 101E of the intermediate portion 101 covers at least part of the outer peripheral surface 100E of the flange 100B of the coupling portion 100. In the present embodiment, the flange 101E of the intermediate portion 101 covers the outer peripheral surface 100E of the flange 100B of the coupling portion 100 so that at least part of two of the flat surfaces 100F of the coupling portion 100 is exposed. For example, one of the two flat surfaces 100F of the coupling portion 100 is coplanar with one of the two flat surfaces 101G of the intermediate portion 101. For example, the other one of the two flat surfaces 100F of the coupling portion 100 is coplanar with the other one of the two flat surfaces 101G of the intermediate portion 101. The flange 101E of the intermediate portion 101 does not necessarily have to cover the outer periphery of the flange 100B of the coupling portion 100.

Preferably, the intermediate portion 101 is adhered to the base 62 by the adhesive 99 applied to the hole 62A. The adhesive 99 readily increases the joining force between the intermediate portion 101 and the base 62. The adhesive 99 can be omitted.

Preferably, at least part of the intermediate portion 101 has an outer peripheral part including at least one of a knurl that contacts the base 62 and a protrusion 101A that contacts the base 62. In the present embodiment, the protrusion 101A that contacts the base 62 is formed on at least part of the outer peripheral part of the intermediate portion 101 about the center axis C1 of the fastener 36. The protrusion 101A is formed, for example, substantially entirely about the center axis C1 of the fastener 36. The protrusion 101A can be, for example, intermittently formed about the center axis C1 of the fastener 36 at intervals. In a case in which the intermediate portion 101 does not include the flange 101E, in a direction parallel to the center axis C1 of the fastener 36, the width of the protrusion 101A and the width of the knurl are, for example, less than or equal to 100% and greater than or equal to 10% of the width of the intermediate portion 101. In a case in which the intermediate portion 101 includes the flange 101E, in a direction parallel to the center axis C1 of the fastener 36, the width of the protrusion 101A and the width of the knurl are, for example, less than or equal to 100% and greater than or equal to 10% of the width of the part of the intermediate portion 101 excluding the flange 101E. The knurl can be formed by a straight knurl or a diamond knurl. In the present embodiment, the protrusion 101A includes an annular projection 101X that continues about the center axis C1 of the fastener 36. In a case in which the intermediate portion 101 includes a knurl that contacts the base 62, the knurl that contacts the base 62 can be continuously formed about the center axis C1 of the fastener 36 or can be intermittently formed at intervals about the center axis C1 of the fastener 36.

Preferably, at least one of the knurl that contacts the base 62 and the protrusion 101A that contacts the base 62 is provided at a position separate from the opening of the hole 62A. Preferably, at least one of the knurl and the protrusion 101A includes a first contact portion 101B and a second contact portion 101C. The first contact portion 101B and the second contact portion 101C are spaced apart from each other in a direction in which the hole 62A extends. The direction in which the hole 62A extends includes a direction parallel to the center axis C1 of the fastener 36. In the present embodiment, the intermediate portion 101 includes the protrusion 101A. The protrusion 101A includes the first contact portion 101B and the second contact portion 101C. Each of the first contact portion 101B and the second contact portion 101C is formed by a projection. Preferably, the first contact portion 101B is a large diameter portion. Preferably, the second contact portion 101C is a large diameter portion. The first contact portion 101B is provided on an outer peripheral part of the intermediate portion 101 at a position closer to the head 36B of the fastener 36 than the second contact portion 101C. At least part of the adhesive 99 is provided between the first contact portion 101B and the second contact portion 101C. Preferably, in the outer peripheral part of the intermediate portion 101, the outer diameter of a part between the first contact portion 101B and the second contact portion 101C is smaller than the maximum outer diameter of parts on which the first contact portion 101B and the second contact portion 101C are provided. Thus, the adhesive 99 is readily provided on the portion between the first contact portion 101B and the second contact portion 101C. Part of the adhesive 99 can be provided between the flange 101E of the intermediate portion 101 and the base 62. Part of the adhesive 99 can be provided between the protrusion 101A and the base 62. Preferably, in the outer peripheral part of the intermediate portion 101, the maximum outer diameter of a third part 101W that excludes the flange 101E, a first part 101Y located adjacent to the flange 101E, and a second part 101Z on which the first contact portion 101B and the second contact portion 101C are provided, is smaller than the maximum outer diameter of the second part 101Z. Preferably, in a state in which the intermediate portion 101 is press-fitted to the base 62, the second part 101Z is at least partially separate from the base 62. Preferably, the second part 101Z can be entirely separate from the base 62. At least partial separation of the second part 101Z of the intermediate portion 101 from the base 62 allows the adhesive 99 to be stably provided between the second part 101Z and the base 62. Preferably, in an outer peripheral part 101V of the intermediate portion 101, the outer diameter of a part adjacent to the first contact portion 101B and the outer diameter of a part adjacent to the second contact portion 101C are smaller than the maximum outer diameter of parts on which the first contact portion 101B and the second contact portion 101C are provided. For example, in a direction parallel to the center axis C1 of the fastener 36, the width of the first contact portion 101B is greater than the width of the second contact portion 101C. In a direction parallel to the center axis C1 of the fastener 36, the width of the first contact portion 101B is, for example, less than or equal to 500% of the width of the second contact portion 101C.

Preferably, at least part of the coupling portion 100 has an outer peripheral part including a knurl 100C that contacts the intermediate portion 101. The knurl 100C is formed, for example, substantially entirely about the center axis C1 of the fastener 36. The knurl 100C can be, for example, intermittently formed about the center axis C1 of the fastener 36 at intervals. In a case in which the coupling portion 100 does not include the flange 100B, in a direction parallel to the center axis C1 of the fastener 36, the width of the knurl 100C is, for example, less than or equal to 100% and greater than or equal to 10% of the width of the coupling portion 100. In a case in which the coupling portion 100 includes the flange 100B, in a direction parallel to the center axis C1 of the fastener 36, the width of the knurl 100C is, for example, less than or equal to 100% and greater than or equal to 10% of the width of the part of the coupling portion 100 excluding the flange 100B. The knurl 100C is formed by a straight knurl. In the present embodiment, the knurl 100C includes multiple projections 100X spaced apart from each other in the circumferential direction about the center axis C1 of the fastener 36 and extending in a direction parallel to the center axis C1 of the fastener 36.

In a case in which the knurl 100C is provided on the coupling portion 100, it is preferred that the intermediate portion 101 has an inner peripheral part including a second knurl 101D that contacts the knurl 100C of the coupling portion 100. In a case in which the knurl 100C is formed by a straight knurl, it is preferred that the second knurl 101D is formed by a straight knurl. The knurl 100C engages the second knurl 101D. The width of the second knurl 101D can be equal to the width of the knurl 100C, can be greater than the width of the knurl 100C, or can be less than the knurl 100C in a direction parallel to the center axis C1 of the fastener 36. Preferably, the second knurl 101D is formed on the portion of the inner peripheral part of the intermediate portion 101 excluding the flange 100B. In a direction parallel to the center axis C1 of the fastener 36, the width of the second knurl 101D is, for example, less than or equal to 100% and greater than or equal to 10% of the width of the intermediate portion 101.

For example, at least part of the second knurl 101D of the intermediate portion 101 is provided at a position farther from the head 36B of the fastener 36 than the second contact portion 101C of the protrusion 101A, which is formed on the outer peripheral part, in a direction parallel to the center axis C1 of the fastener 36. For example, at least part of the knurl 100C of the coupling portion 100 is provided at a position farther from the head 36B of the fastener 36 than the first contact portion 101B of the protrusion 101A of the intermediate portion 101 in a direction parallel to the center axis C1 of the fastener 36. For example, at least part of the knurl 100C of the coupling portion 100 is provided at a position farther from the head 36B of the fastener 36 than the center of the coupling portion 100 in a direction parallel to the center axis C1 of the fastener 36. Preferably, in a direction parallel to the center axis C1 of the fastener 36, at least part of the coupling portion 100 that is closer to the head 36B of the fastener 36 than the knurl 100C contacts an inner peripheral part 101U of the intermediate portion 101. For example, the maximum inner diameter of a part of the intermediate portion 101 on which the second knurl 101D is provided is smaller than the maximum inner diameter of a part of the intermediate portion 101 located closer to the head 36B of the fastener 36 than the second knurl 101D. For example, the maximum outer diameter of a part of the coupling portion 100 on which the knurl 100C is provided is smaller than the maximum outer diameter of a part of the coupling portion 100 located closer to the head 36B of the fastener 36 than the knurl 100C.

Preferably, the coupling portion 100 has an outer peripheral part including a fourth restriction 100S. The fourth restriction 100S includes at least one recess 100T. The intermediate portion 101 has an inner peripheral part including a fifth restriction 101S that contacts the fourth restriction 100S. The fifth restriction 101S includes at least one projection 101T that contacts at least one of the at least one recess 100T. The fourth restriction 100S is located between the knurl 100C and the flange 100B. The at least one projection 101T of the fifth restriction 101S is located between the second knurl 101D and the flange 101E. The fourth restriction 100S and the fifth restriction 101S contact each other in a direction parallel to the center axis C1 of the fastener 36, and the fourth restriction 100S and the fifth restriction 101S contact each other about the center axis C1 of the fastener 36. Thus, movement relative to the intermediate portion 101 is restricted. Preferably, the fourth restriction 100S and the fifth restriction 101S have complementary shapes. The fourth restriction 100S can include at least one projection instead of or in addition to the at least one recess 100T. The fifth restriction 101S can include at least one recess instead of or in addition to the at least one projection 101T. The fourth restriction 100S and the fifth restriction 101S can be omitted. The second knurl 101D of the intermediate portion 101 and the knurl 100C of the coupling portion 100 can be omitted.

The first base portion 63A of the second joint 96B includes a first material having a first standard electrode potential. Preferably, the first base portion 63A of the second joint 96B includes a magnesium alloy. At least part of the housing 42 is formed integrally with the first base portion 63A as a one-piece member. At least one of the inner peripheral part of the second base portion 63B defining the hole 62A and the outer peripheral part of the second base portion 63B can include at least one of a metal oxide film and a paint film.

The coupling portion 100 includes a second material having a second standard electrode potential. Preferably, the second material includes an aluminum alloy. In the present embodiment, the coupling portion 100 is formed by an aluminum alloy. The aluminum alloy is, for example, ADC12. Preferably, the first standard electrode potential differs from the second standard electrode potential.

Fourth Embodiment

A fourth embodiment of a human-powered vehicle component 40 will be described with reference to FIGS. 24 to 28. The human-powered vehicle component 40 of the fourth embodiment is the same as the human-powered vehicle component 40 of the first embodiment except for the configurations of a speed reducer 40B. The same reference characters are given to those elements that are the same as the corresponding elements of the first embodiment. Such elements will not be described in detail.

The human-powered vehicle component 40 of the present embodiment includes the housing 42, the motor 46 provided on the housing 42, and the speed reducer 40B coupled to the motor 46. The speed reducer 40B includes multiple gears 110.

The speed reducer 40B includes a first rotary body 112, a first rotational shaft 114, and a second rotary body 116. The first rotary body 112 has a larger diameter than the second rotary body 116. The first rotary body 112 is provided on the output portion 40A to rotate integrally with the output portion 40A. The first rotary body 112 and the output portion 40A are formed, for example, integrally with each other as a one-piece member. The first rotary body 112 and the output portion 40A are formed by, for example, metal. The first rotary body 112 and the output portion 40A can be separately formed and fixed to each other so as not to rotate relative to each other. The first rotary body 112 can be formed from, for example, resin. The first rotational shaft 114 has a rotational axis CA that differs from a rotational axis CM of the motor 46. The rotational axis CA is substantially parallel to the rotational axis CM of the motor 46. The second rotary body 116 is provided on the first rotational shaft 114 by the third one-way clutch 40Y and connected to the first rotary body 112 directly or via a ring member. In the present embodiment, the second rotary body 116 is a gear having teeth provided on the outer peripheral part. The first rotary body 112 is a gear having teeth provided on the outer peripheral part. Engagement of the teeth of the second rotary body 116 with the teeth of the first rotary body 112 directly connects the second rotary body 116 and the first rotary body 112. The first rotary body 112 and the second rotary body 116 can be indirectly connected by a ring member. The ring member includes, for example, a belt or a pulley. For example, the first rotary body 112 and the second rotary body 116 can be pulleys, and the ring member can be a belt. For example, the first rotary body 112 and the second rotary body 116 can be sprockets, and the ring member can be a chain. The first rotational shaft 114 is supported by two fourth bearings 41D on the housing 42 so as to rotate relative to the housing 42. The two fourth bearings 41D respectively support opposite axial ends of the first rotational shaft 114. One of the two fourth bearings 41D is supported by a recess provided in the first side surface of the housing 42. The other one of the two fourth bearings 41D is supported by a recess provided in an inner peripheral part of the second side surface of the housing 42. Each of the two fourth bearings 41D can be a ball bearing, a roller bearing, or a plain bearing. The first rotational shaft 114 supports the second rotary body 116. The first rotational shaft 114 is coaxial with the second rotary body 116. The second rotary body 116 is annular and is located at a radially outer side of the first rotational shaft 114. The third one-way clutch 40Y can be provided between a third rotary body 122 and the first rotational shaft 114 instead of being provided between the second rotary body 116 and the first rotational shaft 114.

The speed reducer 40B includes, for example, a first speed reducing part 118 and a second speed reducing part 120. The first speed reducing part 118 includes the first rotary body 112, the first rotational shaft 114, and the second rotary body 116. The second speed reducing part 120 is provided on a first power transmission path between the motor 46 and the first speed reducing part 118. Preferably, the second speed reducing part 120 includes the third rotary body 122, a second rotational shaft 124, and a fourth rotary body 126. The third rotary body 122 has a larger diameter than the fourth rotary body 126. The third rotary body 122 is configured to rotate integrally with the first rotational shaft 114 and has a smaller diameter than the second rotary body 116. The third rotary body 122 and the first rotational shaft 114 are separately formed and fixed to each other so as not to rotate relative to each other. The first rotational shaft 114 is formed by, for example, metal. The third rotary body 122 is formed by, for example, resin or metal. The third rotary body 122 and the first rotational shaft 114 can be formed integrally with each other as a one-piece member. The second rotary body 116 and the third rotary body 122 are located between the two fourth bearings 41D in the axial direction of the first rotational shaft 114. The second rotary body 116 and the third rotary body 122 are located adjacent to the two fourth bearings 41D, respectively. The fourth rotary body 126 is configured to rotate integrally with the second rotational shaft 124 and is connected to the third rotary body 122 directly or via a ring member. In the present embodiment, the fourth rotary body 126 is a gear having teeth provided on the outer peripheral part. The third rotary body 122 is a gear having teeth provided on the outer peripheral part. Engagement of the teeth of the fourth rotary body 126 with the teeth of the third rotary body 122 directly connects the fourth rotary body 126 and the third rotary body 122. The second rotational shaft 124 has a rotational axis CB that differs from the rotational axis CM and the rotational axis CA. The rotational axis CB is substantially parallel to the rotational axis CM and the rotational axis CA. The second rotational shaft 124 is supported by two fifth bearings 41E on the housing 42 so as to rotate relative to the housing 42. The two fifth bearings 41E respectively support opposite axial ends of the second rotational shaft 124. Each of the fifth bearings 41E can be a ball bearing, a roller bearing, or a plain bearing.

In the present embodiment, the speed reducer 40B further includes a third speed reducing part 128. The third speed reducing part 128 includes a fifth rotary body 130 and a sixth rotary body 132. The fifth rotary body 130 has a larger diameter than the sixth rotary body 132. The fifth rotary body 130 is located at a side of the fourth rotary body 126 closer to the second side surface of the housing 42 in the axial direction of the input rotational shaft 12A. The fifth rotary body 130 is provided on the second rotational shaft 124 to rotate integrally with the second rotational shaft 124. The sixth rotary body 132 is provided on the output shaft 46A of the motor 46 to rotate integrally with the output shaft 46A. The fourth rotary body 126 and the fifth rotary body 130 are located between the two fifth bearings 41E in the axial direction of the second rotational shaft 124. The fourth rotary body 126 and the fifth rotary body 130 are located adjacent to the two fifth bearings 41E, respectively. The sixth rotary body 132 can be formed integrally with the output shaft 46A of the motor 46 as a one-piece member or can be formed separately from the output shaft 46A of the motor 46 and joined with the output shaft 46A. The sixth rotary body 132 is formed by, for example, metal or resin. The output shaft 46A of the motor 46 is formed by, for example, metal. In the present embodiment, the sixth rotary body 132 is a gear having teeth provided on the outer peripheral part. The fifth rotary body 130 is a gear having teeth provided on the outer peripheral part. Engagement of the teeth of the sixth rotary body 132 with the teeth of the fifth rotary body 130 directly connects the sixth rotary body 132 and the fifth rotary body 130. In a case in which each of the first rotary body 112, the second rotary body 116, the third rotary body 122, the fourth rotary body 126, the fifth rotary body 130, and the sixth rotary body 132 is a gear, at least two of the gears that engage with each other can be spur gears or helical gears.

In the present embodiment, the gears 110 include the first rotary body 112, the second rotary body 116, the third rotary body 122, the fourth rotary body 126, the fifth rotary body 130, and the sixth rotary body 132. In the present embodiment, at least one of the gears 110 includes a tooth portion 110A including a thermosetting resin. Preferably, the thermosetting resin includes at least one of polyaminoamide, phenol, and polyimide. Preferably, the teeth portion 110A includes a reinforcing fiber embedded in the thermosetting resin. Preferably, the reinforcing fiber includes at least one of a glass fiber, an aramid fiber, and a potassium titanate fiber.

In the present embodiment, at least one of the teeth portion 110A of the gears 110 includes the thermosetting resin. In the present embodiment, the fifth rotary body 130 includes a tooth portion 136A including the thermosetting resin. The gears 110 include a first gear 134 provided on the output shaft 46A and a second gear 136 engaged with the first gear 134. In the present embodiment, the first gear 13 is the sixth rotary body 132. In the present embodiment, the second gear 136 is the fifth rotary body 130. The gears 110 include a third gear 138 that rotates integrally with the second gear 136. The third gear 138 is formed integrally with a shaft 136B of the second gear 136 as a one-piece member. In the present embodiment, the third gear 138 is the fourth rotary body 126. In the present embodiment, the teeth portion 110A of the at least one of the gears 110 is the tooth portion 136A of the second gear 136. In the present embodiment, the shaft 136B is the second rotational shaft 124. The tooth portion 136A of the second gear 136 includes the thermosetting resin. In the present embodiment, the first gear 134 is formed by metal. In the present embodiment, the third gear 138 is formed by metal.

Preferably, the second gear 136 includes the shaft 136B and the tooth portion 136A formed separately from the shaft 136B and provided on the shaft 136B to rotate integrally with the shaft 136B. Preferably, the shaft 136B is formed by metal. Preferably, the shaft 136B is formed by a hollow shaft. The shaft 136B can be formed by a solid shaft. The tooth portion 136A is annular and includes an inner peripheral part 137B including a first coupler 140 coupled to the shaft 136B. The tooth portion 136A includes an outer peripheral part 137A, the inner peripheral part 137B, and an intermediate part 137C located between the outer peripheral part 137A and the inner peripheral part 137B. The outer peripheral part 137A of the tooth portion 136A includes teeth. In the axial direction of the shaft 136B, a width W1 of the inner peripheral part 137B of the tooth portion 136A is smaller than a width W2 of the outer peripheral part 137A of the tooth portion 136A.

In the axial direction of the shaft 136B, a width W3 of the intermediate part 137C of the tooth portion 136A is smaller than the width W2 of the outer peripheral part 137A of the tooth portion 136A. The width W3 of the intermediate part 137C and the width W1 of the inner peripheral part 137B, which are smaller than the width W2 of the outer peripheral part 137A, reduce the weight of the second gear 136. At least one hole 137D can be formed in the inner peripheral part 137B and extend in the axial direction of the shaft 136B. The at least one hole 137D can be a through hole or can be a blind hole. In a case in which the at least one hole 137D includes multiple holes 137D, it is preferred that the holes 137D are identical in shape and rotationally symmetrically arranged about the axis of the shaft 136B at equal intervals about the axis of the shaft 136B. Formation of the at least one hole 137D reduces the weight of the second gear 136. Preferably, the width W2 is greater than or equal to 10% and less than or equal to 90% of the width W1 and the width W3. As viewed in a direction orthogonal to the axial direction of the shaft 136B, the inner peripheral part 137B of the tooth portion 136A is located between opposite end surfaces of the outer peripheral part 137A of the tooth portion 136A. As viewed in a direction orthogonal to the axial direction of the shaft 136B, the intermediate part 137C of the tooth portion 136A is located between the opposite end surfaces of the outer peripheral part 137A of the tooth portion 136A. In the present embodiment, the width W1 is equal to the width W3. The width W1 can be smaller than or larger than the width W3. The tooth portion 136A is a one-piece member.

The shaft 136B includes opposite axial ends 136X including a first bearing coupler 136Y and a second bearing coupler 136Z respectively coupled to the two fifth bearings 41E. The first bearing coupler 136Y and the second bearing coupler 136Z have a smaller diameter than the portion of the shaft 136B excluding the first bearing coupler 136Y and the second bearing coupler 136Z. In the present embodiment, the first bearing coupler 136Y and the second bearing coupler 136Z have the same diameter. The first bearing coupler 136Y can have a larger diameter or a smaller diameter than the second bearing coupler 136Z. The first bearing coupler 136Y is located at an inner side of the tooth portion 136A in a radial direction of the tooth portion 136A. Preferably, the shaft 136B includes an outer peripheral part 136C including a second coupler 142 coupled to the first coupler 140. The second coupler 142 is adjacent to the first bearing coupler 136Y in the axial direction of the shaft 136B.

The first coupler 140 includes a female thread portion 144. The second coupler 142 includes a male thread portion 146. The first coupler 140 includes a threadless first part 148 having a larger inner diameter than the female thread portion 144. The female thread portion 144 is adjacent to the first part 148 in the axial direction of the shaft 136B. The female thread portion 144 is located farther from the first bearing coupler 136Y than the first part 148 in the axial direction of the shaft 136B. The second coupler 142 includes a threadless second part 150 having a larger outer diameter than the male thread portion 146. The second part 150 is located proximate to the first part 148 to face the first part 148 or contacts the first part 148 in a radial direction of the second gear 136. The male thread portion 146 is adjacent to the second part 150 in the axial direction of the shaft 136B. The male thread portion 146 is located farther from the first bearing coupler 136Y than the second part 150 in the axial direction of the shaft 136B. In the axial direction of the shaft 136B, a width W4 of the female thread portion 144 is greater than or equal to 10% and less than or equal to 100% of the width W1 and, preferably, greater than or equal to 30% and less than or equal to 70% of the width W1. In the axial direction of the shaft 136B, a width W6 of the male thread portion 146 is greater than or equal to 10% and less than or equal to 100% of a width W5 of the second coupler 142 and, preferably, greater than or equal to 30% and less than or equal to 70% of the width W5 of the second coupler 142. The first part 148 and the second part 150 can be omitted.

Preferably, at least a portion of the first part 148 contacts at least a portion of the second part 150 in a radial direction of the second gear 136. This limits inclination of the axis of the second gear 136 from the axis of the shaft 136B during the coupling of the tooth portion 136A to the shaft 136B. In a case in which the motor 46 applies propulsion force to the human-powered vehicle 10, it is preferred that the motor 46 is configured to rotate the second gear 136 in a direction in which the first coupler 140 is fastened to the second coupler 142.

The human-powered vehicle component 40 further includes a washer 152. In an axial direction B of the shaft 136B, the washer 152 is provided between the third gear 138 and at least one of the shaft 136B and the tooth portion 136A. The washer 152 includes an engagement portion 154 engaged with the tooth portion 136A and at least one of the shaft 136B and the third gear 138. In the present embodiment, the washer 152 is provided between the tooth portion 136A and the third gear 138 in the axial direction B of the shaft 136B. Preferably, the washer 152 is formed by a metal material. The washer 152 can be formed by a resin material. The washer 152 includes a ring 152A and the engagement portion 154 provided on an inner peripheral part of the ring 152A. The engagement portion 154 includes at least one projection 152B projecting inward from the inner peripheral part of the ring 152A. The ring 152A and the at least one projection 152B are formed integrally with each other as a one-piece member. The washer 152 is provided on an outer peripheral part of the shaft 136B. The first coupler 140 is fastened to the second coupler 142, so that the washer 152 is held between the tooth portion 136A and the third gear 138. The minimum radius of the third gear 138 is larger than the maximum radius of the second part 150. The at least one projection 152B is provided between the inner peripheral part 137B of the tooth portion 136A and the third gear 138 and is in contact with the tooth portion 136A and the third gear 138. Preferably, at least part of the ring 152A is held between the tooth portion 136A and the third gear 138 and is in contact with the tooth portion 136A and the third gear 138. The washer 152 is harder than the tooth portion 136A. The washer 152 is harder than the third gear 138. In a radial direction of the tooth portion 136A, at least part of the washer 152 is located at an inner side of the outer peripheral part 137A of the tooth portion 136A. The outer diameter of the washer 152 is smaller than the inner diameter of the outer peripheral part 137A of the tooth portion 136A. In the present embodiment, the outer diameter of the washer 152 is larger than the maximum radius of the third gear 138.

Preferably, the at least one projection 152B includes multiple projections 152B. The projections 152B are each plate-shaped. Each projection 152B extends in a radial direction of the washer 152 and is twisted from a basal end toward a free end with respect to an axis extending through the center of the projection 152B. In a state in which the washer 152 is removed or in a state before the washer 152 is attached, it is preferred that at least part of each projection 152B projects toward one side B1 of the axial direction B of the shaft 136B from the surface of the ring 152A located at the one side B1 of the axial direction B of the shaft 136B. Preferably, at least part of each projection 152B projects toward the other side B2 of the axial direction B of the shaft 136B from the surface of the ring 152A located at the other side B2 of the axial direction B of the shaft 136B. The projections 152B include parts 153A projecting toward the one side B1 of the axial direction B of the shaft 136B. The parts 153A contact the tooth portion 136A. The projections 152B include parts 153B projecting toward the other side B2 of the axial direction B of the shaft 136B. The parts 153B contact the third gear 138. Preferably, the parts 153A of projections 152B, which project toward the one side B1 of the axial direction B of the shaft 136B, engage with the tooth portion 136A. Preferably, the parts 153A of projections 152B, which project toward the one side B1 of the axial direction B of the shaft 136B, engage with the third gear 138. Preferably, the projections 152B are rotationally symmetrically arranged about the axis of the shaft 136B at equal intervals about the axis of the shaft 136B.

Fifth Embodiment

Figure 29:
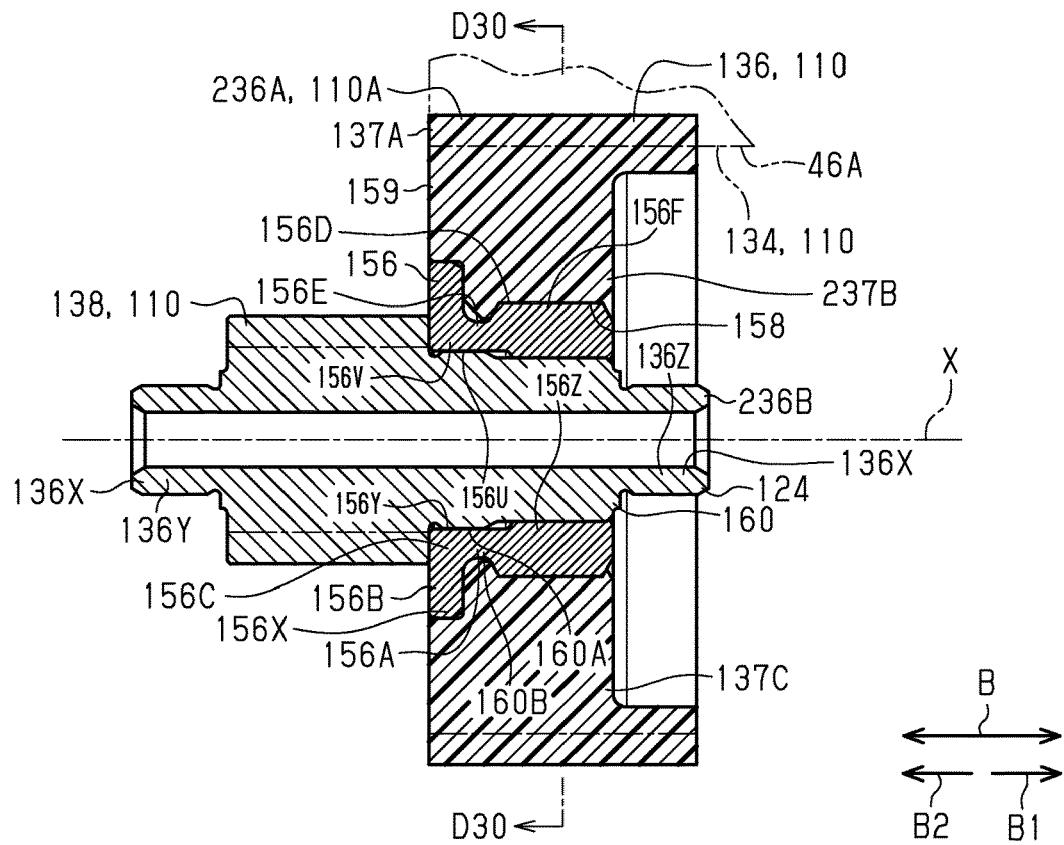
FIG. 29 is a cross-sectional view of a second gear and a third gear in accordance with a fourth embodiment.
Figure 30:
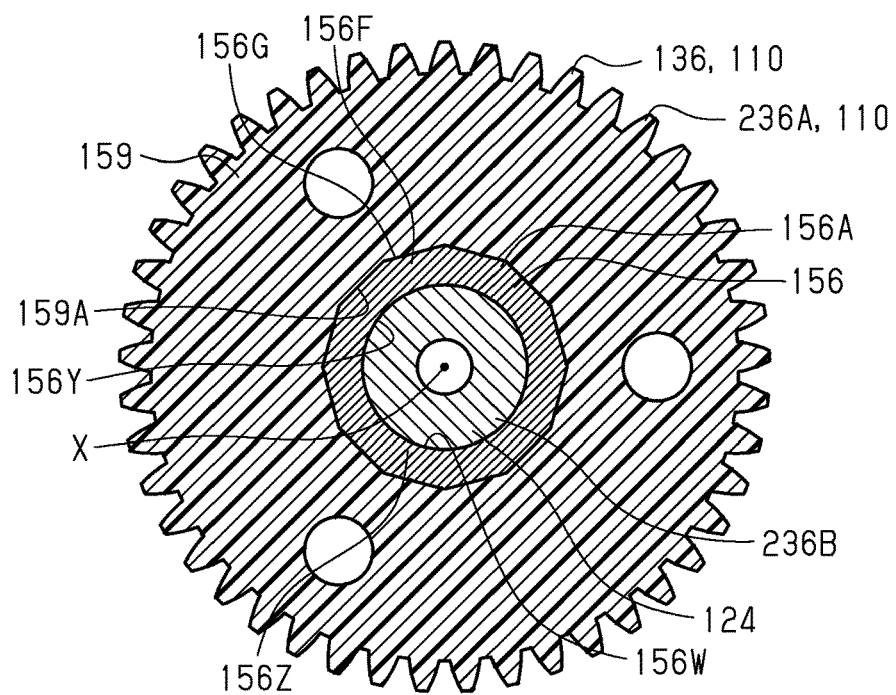
FIG. 30 is a cross-sectional view of the human-powered vehicle component taken along line D30-D30 in FIG. 29.

A fifth embodiment of a human-powered vehicle component 40 will be described with reference to FIGS. 29 and 30. The human-powered vehicle component 40 of the fifth embodiment is the same as the human-powered vehicle component 40 of the fourth embodiment except for an attachment structure of a tooth portion 236A of the second gear 136 to a shaft 236B. The same reference characters are given to those elements that are the same as the corresponding elements of the first to fourth embodiments. Such elements will not be described in detail.

The tooth portion 236A of the human-powered vehicle component 40 of the present embodiment differs from the tooth portion 136A of the fourth embodiment only in the structure of an inner peripheral part 237B and have substantially the same structure in the outer peripheral part 137A and the intermediate part 137C. The tooth portion 236A includes a first coupler 158 instead of the first coupler 140 of the fourth embodiment. The first coupler 158 includes a coupling member 156. The tooth portion 236A of the present embodiment is annular, and the inner peripheral part 237B includes the first coupler 158 coupled to the shaft 236B by the coupling member 156. In the present embodiment, the tooth portion 136A is formed by multiple members. The tooth portion 136A includes the first coupler 158 and a tooth body 159 provided on an outer peripheral part of the first coupler 158. The outer peripheral part 137A and the intermediate part 137C of the tooth portion 236A are formed by the same material as the tooth portion 136A of the fourth embodiment. The shaft 136B includes a second coupler 160 instead of the second coupler 142 of the fourth embodiment. The shaft 236B includes an outer peripheral part including the second coupler 160 coupled to the first coupler 158 by the coupling member 156.

The coupling member 156 is formed by a metal material. The coupling member 156 includes a tube 156A and a flange 156B. The flange 156B is provided on an end 156C of the tube 156A located adjacent to the third gear 138 in the axial direction of the shaft 236B. The flange 156B extends radially outward from an outer peripheral part of the end 156C. The flange 156B is annular and round. The tooth body 159 is fixed to the coupling member 156 by insert molding.

The coupling member 156 includes a sixth restriction 156D that restricts movement of the tooth body 159 relative to the coupling member 156. The sixth restriction 156D is configured to hinder movement of the tooth body 159 relative to the coupling member 156 in the axial direction of the shaft 236B and hinder rotation of the tooth body 159 relative to the coupling member 156 about the axis of the shaft 236B. The sixth restriction 156D includes at least one of a recess 156E and a projection 156F. The recess 156E is provided adjacent to the flange 156B on an outer peripheral part of the tube 156A. In the present embodiment, the recess 156E is continuous along an entire circumference of the tube 156A about the axis of the shaft 236B. The recess 156E can be intermittently formed on the outer peripheral part of the tube 156A about the axis of the shaft 236B. The projection 156F is formed adjacent to the recess 156E on the tube 156A. The projection 156F projects outward in a radial direction of the second gear 136 from the round tubular surface about the axis of the shaft 236B. The projection 156F includes at least one projection 156F. In the present embodiment, the projection 156F includes multiple projections 156F. The projections 156F are formed by shaping an outer peripheral surface 156G of the tube 156A as a polygonal tube. For example, the outer peripheral surface 156G is formed so that at least part of the contour of the outer peripheral surface 156G of the tube 156A is a regular polygon in a plane orthogonal to the axial direction of the shaft 236B. In the present embodiment, at least part of the contour of the outer peripheral surface 156G of the tube 156A is a regular dodecagon in the plane orthogonal to the axial direction of the shaft 236B. Preferably, the first coupler 158 has a rotationally symmetrical shape with respect to an axis X of the shaft 236B. The tooth body 159 includes an inner peripheral part 159A that contacts the recess 156E. The inner peripheral part 159A of the tooth body 159 contacts the projection 156F. The inner peripheral part 159A of the tooth body 159 contacts an outer peripheral part 156X of the flange 156B and a side surface of the flange 156B located toward the first bearing coupler 136Y.

The coupling member 156 has an inner peripheral part 156Y including a seventh restriction 156Z that restricts rotation of the first coupler 158 relative to the second coupler 160 about the axis X of the shaft 236B. The seventh restriction 156Z includes at least one of a recess and a projection. The inner peripheral part 156Y of the coupling member 156 includes a first part 156V that faces or contacts the outer peripheral part of the second coupler 160 in a radial direction of the second gear 136. The minimum inner diameter of the first part 156V is larger than the maximum inner diameter of the seventh restriction 156Z. The first part 156V includes an inner peripheral surface 156W including, for example, a round tubular surface. The seventh restriction 156Z includes an inner peripheral surface 156U that is, for example, polygonal-tube-shaped. The seventh restriction 156Z is located farther from the first bearing coupler 136Y than the first part 156V. The tube 156A has an inner peripheral part joined with the second coupler 160. For example, the second coupler 160 is press-fitted to the inner peripheral part of the tube 156A. The second coupler 160 includes an outer peripheral part 160B including an eighth restriction 160A that contacts the seventh restriction 156Z. The eighth restriction 160A is formed on the outer peripheral part 160B of the second coupler 160. The eighth restriction 160A and the seventh restriction 156Z have complementary shapes.

The flange 156B contacts the third gear 138 in the axial direction B of the shaft 136B. After the tooth body 159 is fixed to the first coupler 158 by insert-molding, the shaft 236B is press-fitted to the tooth portion 236A. This allows appropriate materials to be used in the shaft 236B and the tooth body 159. The coupling member 156 can be coupled to the tooth body 159 by a thread structure. The sixth restriction 156D can be formed by a male thread. The inner peripheral part 159A of the tooth body 159 can be formed by a female thread that is engaging the mail thread of the sixth restriction 156D. When the motor gives the man-powered vehicle propulsion, the tooth body 159 rotates in the direction screwed into coupling member 156. The coupling member 156 can be coupled to the second coupler 16 of shaft 136B by a thread structure. The seventh restriction 156Z can be formed by a female thread. The outer peripheral portion of the second coupler 16 can be formed by a male thread that is engaging the female thread of the seventh restriction 156z. When the motor gives the man-powered vehicle propulsion, the coupling member 156 rotates in the direction screwed into the shaft 136B. The coupling member 156 and the second rotational shaft 124 can be formed by metal material. The tooth body 159 can be formed by resin material.

Modifications

The description related to the above embodiments exemplifies, without any intention to limit, applicable forms of a human-powered vehicle component according to the present disclosure. The human-powered vehicle component according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiments. Such elements will not be described in detail.

In the first embodiment, the second embodiment, the third embodiment, a modification of the first embodiment, a modification of the second embodiment, and a modification of the third embodiment, the configuration of the speed reducer 40B can be changed to that of the fourth embodiment.

In the first embodiment, the second embodiment, the third embodiment, a modification of the first embodiment, a modification of the second embodiment, and a modification of the third embodiment, the configuration of the speed reducer 40B can be changed to that of the fifth embodiment.

In the first embodiment, the second embodiment, the third embodiment, the fourth embodiment, a modification of the first embodiment, a modification of the second embodiment, a modification of the third embodiment, and a modification of the fourth embodiment, instead of or in addition to the fifth rotary body 130, at least one of the first rotary body 112, the second rotary body 116, the third rotary body 122, the fourth rotary body 126, and the sixth rotary body 132 can have the same configuration as the second gear 136 of the fourth embodiment. That is, any gear included in the speed reducer 40B can be configured to include a thermosetting resin.

In the first embodiment, the second embodiment, the third embodiment, the fifth embodiment, a modification of the first embodiment, a modification of the second embodiment, a modification of the third embodiment, and a modification of the fifth embodiment, instead of or in addition to the fifth rotary body 130, at least one of the first rotary body 112, the second rotary body 116, the third rotary body 122, the fourth rotary body 126, and the sixth rotary body 132 can have the same configuration as the second gear 136 of the fifth embodiment. That is, any gear included in the speed reducer 40B can be configured to include a thermosetting resin.

Figure 31:
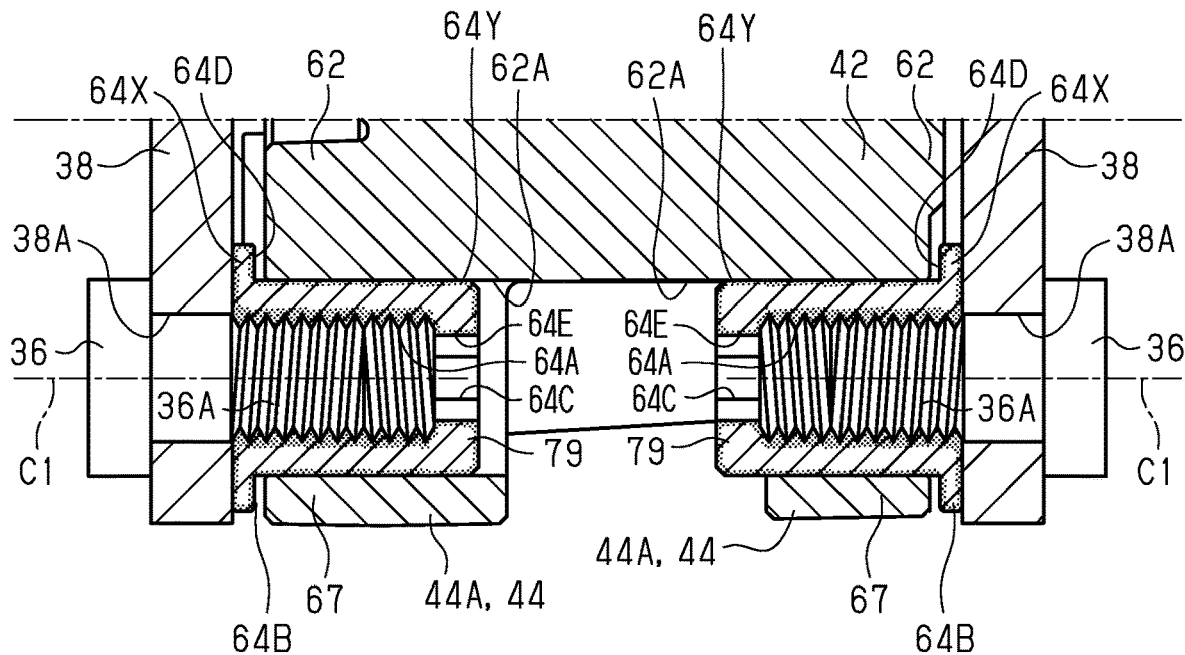
FIG. 31 is a cross-sectional view of the human-powered vehicle component showing a first modification of a joint.

In the first embodiment and a modification of the first embodiment, the first female thread portion 62B of the base 62 and the male thread portion 66A of the intermediate portion 66 can be omitted. As shown in FIG. 31, an intermediate portion 67 can be press-fitted to the hole 62A of the base 62. As shown in FIG. 31, a coupling portion 79 can be press-fitted to the hole 62A of the base 62. In this case, at least one of the intermediate portion 67 and the base 62 can include a restriction that restricts rotation of the coupling portion 79 and the intermediate portion 90 relative to the base 62. The restriction is provided on at least one of an outer peripheral part of the intermediate portion 67 and the inner peripheral part of the base 62. In this case, the first female thread portion 62B of the base 62 and the male thread portion 66A of the intermediate portion 66 are omitted.

Figure 32:
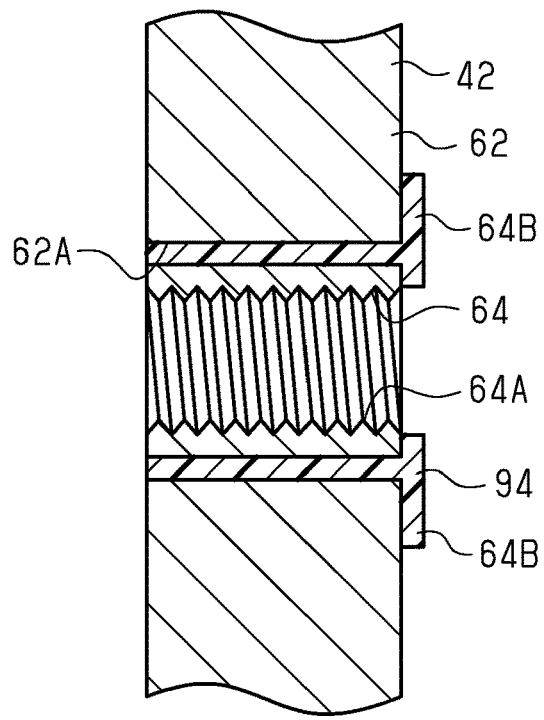
FIG. 32 is a cross-sectional view of the human-powered vehicle component showing a second modification of a joint.

In the first embodiment, the second embodiment, the fourth embodiment, a modification of the first embodiment, a modification of the second embodiment, and a modification of the fourth embodiment, the intermediate portions 66, 82, and 90 can include rubber or resin in the same manner as the intermediate portions 98 and 101 of the third embodiment. The intermediate portions 66, 82, and 90 are formed by the fourth material. FIG. 32 shows an intermediate portion 94 that is formed by rubber or resin. The intermediate portion 94 can be formed separately from the coupling portions 64, 80, and 88 and adhered to the coupling portions 64, 80, and 88, insert-molded to the coupling portions 64, 80, and 88, or applied to the coupling portion 64. The flanges 64B and 80B of the coupling portions 64 and 80 can be formed by rubber or resin. The thickness of the intermediate portion 94 is greater than or equal to one micrometer and less than or equal to five millimeters. In a case in which the flanges 64B and 80B of the coupling portions 64 and 80 are formed by rubber or resin, the flanges 64B and 80B can be formed separately from the second female thread portions 64A and 80A of the coupling portions 64 and 80 and can be formed integrally with the intermediate portion 94. As in the first embodiment, a male thread portion can be formed on an outer peripheral part of the intermediate portion 94. As in the second embodiment, at least one of at least one recess and at least one projection can be formed on the outer peripheral part of the intermediate portion 94. The outer peripheral part of the intermediate portion 94 can include a round tubular surface, and the joint and the intermediate portion can be press-fitted to the hole 62A.

In the first embodiment, the second embodiment, the third embodiment, the fourth embodiment, the fifth embodiment, a modification of the first embodiment, a modification of the second embodiment, a modification of the third embodiment, a modification of the fourth embodiment, and a modification of the fifth embodiment, the at least one first joint 44A and the at least one second joint 44B can be located without any gap in a direction parallel to the rotational axis C2 of the input rotational shaft 12A. In this case, the at least one first joint 44A and the at least one second joint 44B can be formed integrally with each other, and the hole 62A of the first joint 44A can be in communication with the hole 62A of the second joint 44B.

In the first embodiment, the second embodiment, the fourth embodiment, a modification of the first embodiment, a modification of the second embodiment, and a modification of the fourth embodiment, as long as the intermediate portions 66, 82, and 90 are formed by the third material or the fourth material, the combination of the materials of the base 62, the coupling portions 64, 80, and 88, and the intermediate portions 66, 82, and 90 can be changed in any manner. That is, in a case in which the fasteners 36 having a material that facilitates formation of galvanic corrosion in relation to the first material of the base 62 is selected, any combination can be used as long as the combination inhibits galvanic corrosion.

In the first embodiment, the second embodiment, the third embodiment, the fourth embodiment, the fifth embodiment, a modification of the first embodiment, a modification of the second embodiment, a modification of the third embodiment, a modification of the fourth embodiment, and a modification of the fifth embodiment, the human-powered vehicle component 40 can further include a transmission device that is configured to change rotational speed of the output portion 40A in relation to rotational speed of the input rotational shaft 12A. In the first embodiment, the second embodiment, the third embodiment, a modification of the first embodiment, a modification of the second embodiment, and a modification of the third embodiment, the motor 46 and the speed reducer 40B can be omitted, and the human-powered vehicle component 40 can include a transmission device that is configured to change rotational speed of the output portion 40A in relation to rotational speed of the input rotational shaft 12A. The transmission device is provided on a power transmission path between the input rotational shaft 12A and the output portion 40A. The transmission device is accommodated in the housing 42. The transmission device can include a stepped transmission or a continuously variable transmission (CVT). The transmission device can include, for example, a planetary gear mechanism and can include sprockets, a chain, and a derailleur.

Figure 33:
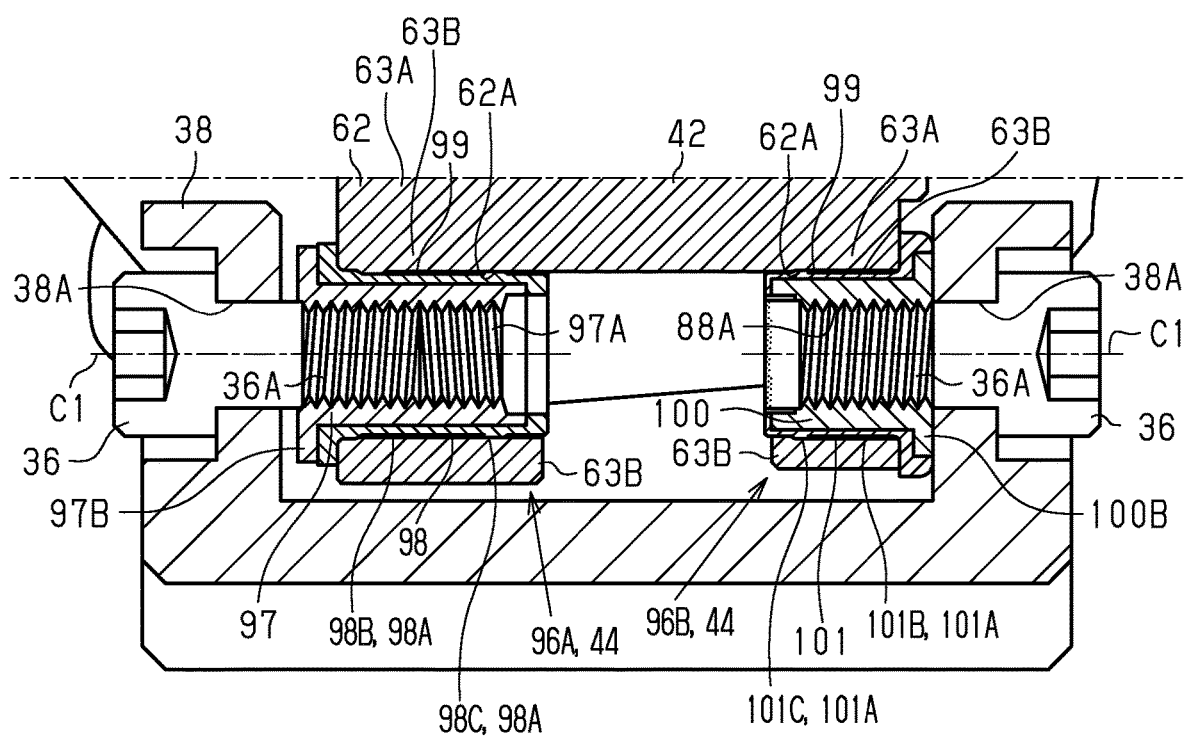
FIG. 33 is a cross-sectional view of the human-powered vehicle component showing a third modification of a joint.

In the third embodiment and a modification of the third embodiment, as shown in FIG. 33, the first base portion 63A and the second base portion 63B can be formed integrally with each other as a one-piece member.

In the third embodiment and a modification of the third embodiment, as long as the joining force between the intermediate portion 98 and the base 62 is greater than the joining force between the intermediate portion 98 and the coupling portion 97, the coupling structure of the intermediate portion 98 and the base 62 and the coupling structure of the intermediate portion 98 and the coupling portion 97 can be appropriately changed. For example, the intermediate portion 98 can be joined with the base 62 by a snap-fit or threads.

In the third embodiment and a modification of the third embodiment, the joining force between the intermediate portion 98 and the base 62 can be less than or equal to the joining force between the intermediate portion 98 and the coupling portion 97.

In the third embodiment and a modification of the third embodiment, as long as the joining force between the intermediate portion 101 and the base 62 is greater than the joining force between the intermediate portion 101 and the coupling portion 100, the coupling structure of the intermediate portion 101 and the base 62 and the coupling structure of the intermediate portion 101 and the coupling portion 100 can be appropriately changed. For example, the intermediate portion 101 can be joined with the base 62 by a snap-fit or threads.

In the third embodiment and a modification of the third embodiment, the joining force between the intermediate portion 101 and the base 62 can be greater than the bonging force between the intermediate portion 101 and the coupling portion 100. In this case, for example, the recess 100T is omitted from the outer peripheral part of the coupling portion 100, and the recess 100T is omitted from the inner peripheral part of the intermediate portion 101.

In the fourth embodiment, the fifth embodiment, a modification of the fourth embodiment, and a modification of the fifth embodiment, the gear 110 can be used as a gear other than those in the speed reducer 40B. That is, the gear can be used for any device as long as the gear includes a shaft formed by a metal, and a tooth portion provided on an outer peripheral part of the shaft to rotate integrally with the shaft and including a thermosetting resin, the tooth portion is annular and includes an inner peripheral part including a first coupler coupled to the shaft, the shaft includes an outer peripheral part including a second coupler coupled to the first coupler, the first coupler includes a female thread portion, and the second coupler includes a male thread portion.

In the fourth embodiment, the fifth embodiment, a modification of the fourth embodiment, and a modification of the fifth embodiment, the structure of the joint 44 of the human-powered vehicle component 40 can be changed as long as the human-powered vehicle component 40 is attachable to the frame 18.

In each embodiment and a modification of each embodiment, the input rotational shaft 12A can be omitted from the human-powered vehicle component 40. For example, the input rotational shaft 12A can be configured to be coupled to the human-powered vehicle component 40 in a removable manner.

In each embodiment and a modification of each embodiment, the speed reducer 40B can have any configuration as long as at least one gear 110 includes a thermosetting resin. For example, the speed reducer 40B can be a two-step speed reducer including four gears 110 or a one-step speed reducer including two gears 110.

In the third embodiment and a modification of the third embodiment, the second joint 96B can be configured in the same manner as the first joint 96A, or the first joint 96A can be configured in the same manner as the second joint 96B. In the third embodiment and a modification of the third embodiment, the first joint 96A can have the configuration shown in FIG. 16, and the second joint 96B can have the configuration shown in FIG. 33. In the third embodiment and a modification of the third embodiment, the first joint 96A can have the configuration shown in FIG. 33, and the second joint 96B can have the configuration shown in FIG. 16.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A human-powered vehicle component for a human-powered vehicle, the human-powered vehicle component comprising:
   a housing; and
   a joint provided on the housing and configured to be attached to a support of the human-powered vehicle by a fastener,
   the joint including
   a metal base, the metal base being formed integrally with a portion of the housing as a one-piece member,
   a metal coupling portion provided on the metal base and configured to be coupled to the fastener, the same fastener being configured to be received by the housing and the support, and
   an intermediate portion provided between the coupling portion and the metal base, at least part of the intermediate portion being tubular,
   the metal base including a first material having a first standard electrode potential,
   the coupling portion including a second material having a second standard electrode potential,
   the intermediate portion being formed by one of a third material having a third standard electrode potential and a fourth material having an electric insulating property,
   a difference of the third standard electrode potential and the first standard electric potential and a difference of the third standard electrode potential and the second standard electrode potential each being smaller than a difference of the first standard electrode potential and the second standard electrode potential.

2. The human-powered vehicle component according to claim 1, wherein
   the first standard electrode potential differs from the second standard electrode potential.

3. The human-powered vehicle component according to claim 1, wherein
   the intermediate portion is non-removably provided on the coupling portion.

4. The human-powered vehicle component according to claim 1, wherein
   the intermediate portion is formed by the fourth material, and
   the fourth material includes a metal oxide.

5. The human-powered vehicle component according to claim 4, wherein
   the second material includes an aluminum alloy, and
   the metal oxide includes an aluminum oxide.

6. The human-powered vehicle component according to claim 4, wherein
   the intermediate portion has a thickness of 1 micrometer or greater and 30 micrometers or less.

7. The human-powered vehicle component according to claim 1, wherein
   the intermediate portion and the coupling portion are formed by different members.

8. The human-powered vehicle component according to claim 7, wherein
   the intermediate portion is removably provided on the coupling portion, and
   a joining force between the intermediate portion and the metal base is greater than a joining force between the intermediate portion and the coupling portion.

9. The human-powered vehicle component according to claim 1, wherein
   the coupling portion and the intermediate portion are non-removably provided on the metal base.

10. The human-powered vehicle component according to claim 1, wherein
    the intermediate portion includes a rubber or a resin.

11. The human-powered vehicle component according to claim 1, wherein
    the metal base includes a hole, and
    at least part of the coupling portion and at least part of the intermediate portion are located in the hole.

12. The human-powered vehicle component according to claim 11, wherein
    the intermediate portion is press-fitted to the hole.

13. The human-powered vehicle component according to claim 11, wherein
    the at least part of the coupling portion is tubular, and
    the at least part of the intermediate portion covers at least part of an outer peripheral surface of the at least part of the coupling portion.

14. The human-powered vehicle component according to claim 13, wherein
    the at least part of the intermediate portion has an outer peripheral part including at least one of a knurl that contacts the metal base and a protrusion that contacts the metal base.

15. The human-powered vehicle component according to claim 14, wherein
    the at least one of a knurl that contacts the metal base and a protrusion that contacts the metal base is provided at a position separate from an opening of the hole.

16. The human-powered vehicle component according to claim 14, wherein
    the at least one of the knurl and the protrusion includes a first contact portion and a second contact portion, and
    the first contact portion and the second contact portion are spaced apart from each other in a direction in which the hole extends.

17. The human-powered vehicle component according to claim 16, wherein
    the intermediate portion is adhered to the metal base by an adhesive provided in the hole, and
    at least part of the adhesive is provided between the first contact portion and the second contact portion.

18. The human-powered vehicle component according to claim 13, wherein
    the at least part of the coupling portion has an outer peripheral part including a knurl that contacts the intermediate portion.

19. The human-powered vehicle component according to claim 11, wherein the intermediate portion is adhered to the metal base by an adhesive provided in the hole.

20. The human-powered vehicle component according to claim 11, wherein
the coupling portion is located between the metal base and the support in a state in which the joint is coupled to the support of the human-powered vehicle by the fastener, and the coupling portion includes a flange having a contour that is larger than a diameter of the hole.

21. The human-powered vehicle component according to claim 11, wherein
the metal base includes a first female thread portion that forms the hole, and
the intermediate portion includes at least part of a male thread portion configured to be joined with the first female thread portion.

22. The human-powered vehicle component according to claim 21, wherein
the coupling portion includes a second female thread portion configured to be coupled to the fastener,
one of the first female thread portion and the second female thread portion is a right-hand thread, and
the other one of the first female thread portion and the second female thread portion is a left-hand thread.

23. The human-powered vehicle component according to claim 11, wherein
the coupling portion includes a second female thread portion configured to be coupled to the fastener.

24. The human-powered vehicle component according claim 23, wherein
the coupling portion includes a tool engagement portion configured to be engaged with a tool.

25. The human-powered vehicle component according to claim 1, wherein
at least part of the housing is formed integrally with the metal base as a one-piece member.

26. The human-powered vehicle component according to claim 1, wherein
the metal base includes
a first base portion, and
a second base portion provided on the first base portion and defining the hole, and
the second base portion and the first base portion include different materials.

27. The human-powered vehicle component according to claim 26, wherein
at least part of the housing is formed integrally with the first base portion as a one-piece member.

28. The human-powered vehicle component according to claim 1, wherein
the metal base includes a magnesium alloy.

29. The human-powered vehicle component according to claim 1, wherein
the intermediate member and the metal base include a first restriction that restricts movement of the intermediate portion relative to the metal base, the first restriction including at least one recess and at least one projection having complementary shapes.

* * * * *